(12) United States Patent
Bhan et al.

(10) Patent No.: US 7,749,374 B2
(45) Date of Patent: * Jul. 6, 2010

(54) METHODS FOR PRODUCING A CRUDE PRODUCT

(75) Inventors: Opinder Kishan Bhan, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 11/866,922

(22) Filed: Oct. 3, 2007

(65) Prior Publication Data

US 2009/0057197 A1 Mar. 5, 2009

Related U.S. Application Data

(60) Provisional application No. 60/850,109, filed on Oct. 6, 2006.

(51) Int. Cl.
*C10G 11/02* (2006.01)
(52) U.S. Cl. ............................ 208/123; 208/95; 208/124
(58) Field of Classification Search .................. 208/95, 208/123, 124
See application file for complete search history.

(56) References Cited

U.S. PATENT DOCUMENTS

| | | | |
|---|---|---|---|
| 1,111,580 A | 9/1914 | Herber | |
| 2,850,435 A | 9/1958 | Fierce et al. | 196/41 |
| 2,902,429 A | 9/1959 | Scott | 208/89 |
| 2,921,023 A | 1/1960 | Holm | 208/263 |
| 3,025,231 A | 3/1962 | Friedman et al. | 208/213 |
| 3,051,645 A | 8/1962 | Wilson et al. | |
| 3,080,435 A | 3/1963 | Nager | |
| 3,081,256 A | 3/1963 | Hendal et al. | |

(Continued)

FOREIGN PATENT DOCUMENTS

CA 1121293 4/1982

(Continued)

OTHER PUBLICATIONS

Hannan, M.A. et al, "Determination of Oxygen, Nitrogen, and Silicon in Nigerian Fossil Fuels by 14 MeV Neutron Activation Analysis", J. of Radioanalytical and Nuclear Chemistry, vol. 256, No. 1 (2003); pp. 61-65.

(Continued)

*Primary Examiner*—Robert J Hill, Jr.
*Assistant Examiner*—Brian McCaig
(74) *Attorney, Agent, or Firm*—Richard B. Taylor

(57) ABSTRACT

Methods for conversion of a hydrocarbon feed to a total product are described. Contact of the hydrocarbon feed with one or more catalysts at selected contacting conditions produces the total product. The total product includes a crude product that is a liquid mixture at 25° C. and 0.101 MPa and has one or more properties that are changed relative to the respective property of the hydrocarbon feed. Selected contacting conditions include a partial pressure of at most 7 MPa. During contact a P-value of a hydrocarbon feed/total product mixture remains at least 1.0. The crude product has a residue content of at most 90% and/or a reduced viscosity of at most 50% as compared to the residue content and/or viscosity content of the hydrocarbon feed.

56 Claims, 22 Drawing Sheets

U.S. PATENT DOCUMENTS

| | | | |
|---|---|---|---|
| 3,136,714 A | 6/1964 | Gibson et al. | |
| 3,547,585 A | 12/1970 | Urban | 23/224 |
| 3,553,279 A | 1/1971 | Bawa | |
| 3,558,474 A | 1/1971 | Gleim et al. | |
| 3,576,737 A | 4/1971 | Mitchell | 208/251 |
| 3,617,501 A | 11/1971 | Eng et al. | 208/89 |
| 3,622,495 A | 11/1971 | Gatsis et al. | 208/59 |
| 3,663,431 A | 5/1972 | Wagner | 208/143 |
| 3,677,932 A | 7/1972 | Hardesty et al. | |
| 3,679,577 A | 7/1972 | Wantland et al. | |
| 3,684,688 A | 8/1972 | Roselius | 208/50 |
| 3,696,027 A | 10/1972 | Bridge | 208/210 |
| 3,712,861 A | 1/1973 | Rosinski et al. | 208/216 |
| 3,714,031 A | 1/1973 | Van der Toom et al. | |
| 3,716,478 A | 2/1973 | Kodera et al. | |
| 3,716,479 A | 2/1973 | Weisz et al. | |
| 3,730,876 A | 5/1973 | Sequeira, Jr. | 208/59 |
| 3,745,109 A | 7/1973 | Heredy et al. | |
| 3,766,054 A | 10/1973 | Weisz et al. | |
| 3,786,138 A | 1/1974 | Shalit et al. | |
| 3,808,122 A | 4/1974 | White et al. | 208/59 |
| 3,812,028 A | 5/1974 | Wennerberg et al. | |
| 3,841,981 A | 10/1974 | Layng | |
| 3,846,288 A | 11/1974 | Chun et al. | 208/263 |
| 3,847,797 A | 11/1974 | Pasternak et al. | |
| 3,849,242 A | 11/1974 | Takeya et al. | |
| 3,876,523 A | 4/1975 | Rosinki et al. | 208/89 |
| 3,876,532 A | 4/1975 | Plundo et al. | |
| 3,887,455 A | 6/1975 | Hamner et al. | |
| 3,891,541 A | 6/1975 | Oleck et al. | 208/89 |
| 3,901,792 A | 8/1975 | Wolk et al. | |
| 3,902,991 A | 9/1975 | Christensen et al. | 208/211 |
| 3,920,538 A | 11/1975 | Pronk et al. | 208/89 |
| 3,923,635 A | 12/1975 | Schulman et al. | |
| 3,928,176 A | 12/1975 | Hamner et al. | |
| 3,931,052 A | 1/1976 | Oleck et al. | 252/465 |
| 3,948,759 A | 4/1976 | King et al. | |
| 3,957,620 A | 5/1976 | Fukui et al. | |
| 3,960,706 A | 6/1976 | McCollum et al. | |
| 3,960,708 A | 6/1976 | McCollum et al. | |
| 3,960,712 A | 6/1976 | Conway | 208/216 |
| 4,008,149 A | 2/1977 | Itoh et al. | 208/216 |
| 4,016,067 A | 4/1977 | Fischer et al. | 208/89 |
| 4,048,060 A | 9/1977 | Riley | 208/108 |
| 4,051,015 A | 9/1977 | Bearden, Jr. et al. | |
| 4,062,757 A | 12/1977 | Beuther et al. | 208/61 |
| 4,067,799 A | 1/1978 | Bearden et al. | 208/112 |
| 4,080,313 A | 3/1978 | Whittam | 252/455 R |
| 4,107,087 A | 8/1978 | Pessimisis | 252/455 R |
| 4,115,324 A | 9/1978 | Ozaki et al. | |
| 4,119,528 A | 10/1978 | Baird, Jr. et al. | |
| 4,127,470 A | 11/1978 | Baird, Jr. et al. | |
| 4,191,635 A | 3/1980 | Quick et al. | 208/89 |
| 4,191,636 A | 3/1980 | Fukui et al. | 208/110 |
| 4,196,102 A | 4/1980 | Inooka et al. | 252/457 |
| 4,224,140 A | 9/1980 | Fujimori et al. | |
| 4,231,858 A | 11/1980 | Seitzer et al. | |
| 4,271,042 A | 6/1981 | Oleck et al. | |
| 4,276,153 A | 6/1981 | Yoshitake et al. | |
| 4,297,242 A | 10/1981 | Hensley, Jr. et al. | 252/439 |
| 4,306,964 A | 12/1981 | Angevine | 208/210 |
| 4,324,645 A | 4/1982 | Angevine et al. | 208/50 |
| 4,357,263 A | 11/1982 | Heck et al. | 252/439 |
| 4,358,361 A | 11/1982 | Peters | 208/89 |
| 4,367,164 A | 1/1983 | Shiroto et al. | 252/457 |
| 4,376,037 A | 3/1983 | Dahlberg et al. | |
| 4,389,301 A | 6/1983 | Dahlberg et al. | |
| 4,405,441 A | 9/1983 | Van Dongen et al. | 208/61 |
| 4,411,824 A | 10/1983 | Chen | 502/323 |
| 4,422,960 A | 12/1983 | Shiroto et al. | 502/206 |
| 4,424,142 A | 1/1984 | Asaoka et al. | 502/84 |
| 4,427,535 A | 1/1984 | Nongbri et al. | |
| 4,431,525 A | 2/1984 | Hensley, Jr. et al. | 208/210 |
| 4,437,980 A | 3/1984 | Heredy et al. | |
| 4,440,631 A | 4/1984 | Togari et al. | 208/112 |
| 4,446,244 A | 5/1984 | Van Nordstrand | 502/84 |
| 4,447,314 A | 5/1984 | Banta | 208/89 |
| 4,450,068 A | 5/1984 | Kukes | 208/251 H |
| 4,456,699 A | 6/1984 | Hensley, Jr. et al. | 502/208 |
| 4,457,836 A | 7/1984 | Seiver et al. | 208/254 |
| 4,460,707 A | 7/1984 | Simpson | |
| 4,473,462 A | 9/1984 | Swanson | |
| 4,498,972 A | 2/1985 | Toulhoat et al. | 208/59 |
| 4,498,979 A | 2/1985 | Eberly, Jr. | |
| 4,499,203 A | 2/1985 | Toulhoat et al. | 502/247 |
| 4,520,128 A | 5/1985 | Morales et al. | 502/210 |
| 4,525,472 A | 6/1985 | Morales et al. | 502/323 |
| 4,530,757 A | 7/1985 | Rankel et al. | 208/251 R |
| 4,548,710 A | 10/1985 | Simpson | 208/216 PP |
| 4,549,957 A | 10/1985 | Hensley, Jr. et al. | 208/216 PP |
| 4,560,468 A | 12/1985 | Kukes et al. | 208/110 |
| 4,564,439 A | 1/1986 | Kuehler et al. | |
| 4,572,778 A | 2/1986 | Ward | 208/89 |
| 4,587,012 A | 5/1986 | Quann | 208/251 H |
| 4,588,709 A | 5/1986 | Morales et al. | 502/314 |
| 4,591,426 A | 5/1986 | Krasuk et al. | |
| 4,592,827 A | 6/1986 | Galiasso et al. | 208/59 |
| 4,595,667 A | 6/1986 | Takase et al. | 502/63 |
| 4,613,425 A | 9/1986 | Higashi et al. | 208/89 |
| 4,626,412 A | 12/1986 | Ebner et al. | |
| 4,659,454 A | 4/1987 | Varghese et al. | |
| 4,661,265 A | 4/1987 | Olson et al. | |
| 4,665,261 A | 5/1987 | Mazurek | |
| 4,670,134 A | 6/1987 | Kolts et al. | 208/251 H |
| 4,729,826 A | 3/1988 | Lindsay et al. | 208/211 |
| 4,738,884 A | 4/1988 | Algrim et al. | 428/57 |
| 4,746,419 A | 5/1988 | Peck et al. | 208/213 |
| 4,810,365 A | 3/1989 | Dohler et al. | |
| 4,830,736 A | 5/1989 | Hung et al. | 208/251 H |
| 4,844,792 A | 7/1989 | Abdo et al. | 208/111 |
| 4,851,107 A | 7/1989 | Kretschmar et al. | 208/108 |
| 4,861,746 A | 8/1989 | Oishi et al. | 502/314 |
| 4,886,594 A | 12/1989 | Miller | 208/210 |
| 4,917,789 A | 4/1990 | Butler et al. | |
| 4,937,218 A | 6/1990 | Ramirez de Aqudelo et al. | |
| 4,937,221 A | 6/1990 | Erekson et al. | |
| 4,937,222 A | 6/1990 | Angevine et al. | 502/242 |
| 4,941,966 A | 7/1990 | Merz et al. | |
| 4,954,473 A | 9/1990 | Gatsis | |
| 4,976,848 A | 12/1990 | Johnson | |
| 4,992,157 A | 2/1991 | Bricker et al. | 208/12 |
| 4,992,163 A | 2/1991 | Aldridge et al. | 208/251 H |
| 5,002,919 A | 3/1991 | Yamazaki et al. | 502/315 |
| 5,017,535 A | 5/1991 | Schoonhoven et al. | 502/30 |
| 5,039,489 A | 8/1991 | Gleaves et al. | |
| 5,053,117 A | 10/1991 | Kyan et al. | 208/58 |
| 5,064,523 A | 11/1991 | Kretschmar et al. | |
| 5,089,463 A | 2/1992 | Johnson | 502/313 |
| 5,108,581 A | 4/1992 | Aldridge et al. | |
| 5,124,024 A | 6/1992 | Krzywicki et al. | |
| 5,124,027 A | 6/1992 | Beaton et al. | 208/309 |
| 5,164,078 A | 11/1992 | Hung et al. | |
| 5,166,118 A | 11/1992 | Kretschmar et al. | |
| 5,190,642 A | 3/1993 | Wilson et al. | 208/254 |
| 5,200,060 A | 4/1993 | Sajkowski et al. | 208/108 |
| 5,215,955 A | 6/1993 | Threlkel | 502/221 |
| 5,264,183 A | 11/1993 | Aldridge et al. | |
| 5,288,681 A | 2/1994 | Gatsis | |
| 5,300,212 A | 4/1994 | Winter, Jr. | 208/67 |
| 5,300,217 A | 4/1994 | Simpson et al. | |
| 5,320,741 A | 6/1994 | Johnson et al. | |
| 5,322,617 A | 6/1994 | De Bruijn et al. | 208/108 |
| 5,334,307 A | 8/1994 | Simpson et al. | 208/254 H |
| 5,358,634 A | 10/1994 | Rankel | 208/251 |

| | | | | | | |
|---|---|---|---|---|---|---|
| 5,374,350 A | 12/1994 | Heck et al. ................ 208/143 | 2003/0150778 A1 | 8/2003 | Haluska et al. | |
| 5,395,536 A | 3/1995 | Brown et al. ................ 210/727 | 2003/0170873 A1 | 9/2003 | Ranson et al. | |
| 5,397,456 A | 3/1995 | Dai et al. .................... 208/108 | 2003/0170874 A1 | 9/2003 | Ranson et al. | |
| 5,468,371 A | 11/1995 | Nelson et al. ............... 208/216 | 2003/0196884 A1 | 10/2003 | Dell'Orfano | |
| 5,468,372 A | 11/1995 | Seamans et al. | 2005/0133405 A1* | 6/2005 | Wellington et al. ........... 208/14 | |
| 5,474,977 A | 12/1995 | Gatsis | 2005/0133414 A1 | 6/2005 | Bhan et al. .................. 208/115 | |
| 5,514,273 A | 5/1996 | Sherwood, Jr. et al. ...... 208/216 | 2005/0133415 A1 | 6/2005 | Bhan et al. .................. 208/115 | |
| 5,529,968 A | 6/1996 | Sudhakar et al. | 2005/0133416 A1 | 6/2005 | Bhan et al. .................. 208/115 | |
| 5,601,701 A | 2/1997 | Cameron et al. ........ 208/251 H | 2005/0133417 A1 | 6/2005 | Bhan et al. .................. 208/115 | |
| 5,620,592 A | 4/1997 | Threlkel | 2005/0133418 A1 | 6/2005 | Bhan et al. .................. 208/115 | |
| 5,635,056 A | 6/1997 | Brons et al. ................ 208/227 | 2005/0139518 A1 | 6/2005 | Bhan et al. .................. 208/115 | |
| 5,688,736 A | 11/1997 | Seamans et al. | 2005/0139519 A1 | 6/2005 | Bhan et al. .................. 208/115 | |
| 5,744,025 A | 4/1998 | Boon et al. | 2005/0139520 A1 | 6/2005 | Bhan et al. .................. 208/115 | |
| 5,817,229 A | 10/1998 | Sudhakar et al. | 2005/0139521 A1 | 6/2005 | Bhan et al. .................. 208/115 | |
| 5,827,421 A | 10/1998 | Sherwood, Jr. ............. 208/112 | 2005/0139522 A1 | 6/2005 | Bhan et al. .................. 208/115 | |
| 5,847,249 A | 12/1998 | Maraschino | 2005/0145543 A1 | 7/2005 | Bhan et al. .................. 208/115 | |
| 5,851,381 A | 12/1998 | Tanaka et al. | 2005/0150818 A1 | 7/2005 | Bhan et al. .................. 208/115 | |
| 5,856,609 A | 1/1999 | Wu et al. .................... 585/489 | 2005/0155908 A1 | 7/2005 | Bhan et al. .................. 208/115 | |
| 5,871,626 A | 2/1999 | Crafts et al. ............ 204/297 R | 2005/0167320 A1 | 8/2005 | Bhan et al. .................... 208/14 | |
| 5,871,636 A | 2/1999 | Trachte et al. | 2005/0167324 A1 | 8/2005 | Bhan et al. .................. 208/115 | |
| 5,885,441 A | 3/1999 | Pereira et al. | 2005/0167325 A1 | 8/2005 | Bhan et al. .................. 208/115 | |
| 5,897,769 A | 4/1999 | Trachte et al. | 2005/0167326 A1 | 8/2005 | Bhan et al. .................. 208/115 | |
| 5,914,030 A | 6/1999 | Bearden et al. | 2005/0167327 A1 | 8/2005 | Bhan et al. .................. 208/115 | |
| 5,916,529 A | 6/1999 | Scheuerman ................ 422/141 | 2005/0167328 A1 | 8/2005 | Bhan et al. .................. 208/115 | |
| 5,928,499 A | 7/1999 | Sherwood, Jr. et al. ...... 208/216 | 2005/0167329 A1 | 8/2005 | Bhan et al. .................. 208/115 | |
| 5,928,501 A | 7/1999 | Sudhakar et al. | 2005/0167330 A1 | 8/2005 | Bhan et al. .................. 208/115 | |
| 5,928,502 A | 7/1999 | Bearden et al. | 2005/0167331 A1 | 8/2005 | Bhan et al. .................. 208/115 | |
| 5,942,101 A | 8/1999 | Greaney ..................... 205/688 | 2005/0167332 A1 | 8/2005 | Bhan et al. .................. 208/115 | |
| 5,961,815 A | 10/1999 | Hockey et al. | 2005/0173301 A1 | 8/2005 | Bhan et al. .................. 208/115 | |
| 6,017,441 A | 1/2000 | Morel et al. .................. 208/96 | 2005/0173302 A1 | 8/2005 | Bhan et al. .................. 208/115 | |
| 6,037,300 A | 3/2000 | Kasztelan et al. ........... 502/204 | 2005/0173303 A1 | 8/2005 | Bhan et al. .................. 208/115 | |
| 6,063,266 A | 5/2000 | Grande et al. | 2006/0060510 A1 | 3/2006 | Bhan .......................... 208/213 | |
| 6,086,749 A | 7/2000 | Kramer et al. .............. 208/213 | 2006/0231456 A1 | 10/2006 | Bhan ............................ 208/85 | |
| 6,136,179 A | 10/2000 | Sherwood, Jr. et al. | 2006/0231457 A1 | 10/2006 | Bhan ............................ 208/85 | |
| 6,149,799 A | 11/2000 | Raybaud et al. ............... 208/49 | 2006/0231465 A1 | 10/2006 | Bhan .......................... 208/253 | |
| 6,162,350 A | 12/2000 | Soled et al. ................. 208/113 | 2006/0234876 A1 | 10/2006 | Bhan .......................... 507/270 | |
| 6,203,313 B1 | 3/2001 | Holmes et al. | 2006/0234877 A1 | 10/2006 | Bhan .......................... 507/270 | |
| 6,203,695 B1 | 3/2001 | Harle et al. | 2006/0249430 A1 | 11/2006 | Mesters ...................... 208/263 | |
| 6,210,564 B1 | 4/2001 | Brons et al. | 2007/0000808 A1 | 1/2007 | Bhan et al. .................... 208/58 | |
| 6,218,333 B1 | 4/2001 | Gabrielov et al. | 2007/0000810 A1 | 1/2007 | Bhan et al. .................. 208/263 | |
| 6,248,230 B1 | 6/2001 | Min et al. ................... 208/213 | 2007/0000811 A1 | 1/2007 | Bhan et al. .................. 208/263 | |
| 6,277,269 B1 | 8/2001 | Myers et al. | | | | |
| 6,290,841 B1 | 9/2001 | Gabrielov et al. | | FOREIGN PATENT DOCUMENTS | | |
| 6,303,842 B1 | 10/2001 | Bridges et al. .............. 585/648 | CN | 1393516 | 1/2003 | |
| 6,309,537 B1 | 10/2001 | Harle et al. ............. 208/254 H | EP | 0159097 | 10/1985 | |
| 6,436,280 B1 | 8/2002 | Harle et al. ............ 208/216 R | EP | 0225686 A1 | 6/1987 | |
| 6,454,932 B1 | 9/2002 | Baldassari et al. | EP | 0367021 A1 | 5/1990 | |
| 6,509,291 B2 | 1/2003 | Eijsbouts | EP | 0433026 A1 | 6/1991 | |
| 6,524,469 B1 | 2/2003 | Schucker | EP | 0435242 | 7/1991 | |
| 6,547,957 B1 | 4/2003 | Sudhakar et al. | EP | 0525259 | 2/1993 | |
| 6,554,994 B1 | 4/2003 | Reynolds et al. ............ 208/211 | EP | 0537500 A2 | 4/1993 | |
| 6,582,590 B1 | 6/2003 | Riley et al. | EP | 0569092 A1 | 5/1993 | |
| 6,620,313 B1 | 9/2003 | Demmin et al. | EP | 0567272 | 10/1993 | |
| 6,635,599 B1 | 10/2003 | Eijsbouts et al. | EP | 0704239 A2 | 9/1995 | |
| 6,652,738 B2 | 11/2003 | Eijsbouts et al. | EP | 0899319 A2 | 3/1999 | |
| 6,660,897 B1 | 12/2003 | Marchal-George et al. .. 585/482 | EP | 1153107 | 4/2003 | |
| 6,759,364 B2 | 7/2004 | Bhan ......................... 502/315 | EP | 1350830 A1 | 10/2003 | |
| 6,919,018 B2 | 7/2005 | Bhan ...................... 208/251 R | FR | 2546175 | 11/1984 | |
| 2001/0045375 A1 | 11/2001 | Thijssen et al. ............. 208/211 | GB | 496779 | 12/1938 | |
| 2002/0056664 A1 | 5/2002 | Chabot | GB | 934907 | 8/1963 | |
| 2002/0112987 A1 | 8/2002 | Hou et al. .................. 208/108 | GB | 1115122 | 5/1968 | |
| 2002/0125175 A1 | 9/2002 | Collins et al. .............. 208/263 | GB | 1232173 | 5/1971 | |
| 2002/0155045 A1 | 10/2002 | Kumagai et al. | GB | 1236230 | 6/1971 | |
| 2003/0000867 A1 | 1/2003 | Reynolds | GB | 1310283 | 3/1973 | |
| 2003/0024854 A1 | 2/2003 | Wen et al. | GB | 1364238 | 8/1974 | |
| 2003/0042174 A1 | 3/2003 | Austin | GB | 2013236 | 8/1979 | |
| 2003/0062163 A1 | 4/2003 | Moulton et al. | GB | 2112412 | 7/1983 | |
| 2003/0070808 A1 | 4/2003 | Allison | GB | 2167430 | 5/1986 | |
| 2003/0070963 A1 | 4/2003 | Zimmermann et al. | GB | 2167430 A | 5/1986 | |
| 2003/0085155 A1 | 5/2003 | Chabot | JP | 54107906 | 8/1979 | |
| 2003/0111391 A1 | 6/2003 | Bhan | JP | 2002129171 | 5/2002 | |
| 2003/0130118 A1 | 7/2003 | Koyama et al. | RU | 2186090 | 7/2002 | |
| 2003/0149317 A1 | 8/2003 | Rendina | | | | |

| | | |
|---|---|---|
| WO | WO9302158 | 2/1993 |
| WO | WO9708274 | 3/1997 |
| WO | WO0018854 | 4/2000 |
| WO | WO0020113 | 4/2000 |
| WO | WO0044856 | 8/2000 |
| WO | WO0209870 | 2/2002 |
| WO | WO0232570 | 4/2002 |
| WO | WO0233029 | 4/2002 |
| WO | WO02053286 | 7/2002 |
| WO | WO02062925 | 8/2002 |
| WO | WO02100985 | 12/2002 |
| WO | WO03042333 | 5/2003 |
| WO | WO03091363 A1 | 11/2003 |
| WO | WO03104359 | 12/2003 |
| WO | WO2004053028 | 6/2004 |
| WO | WO2005061666 | 7/2005 |
| WO | WO2005063939 | 7/2005 |
| WO | WO2005066310 | 7/2005 |
| WO | WO2005085395 | 9/2005 |

OTHER PUBLICATIONS

Dehkissia, S. et al, Characterization of Doba-Chad Heavy Crude Oil in Relation With the Feasibility of Pipeline Transportation, Fuel 83 (2004); pp. 2157-2168.
Sadeghi, K. M. et al, "Fractionation of Various Heavy Oils and Bitumen for Characterization Based on Polarity", Fuel, 1989, vol. 68, June; pp. 782-787.
Amendment and Response Under 37 CFR 1.111, dated May 21, 2007 for U.S. Appl. No. 11/014,335.
Amendment and Response Under 37 CFR 1.111, dated Jul. 2, 2007 for U.S. Appl. No. 11/014,335.
Response Under 37 CFR 1.114, dated Apr. 4, 2008 for U.S. Appl. No. 11/014,335.
Amendment and Response Under 37 CFR 1.111, dated Sep. 7, 2007 for U.S. Appl. No. 11/013,553.
Response Under 37 CFR 1.111, dated Jul. 18, 2007 for U.S. Appl. No. 11/013,554.
Response to Notice of Non-Compliant Amendment dated Jul. 11, 2006 for U.S. Appl. No. 11/013,576.
Amendment and Response Under 37 CFR 1.111 and 1.115, dated Mar. 19, 2008 for U.S. Appl. No. 11/013,576.
Amendment and Response Under 37 CFR 1.111, dated Aug. 20, 2007 for U.S. Appl. No. 11/013,835.
Response Under 37 CFR 1.111, dated Mar. 7, 2008 for U.S. Appl. No. 11/014,362.
Response Under 37 CFR 1.111, dated Nov. 2, 2007 for U.S. Appl. No. 11/014,011.
Amendment and Response Under 37 CFR 1.111, dated Oct. 18, 2007 for U.S. Appl. No. 11/014,275.
Amendment and Response Under 37 CFR 1.111, dated Sep. 10, 2007 for U.S. Appl. No. 11/014,275.
Response Under 37 CFR 1.111, dated Feb. 22, 2008 for U.S. Appl. No. 11/014,272.
Amendment and Response Under 37 CFR 1.111, dated Sep. 7, 2007 for U.S. Appl. No. 11/014,005.
Response Under 37 CFR 1.111, dated Sep. 10, 2007 for U.S. Appl. No. 11/013,545.
Response Under 37 CFR 1.111, dated Mar. 10, 2008 for U.S. Appl. No. 11/014,132.
Response Under 37 CFR 1.111, dated Mar. 7, 2008 for U.S. Appl. No. 11/014,251.
Response Under 37 CFR 1.111, dated Dec. 4, 2006 for U.S. Appl. No. 11/013,632.
Response Under 37 CFR 1.114, dated Mar. 14, 2007 for U.S. Appl. No. 11/013,632.
Response Under 37 CFR 1.111, dated Oct. 18, 2007 for U.S. Appl. No. 11/013,632.
Response Under 37 CFR 1.111, dated Dec. 26, 2007 for U.S. Appl. No. 11/014,365.
Response Under 37 CFR 1.111, dated Jan. 14, 2008 for U.S. Appl. No. 11/014,363.
Response Under 37 CFR 1.111, dated Feb. 11, 2008 for U.S. Appl. No. 11/014,380.
Response Under 37 CFR 1.111, dated Feb. 21, 2008 for U.S. Appl. No. 11/014,060.
Petition To Revive A Patent Application Abandoned Unintentionally Under 37 CFR §1.137 (b), dated Aug. 13, 2008 for U.S. Appl. No. 11/399,162.
Response Under 37 CFR 1.111, dated Aug. 13, 2008 for U.S. Appl. No. 11/399,162.
"Refining Processes 2000", Hydrocarbon Processing, Gulf Publishing Co., Houston, Texas, 2000, pp. 87-142.
Brauer, ed. Handbook of Preparative Inorganic Chemistry, vol. 2., Second Edition, Academic Press Inc., New York, N.Y., 1965, p. 1507.
Nickless, ed. Inorganic Sulfur Chemistry, Elsevier, Amsterdam, 1968, pp. 669-747.
Heithaus, "Measurement and Significance of Asphaltene Peptization," Jounal of the Institute of Petroleum, 1962, vol. 48 (458) pp. 45-53.
Speight, J.G. "Fuel Science and Technology Handbook, Chapter 3—Composition and Properties", New York, Marcel Dekker, US 1990, p. 115.
Platts-Methodology and Specifications Guide—Crude Oil, Latest Update Jun. 2007 (McGraw Hill); pp. 1-21.
Atanasova, P. et al (1997), Effect of Phosphorus Concentration and Method on Preparation on the Structure of the Oxide Form of Phosphorus-nickel-tungsten/alumina Hydrotreating Catalysts, Applied Catalysts A, 161, pp. 105-119.
Giles, H. N. (2003), Significance of Tests for Petroleum Products ($7^{th}$ Ed.) Rand, S. J., ASTM International, 258 pgs.
Gary, J. H. et al (2001), Petroleum Refining Technology and Economics, 4th Ed., Marcel Dekker, 441 pages.
Aboul-Seoud, A-L et al, (1999), "A Generalized Viscosity Correlation for Undefined Petroleum Fraction", Chemical Engineering Journal 72, pp. 253-256.
Tojima, M. et al (1998), "Effect of Heavy Asphaltenes on Stability of Residual Oil", Catalysis Today, 43, pp. 347-351.
Pp. 210-213 of the handbook titled "Advanced Inorganic Chemistry" by Cotton et al., John Wiley & Sons, 1988.
Pp. 1-4 of Wikipedia on Aluminium Oxide on Jan. 20, 2009.
U.S. Appl. No. 60/531,506.
U.S. Appl. No. 60/618,681.
U.S. Appl. No. 60/618,892.
U.S. Appl. No. 11/399,843.
U.S. Appl. No. 11/400,294.
U.S. Appl. No. 11/400,295.
U.S. Appl. No. 11/400,542.
U.S. Appl. No. 11/400,628.
U.S. Appl. No. 11/425,979.
U.S. Appl. No. 11/425,983.
U.S. Appl. No. 11/425,985.
U.S. Appl. No. 11/766,009.
By Van Kernoort et al., in the Jour. Inst. Pet., 1951, pp. 596-604.

* cited by examiner

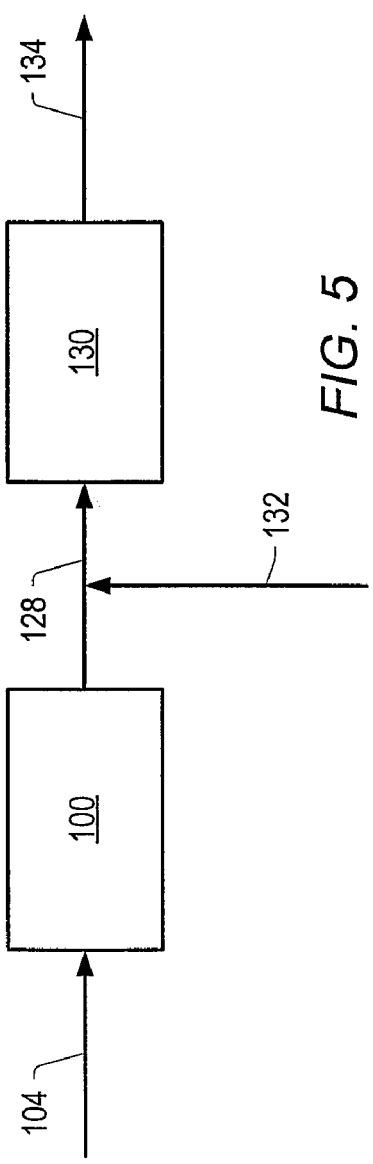
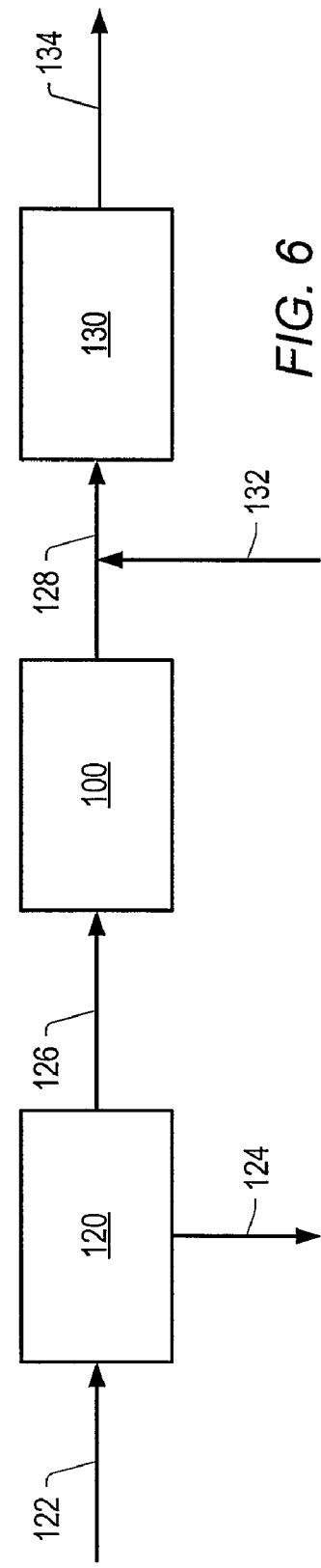

Table 1

| Property | Crude Feed | Crude Product |
|---|---|---|
| Example | 5 | 5 |
| TAN | 0.8 | 0.09 |
| API Gravity | 24.9 | 28.6 |
| Density at 15.56 °C (60 °F), g/cm$^3$ | 0.9046 | 0.8838 |
| Hydrogen, wt% | 11.68 | 12.54 |
| Carbon, wt% | 85.24 | 86.43 |
| Sulfur, wt% | 2.24 | 0.75 |
| Oxygen, wt% | 0.29 | 0.07 |
| Nitrogen, wt% | 0.19 | 0.16 |
| Total Basic Nitrogen, wt% | 0.05 | 0.05 |
| Nickel, wtppm | 27 | 7.6 |
| Vanadium, wtppm | 59 | 14.8 |
| Micro-Carbon Residue, wt% | 6.6 | 4.4 |
| C$_5$Asphaltenes, wt% | 5.21 | 2.3 |
| Distillate, wt% | 20.5 | 22.1 |
| VGO, wt% | 31.3 | 31.8 |
| Residue, wt% | 28.3 | 25.5 |
| P-Value | 4.5 | 4.5 |
| Viscosity at 37.8 °C (100 °F), cSt | 17.4 | 14.8 |

*FIG. 8*

Table 2

| Property | Crude Feed | Crude Product |
|---|---|---|
| Example Number | 6 | 6 |
| TAN | 10.3 | 0.42 |
| API Gravity | 13.2 | 12.5 |
| Density at 15.56 °C (60 °F), g/cm$^3$ | 0.9776 | 0.9824 |
| Hydrogen, wt% | 11.54 | 11.71 |
| Carbon, wt% | 86.89 | 87.28 |
| Sulfur, wt% | 0.31 | 0.23 |
| Oxygen, wt% | 0.90 | 0.34 |
| Nitrogen, wt% | 0.38 | 0.39 |
| Total Basic Nitrogen, wt% | 0.14 | 0.15 |
| Nickel, wtppm | 13.7 | 10.7 |
| Vanadium, wtppm | 3.4 | 2.9 |
| Iron, wtppm | 19 | 2.5 |
| Sodium, wtppm | 37 | 24 |
| Micro-Carbon Residue, wt% | 7.2 | 6.7 |
| $C_5$ Asphaltenes, wt% | 4.8 | 4.8 |
| Distillate wt% | 17.6 | 17.8 |
| VGO wt% | 44.6 | 44.1 |
| Residue, wt% | 37.8 | 37.8 |
| P-Value | 5 | 5 |
| Viscosity at 37.8 °C (100 °F), cSt | 6880 | 3893 |

*FIG. 10*

Table 3

| Property | Crude Feed | Crude Product |
|---|---|---|
| Example Number | 7 | 7 |
| TAN | 3.7 | 0.16 |
| API Gravity | 15.0 | 16.2 |
| Density at 15.56 °C (60 °F), g/cm$^3$ | 0.9659 | 0.9582 |
| Hydrogen, wt% | 11.4 | 11.6 |
| Carbon, wt% | 87.1 | 87.4 |
| Sulfur, wt% | 0.43 | 0.33 |
| Oxygen, wt% | 0.42 | 0.20 |
| Nitrogen, wt% | 0.52 | 0.50 |
| Total Basic Nitrogen, wt% | 0.16 | 0.18 |
| Nickel, wtppm | 12.4 | 11.0 |
| Vanadium, wtppm | 19.2 | 15 |
| Iron, wtppm | 10.4 | 0.8 |
| Calcium, wtppm | 5.4 | 1.9 |
| Sodium, wtppm | 117 | 6 |
| Zinc, wtppm | 2.5 | 0.6 |
| Potassium, wtppm | 46 | 3 |
| Micro-Carbon Residue, wt% | 8.3 | 7.9 |
| $C_5$ Asphaltenes, wt% |  | 6.3 |
| Distillate wt% | 15.6 | 19.4 |
| VGO wt% | 39.6 | 37.6 |
| Residue, wt% | 38.8 | 40.1 |
| Viscosity at 37.8 °C (100 °F), cSt | 1224 | 862 |

*FIG. 11*

Table 4

| Property | Crude Feed | Crude Product 8 | Crude Product 9 | Crude Product 10 | Crude Product 11 |
|---|---|---|---|---|---|
| Example Number | | 8 | 9 | 10 | 11 |
| TAN | 0.8 | 0.04 | 0.04 | 0.04 | 0.05 |
| API Gravity | 19.6 | 22.3 | 22.95 | 21.7 | 22.9 |
| Density at 15.56 °C (60 °F), g/cm³ | 0.9363 | 0.9198 | 0.9162 | 0.9236 | 0.9165 |
| Hydrogen, wt% | 11.68 | 12.0 | 12.10 | 11.91 | 12.08 |
| Carbon, wt% | 85.24 | 86.10 | 86.2 | 85.90 | 86.25 |
| Sulfur, wt% | 1.91 | 1.6 | 1.3 | 1.8 | 1.3 |
| Oxygen, wt% | 0.9 | 0.15 | 0.14 | 0.15 | 0.14 |
| Nitrogen, wt% | 0.22 | 0.20 | 0.19 | 0.22 | 0.20 |
| Total Basic Nitrogen, wt% | 0.06 | NA | NA | NA | NA |
| Nickel, wtppm | 27 | 18 | 15 | 14 | 14 |
| Vanadium, wtppm | 69 | 41 | 35 | 29 | 33 |
| Micro-Carbon Residue, wt% | 7.5 | 5.8 | 5.9 | 6.5 | 6.0 |
| C₅ Asphaltenes, wt% | 6.0 | 4.0 | 4.0 | 3.4 | 3.9 |
| VGO, wt% | 30.0 | 34.6 | 34.6 | 35.1 | 34.8 |
| Residue, wt% | 34.9 | 31.5 | 31.2 | 31.2 | 31.0 |
| P-Value | --- | 3.1 | 3.2 | 4.5 | 3.2 |
| Hydrogen Uptake, Nm³/m³ | --- | 29.3 | 40.3 | 18.9 | 35.3 |
| Viscosity at 100 °F, cSt | 177 | 62.6 | 59.7 | 72.7 | 58.3 |

FIG. 12

Table 5

| Property | Crude Feed | Crude Product 15 | Crude Product 16 | Crude Product 17 | Crude Product 18 |
|---|---|---|---|---|---|
| Example No. | | 15 | 16 | 17 | 18 |
| Catalyst (% of total amount of catalyst in all contacting zones) | --- | V(25%); Mo(75%) | V(50%); Mo(50%) | V(50%); Mo/V(50%) | Pyrex Beads |
| TAN | 9.3 | 0.9 | 1.4 | 1.4 | 8 |
| API Gravity | 13.8 | 14.2 | 14.1 | 13.8 | 13.5 |
| Density at 15.56 °C (60 °F), g/cm³ | 0.9740 | 0.9712 | 0.9711 | 0.9716 | 0.9758 |
| Hydrogen, wt% | 11.50 | 11.59 | 11.62 | 11.58 | 11.48 |
| Carbon, wt% | 86.83 | 87.23 | 87.26 | 87.28 | 86.80 |
| Sulfur, wt% | 0.34 | 0.29 | 0.31 | 0.32 | 0.34 |
| Oxygen, wt% | 0.90 | 0.43 | 0.30 | 0.41 | 0.72 |
| Nitrogen, wt% | 0.42 | 0.42 | 0.41 | 0.41 | 0.42 |
| Total Basic Nitrogen, wt% | 0.14 | 0.14 | 0.14 | 0.14 | 0.14 |
| Nickel, wtppm | 14 | 14 | 14 | 14 | 14 |
| Vanadium, wtppm | 4 | 4 | 4 | 4 | 4 |
| Iron, wtppm | 32 | 3 | 10 | 7 | 18 |
| Sodium, wtppm | --- | 9 | | | |
| Potassium, wtppm | --- | 84 | 60 | 90 | 147 |
| Calcium, wtppm | --- | 26 | 31 | 30 | 29 |
| Zinc, wtppm | | 9 | 4 | 3 | 5 |
| Micro-Carbon Residue, wt% | 7.4 | 7.2 | 7.2 | 7.3 | 7.9 |
| C₅ Asphaltenes, wt% | 5.5 | 4.1 | 4.0 | 4.1 | 5.0 |
| VGO, wt% | | 41.7 | 41.3 | 41.3 | 40.8 |
| Residue, wt% | 37.8 | 41.9 | 41.7 | 42.4 | 43.2 |
| P-Value | 5 | 5 | 5 | 5 | 5 |
| Hydrogen Uptake, Nm³/M³ | --- | -1.0 | 1.9 | -2.4 | -8.9 |
| Viscosity at 37.8 °C (100 °F), cSt | 6830 | 4600 | 4240 | 5156 | 7576 |

FIG. 18

Table 6

| Property | Crude Feed | Crude Product | Crude Feed | Crude Product | Crude Product |
|---|---|---|---|---|---|
| Example Number | 6 | 6 | 19 | 19 | 19 |
| LHSV, h$^{-1}$ | ---- | 1 | ---- | 12.3 | 20.7 |
| TAN | 10.3 | 0.42 | 9.3 | 4 | 5.4 |
| API Gravity | 13.2 | 12.5 | 13.8 | 14.5 | 14.3 |
| Density at 15.56 °C (60 °F), g/cm$^3$ | 0.9776 | 0.9824 | 0.9740 | 0.9695 | 0.9709 |
| Hydrogen, wt% | 11.54 | 11.71 | 11.50 | 44.68 | 11.58 |
| Carbon, wt% | 86.89 | 87.28 | 86.83 | 87.28 | 86.99 |
| Sulfur, wt% | 0.31 | 0.23 | 0.34 | 0.28 | 0.30 |
| Oxygen, wt% | 0.90 | 0.34 | --- | 0.42 | 0.72 |
| Nitrogen, wt% | 0.38 | 0.39 | 0.42 | 0.41 | 0.41 |
| Nickel, ppm | 13.7 | 10.7 | 13.5 | 12.8 | 13.2 |
| Vanadium, ppm | 3.4 | 2.9 | 3.7 | 3.3 | 3.5 |
| Sodium, wtppm | 37 | 24 | 37 | 20 | 34 |
| Calcium, wtppm | 72 | --- | 72 | 52 | 50 |
| Zinc, wtppm | 46 | --- | 46 | <0.4 | <0.4 |
| Potassium, wtppm | 320 | --- | 310 | 183 | 203 |
| Micro - Carbon Residue, wt% | 7.2 | 6.7 | 7.4 | 7.1 | 7.2 |
| C$_5$ Asphaltenes, wt% | 4.8 | 4.8 | 5.5 | 4.6 | 4.6 |
| Distillate, wt% | 17.6 | 17.8 | ---- | 18.33 | 17.97 |
| VGO, wt% | 44.6 | 44.1 | ---- | 41.8 | 41.8 |
| Residue, wt% | 37.8 | 37.8 | 37.8 | 38.6 | 39.4 |
| Viscosity at 37.8 °C (100 °F), cSt | 6880 | 3893 | 6830 | 3774 | 4276 |

*FIG. 19*

Table 7

| Property | Crude Feed | Crude Product | Crude Feed | Crude Product |
|---|---|---|---|---|
| Example Number | 6 | 6 | 20 | 20 |
| TAN | 10.3 | 0.42 | 9.3 | 0.7 |
| API Gravity | 13.2 | 12.5 | 13.8 | 14.7 |
| Density at 15.56 °C (60 °F), g/cm$^3$ | 0.9776 | 0.9824 | 0.9740 | 0.9678 |
| Hydrogen, wt% | 11.54 | 11.71 | 11.50 | 11.68 |
| Carbon, wt% | 86.89 | 87.28 | 86.8 | 87.42 |
| Sulfur, wt% | 0.31 | 0.23 | 0.34 | 0.24 |
| Oxygen, wt% | 0.90 | 0.34 | --- | 0.20 |
| Nitrogen, wt% | 0.38 | 0.39 | 0.42 | 0.40 |
| Nickel, ppm | 13.7 | 10.7 | 13.5 | 10.9 |
| Vanadium, ppm | 3.4 | 2.9 | 3.7 | 3.3 |
| Iron, ppm | 19 | 2.5 | 32 | 13 |
| Sodium, wtppm | 37 | 24 | 37 | 9.8 |
| Potassium, wtppm | 320 | --- | 310 | 175 |
| Micro-Carbon Residue, wt% | 7.2 | 6.7 | 7.4 | 6.8 |
| C$_5$ Asphaltenes, wt% | 4.8 | 4.8 | 5.5 | 3.9 |
| Distillate, wt% | 17.6 | 17.8 | --- | 17.8 |
| VGO, wt% | 44.6 | 44.1 | --- | 42.8 |
| Residue, wt% | 37.8 | 37.8 | 37.8 | 40.1 |
| P-Value | 5 | 5 | 5 | 5 |
| Viscosity at 37.8 °C (100 °F), cSt | 6880 | 3893 | 6830 | 3781 |

FIG. 20

Table 8

| Property | Crude Feed | Crude Product 1175 hours | Crude Product 5207 hours |
|---|---|---|---|
| Example Number | 21 | 21 | 21 |
| TAN | 3.7 | 0.44 | 0.27 |
| API Gravity | 15.0 | 15.9 | 15.7 |
| Density at 15.56 °C (60 °F), g/cm3 | 0.9659 | 0.9600 | 0.9616 |
| Hydrogen, wt% | 11.4 | 11.5 | 11.49 |
| Carbon, wt% | 87.1 | 87.4 | 87.34 |
| Sulfur, wt% | 0.43 | 0.43 | 0.396 |
| Oxygen, wt% | 0.42 | 0.3 | 0.31 |
| Nitrogen, wt% | 0.52 | 0.52 | 0.51 |
| Total Basic Nitrogen, wt% | 0.16 | 0.17 | 0.16 |
| Nickel, wtppm | 12.4 | 12.7 | 13 |
| Vanadium, wtppm | 19.2 | 20.6 | 21 |
| Iron, wtppm | 10.4 | 1.1 | 1.4 |
| Calcium, wtppm | 5.4 | 0.6 | 0.4 |
| Sodium, wtppm | 117 | 0.8 | 1.1 |
| Zinc, wtppm | 2.5 | 0.9 | 0.9 |
| Potassium, wtppm | 46 | 1.5 | 1.7 |
| Copper, wtppm | 1.0 | 0.8 | 2.9 |
| Chromium, wtppm | 0.2 | 0.4 | 0.2 |
| Silicon, wtppm | 2.6 | 0.8 | 0.3 |
| Magnesium, wtppm | 0.2 | 0.2 | 0.2 |
| Micro-Carbon Residue, wt% | 8.3 | 8.1 | 8.0 |
| C5 Asphaltenes, wt% | 7.4 | 6.5 | 6.6 |
| Distillate wt% | 15.6 | 20.9 | 19.7 |
| VGO wt% | 39.6 | 40.7 | 40.7 |
| Residue, wt% | 38.8 | 37.1 | 38 |
| Viscosity at 37.8 °C (100 °F), cSt | 1224 | 1014 | 1066 |

FIG. 21

Table 9

| Property | Crude Feed | Crude Product 286 Hours | Comparative Example 213 Hours |
|---|---|---|---|
| Example Number | 21 and 22 | 21 | 22 |
| TAN | 9.7 | 0.26 | 0.8 |
| API Gravity | 13.2 | 21.2 | 23.97 |
| Density at 15.56 °C (60 °F), g/cm³ | 0.9776 | 0.9265 | 0.9101 |
| Hydrogen, wt% | 11.54 | 11.8 | 12.05 |
| Carbon, wt% | 86.89 | 87.38 | 87.2 |
| Sulfur, wt% | 0.31 | 0.18 | 0.101 |
| Oxygen, wt% | 0.90 | 0.24 | 0.35 |
| Nitrogen, wt% | 0.38 | 0.24 | 0.27 |
| Total Basic Nitrogen, wt% | 0.14 | 0.15 | 0.07 |
| Nickel, wtppm | 13.7 | 2.9 | 4.1 |
| Vanadium, wtppm | 3.4 | 0.6 | 0.9 |
| Iron, wtppm | 19 | 2.3 | 2.1 |
| Sodium, wtppm | 37 | 0.2 | 1.1 |
| Silicon | 41 | 0.7 | 2.2 |
| Magnesium | 1.5 | 0.1 | 0.2 |
| Potassium | 24 | 0.2 | 1.2 |
| Zinc | 53 | 6.4 | 0.7 |
| Calcium | 29 | 2.2 | 1.6 |
| Chromium | 0.2 | 0.1 | 0.2 |
| Copper | 0.9 | 0.5 | 0.5 |
| Sediment, wt% | ---- | 0.0013 | 0.19 |
| Micro-Carbon Residue, wt% | 7.2 | 3.8 | 3.2 |
| $C_5$ Asphaltenes, wt% | 4.8 | 2.2 | 2.4 |
| $C_7$ Asphaltenes, wt% | 5.3 | 1.1 | 1.5 |
| Distillate wt% | 17.6 | 38.6 | 50.8 |
| VGO wt% | 44.6 | 41.0 | 36 |
| Residue, wt% | 37.8 | 20.4 | 13.2 |
| Viscosity at 37.8 °C (100 °F), cSt | 6880 | 30.5 | 14.3 |

FIG. 22

Table 10

| Property | Crude Feed | Crude Product | | | |
|---|---|---|---|---|---|
| Example No. | | 25 | 25 | 25 | 27 |
| Contact Time, hours | | 603 | 1803 | 2952 | 671 |
| Temperature, °C | | 385 | 400 | 410 | 400 |
| Pressure, MPa | | 13.8 | 6.9 | 3.8 | 3.8 |
| API Gravity | 7.9 | 19.6 | 17.3 | 14.44 | 16.1 |
| Density at 15.56 °C (60 °F), g/cm³ | 1.0149 | 0.9363 | 0.9508 | 0.9696 | 0.9588 |
| Hydrogen, wt% | 10.109 | 11.68 | 11.13 | Not Determined (ND) | ND |
| Carbon, wt% | 81.987 | 86.57 | 85.78 | ND | ND |
| Sulfur, wt% | 6.687 | 1.28 | 2.59 | 4.3 | 3.25 |
| Oxygen, wt% | 0.62 | 0.464 | 0.19 | 0.38 | --- |
| Nitrogen, wt% | 0.366 | 0.256 | 0.36 | 0.376 | 0.365 |
| Nickel, wtppm | 70 | 10.1 | 25 | 62 | 49 |
| Iron, ppm | 2.4 | 0.1 | 0.2 | 0.2 | 0.2 |
| Vanadium, wtppm | 205 | 17.5 | 56 | 189 | 115 |
| Calcium, wtppm | 6.7 | 2.3 | 2.3 | 4.1 | 0.2 |
| Molybdenum, wtppm | 6.6 | 0.4 | 0.3 | 0.4 | 0.5 |
| Micro-Carbon Residue, wt% | 12.5 | 5.6 | 7.9 | 10.7 | 8.3 |
| C₅ Asphaltenes, wt% | 16.2 | 3.4 | 6 | 8.6 | 6.0 |
| C₇ Asphaltenes, wt% | 10.9 | 2.3 | 4 | 6.8 | 4.4 |
| Distillate, wt% | | 28.37 | 28.37 | 30.7 | 34.4 |
| VGO, wt% | | 29.32 | 39.32 | 41.8 | 44.2 |
| Residue, wt% | 60 | 29 | 22.56 | 27.5 | 20.2 |
| P-Value | | 2.2 | 1.2 | 1.2 | --- |
| Viscosity at 37.8 °C (100 °F), cSt | 8357 | 129 | 71.2 | 74.4 | 53.1 |
| Sediment | --- | 0.004 | 0.007 | 4.3 | 4.3 |
| Hydrogen Consumption, Nm³/m³ | | 144 | 90 | 35 | --- |

FIG. 23

*Table 11*

| Property | Crude Feed | Crude Product | | |
|---|---|---|---|---|
| Example No. | BC-10 | 29 | 31 | 33 |
| API Gravity | 15.1 | 23 | 22.8 | 23.1 |
| Density at 15.56 °C (60 °F), g/cm³ | 0.9651 | 0.9156 | 0.9168 | 0.9153 |
| Hydrogen, wt% | 11.47 | 12.354 | 12.261 | 12.291 |
| Carbon, wt% | 87.085 | 87.346 | 87.238 | 87.567 |
| Sulfur, wt% | 0.433 | 0.0293 | 0.0915 | 0.03660 |
| Oxygen, wt% | 0.42 | 0.058 | 0.136 | 0.031 |
| Nitrogen, wt% | 0.522 | 0.266 | 0.278 | 0.266 |
| Total Basic Nitrogen, wt% | 0.1611 | 0.0665 | 0.0915 | 0.0754 |
| Nickel, wtppm | 12.4 | 6.1 | 8.2 | 6 |
| Vanadium, wtppm | 19.2 | 4.7 | 7.6 | 4.4 |
| Iron, wtppm | 10.4 | 0.3 | | |
| Sodium, wtppm | 117 | | | |
| Micro-Carbon Residue, wt% | 8.5 | 3.7 | 5.1 | 3.7 |
| C₅ Asphaltenes, wt% | 7.4 | 3.7 | 5.1 | 3.6 |
| C₇ Asphaltenes, wt% | 3.4 | 2.6 | 3.6 | 2.6 |
| Distillate, wt% | | 31.2 | 32 | 31.5 |
| VGO, wt% | | 40.2 | 37 | 40.1 |
| Residue, wt% | 43.3 | 24.1 | 25.5 | 23.5 |
| P-Value | | 1.4 | 1.8 | 1.4 |
| Viscosity at 37.8 °C (100 °F), cSt | 1705 | 45 | 48.7 | 41.8 |
| Hydrogen Consumption, Nm/m³ | | 100 | 80 | 92 |

*FIG. 24*

Table 12

| Property | Crude Feed | Crude Product |
|---|---|---|
| Example No. | Kuwait Long Residue | 35 |
| API Gravity | 12.9 | |
| Density at 15.56 °C (60 °F), g/cm³ | 0.9797 | 0.9055 |
| Hydrogen, wt% | 10.987 | |
| Carbon, wt% | 84.146 | |
| Sulfur, wt% | 3.88 | .2716 |
| Nitrogen, wt% | 0.252 | .0941 |
| Total Basic Nitrogen, wt% | 0.0566 | 0.0210 |
| Nickel, wtppm | 16.9 | 3.9 |
| Vanadium, wtppm | 58 | 7.1 |
| Iron, wtppm | 2.1 | --- |
| Micro-Carbon Residue, wt% | 12.8 | 3.2 |
| C₅ Asphaltenes, wt% | 9.2 | 2.4 |
| C₇ Asphaltenes, wt% | 5.4 | 1.5 |
| Distillate, wt% | | 20.0 |
| VGO, wt% | 49.7 | 53.4 |
| Residue, wt% | | 24.3 |
| P-Value | | 1.2 |
| Viscosity at 37.8 °C (100 °F), cSt | 669.4 | 63.5 |

FIG. 25

METHODS FOR PRODUCING A CRUDE PRODUCT

RELATED APPLICATION

The present application claims the benefit of the filing date of U.S. Provisional patent application Ser. No. 60/850,109 filed Oct. 6, 2006, the disclosure of which is incorporated herein by reference.

FIELD OF THE INVENTION

The present invention generally relates to systems, methods, and catalysts for treating hydrocarbon feeds, and to compositions that can be produced using such systems, methods, and catalysts. More particularly, certain embodiments described herein relate to systems, methods, and catalysts for conversion of a hydrocarbon feed to a total product, wherein the total product includes a crude product that is a liquid mixture at 25° C. and 0.101 MPa and has one or more properties that are changed relative to the respective property of the hydrocarbon feed.

DESCRIPTION OF RELATED ART

Crudes that have one or more unsuitable properties that do not allow the crudes to be economically transported, or processed using conventional facilities, are commonly referred to as "disadvantaged crudes".

Disadvantaged crudes may include acidic components that contribute to the total acid number ("TAN") of the crude feed. Disadvantaged crudes with a relatively high TAN may contribute to corrosion of metal components during transporting and/or processing of the disadvantaged crudes. Removal of acidic components from disadvantaged crudes may involve chemically neutralizing acidic components with various bases. Alternately, corrosion-resistant metals may be used in transportation equipment and/or processing equipment. The use of corrosion-resistant metal often involves significant expense, and thus, the use of corrosion-resistant metal in existing equipment may not be desirable. Another method to inhibit corrosion may involve addition of corrosion inhibitors to disadvantaged crudes before transporting and/or processing of the disadvantaged crudes. The use of corrosion inhibitors may negatively affect equipment used to process the crudes and/or the quality of products produced from the crudes.

Disadvantaged crudes often contain relatively high levels of residue. Disadvantaged crudes having such high levels of residue tend to be difficult and expensive to transport and/or process using conventional facilities.

Disadvantaged crudes may include relatively high amounts of metal contaminants, for example, nickel, vanadium, and/or iron. During processing of such crudes, metal contaminants and/or compounds of metal contaminants, may deposit on a surface of the catalyst or in the void volume of the catalyst. Such deposits may cause a decline in the activity of the catalyst.

Coke may form and/or deposit on catalyst surfaces at a rapid rate during processing of disadvantaged crudes. It may be costly to regenerate the catalytic activity of a catalyst contaminated with coke. High temperatures used during regeneration may also diminish the activity of the catalyst and/or cause the catalyst to deteriorate.

Disadvantaged crudes may include metals in metal salts of organic acids (for example, calcium, potassium and/or sodium). Metals in metal salts of organic acids are not typically separated from disadvantaged crudes by conventional processes, for example, desalting and/or acid washing.

Processes are often encountered in conventional processes when metals in metal salts of organic acids are present. In contrast to nickel and vanadium, which typically deposit near the external surface of the catalyst, metals in metal salts of organic acids may deposit preferentially in void volumes between catalyst particles, particularly at the top of the catalyst bed. The deposit of contaminants, for example, metals in metal salts of organic acids, at the top of the catalyst bed, generally results in an increase in pressure drop through the bed and may effectively plug the catalyst bed. Moreover, the metals in metal salts of organic acids may cause rapid deactivation of catalysts.

Disadvantaged crudes often contain organically bound heteroatoms (for example, sulfur, oxygen, and nitrogen). Organically bound heteroatoms may, in some situations, have an adverse effect on catalysts.

Disadvantaged crudes may include organic oxygen compounds. Treatment facilities that process disadvantaged crudes with an oxygen content of at least 0.002 grams of oxygen per gram of disadvantaged crude may encounter problems during processing. Organic oxygen compounds, when heated during processing, may form higher oxidation compounds (for example, ketones and/or acids formed by oxidation of alcohols, and/or acids formed by oxidation of ethers) that are difficult to remove from the treated crude and/or may corrode/contaminate equipment during processing and cause plugging in transportation lines.

Disadvantaged crudes may include basic nitrogen compounds (for example, pyridine, quinolines, isoquinolines, benzoquinolines, pyrroles, carbazoles, benzocarbazoles, and homologs thereof. Basic nitrogen compounds may have adverse effects on catalysts used in cracking processes, thus reducing the efficiency of the cracking operation. Basic nitrogen compounds, when heated during processing, may form high molecular weight compounds that contribute to gum formation in operating units.

Disadvantaged crudes may include hydrogen deficient hydrocarbons. When processing of hydrogen deficient hydrocarbons, consistent quantities of hydrogen generally need to be added, particularly if unsaturated fragments resulting from cracking processes are produced. Hydrogenation during processing, which typically involves the use of an active hydrogenation catalyst, may be needed to inhibit unsaturated fragments from forming coke. Hydrogen is costly to produce and/or costly to transport to treatment facilities.

Disadvantaged crudes also tend to exhibit instability during processing in conventional facilities. Crude instability tends to result in phase separation of components during processing and/or formation of undesirable by-products (for example, hydrogen sulfide, water, and carbon dioxide).

Conventional processes often lack the ability to change a selected property in a disadvantaged crude without also significantly changing other properties in the disadvantaged crude. For example, conventional processes often lack the ability to significantly reduce TAN in a disadvantaged crude while, at the same time, only changing by a desired amount the content of certain components (such as sulfur or metal contaminants) in the disadvantaged crude.

Some processes for improving the quality of crude include adding a diluent to disadvantaged crudes to lower the weight percent of components contributing to the disadvantaged properties. Adding diluent, however, generally increases costs of treating disadvantaged crudes due to the costs of diluent and/or increased costs to handle the disadvantaged crudes. Addition of diluent to a disadvantaged crude may, in some situations, decrease stability of such crude.

U.S. Pat. No. 6,554,994 to Reynolds et al.; U.S. Pat. No. 6,547,957 to Sudhakar et al.; U.S. Pat. No. 6,436,280 to Harle et al.; U.S. Pat. No. 6,277,269 to Meyers et al.; U.S. Pat. No. 6,162,350 to Soled et al.; U.S. Pat. No. 6,063,266 to Grande et al.; U.S. Pat. No. 5,928,502 to Bearden et al.; U.S. Pat. No. 5,928,501 to Sudhakar et al.; U.S. Pat. No. 5,914,030 to Bearden et al.; U.S. Pat. No. 5,897,769 to Trachte et al.; U.S. Pat. No. 5,871,636 to Trachte et al.; and U.S. Pat. No. 5,851,381 to Tanaka et al.; U.S. Pat. No. 5,322,617 to de Bruijn et al.; U.S. Pat. No. 4,992,163 to Aldridge et al.; U.S. Pat. No. 4,937,222 to Angevine et al.; U.S. Pat. No. 4,886,594 to Miller; U.S. Pat. No. 4,746,419 to Peck et al.; U.S. Pat. No. 4,548,710 to Simpson; U.S. Pat. No. 4,525,472 to Morales et al.; U.S. Pat. No. 4,457,836 to Seiver et al.; U.S. Pat. No. 4,499,203 to Toulhoat et al.; U.S. Pat. No. 4,389,301 to Dahlberg et al.; U.S. Pat. No. 4,191,636 to Fukui et al.; U.S. Published Patent Application Nos. 20050133414 through 20050133418 to Bhan et al.; 20050139518 through 20050139522 to Bhan et al.; 20050145543 to Bhan et al.; 20050150818 to Bhan et al.; 20050155908 to Bhan et al.; 20050167320 to Bhan et al.; 20050167324 through 20050167332 to Bhan et al.; 20050173301 through 20050173303 to Bhan et al., 20060060510 to Bhan; and U.S. patent application Ser. Nos. 11/400,542; 11/400,294; 11/399,843; 11/400,628; and 11/400,295, all entitled "Systems, Methods, and Catalysts for Producing a Crude Product" and all filed Apr. 7, 2006; Ser. Nos. 11/425,979; 11/425,983; 11/425,985 to Bhan all entitled "Systems, Methods, and Catalysts for Producing a Crude Product" and all filed Jun. 6, 2006 describe various processes, systems, and catalysts for processing crudes.

In sum, disadvantaged crudes generally have undesirable properties (for example, relatively high residue content, a tendency to become unstable during treatment, and/or a tendency to consume relatively large amounts of hydrogen during treatment). Other undesirable properties include relatively high amounts of undesirable components (for example, residue, organically bound heteroatoms, metal contaminants, metals in metal salts of organic acids, and/or organic oxygen compounds). Such properties tend to cause problems in conventional transportation and/or treatment facilities, including increased corrosion, decreased catalyst life, process plugging, and/or increased usage of hydrogen during treatment. Thus, there is a significant economic and technical need for improved systems, methods, and/or catalysts for conversion of disadvantaged crudes into crude products with more desirable properties. There is also a significant economic and technical need for systems, methods, and/or catalysts that can change selected properties in a disadvantaged crude while only selectively changing other properties in the disadvantaged crude.

SUMMARY OF THE INVENTION

Inventions described herein generally relate to systems, methods, and catalyst for conversion of a hydrocarbon feed to a total product comprising a crude product and, in some embodiments, non-condensable gas. Inventions described herein also generally relate to compositions that have novel combinations of components therein. Such compositions can be obtained by using the systems and methods described herein.

In some embodiments, the invention describes a method of producing a crude product, that includes contacting a hydrocarbon feed with one or more catalysts to produce a total product that includes the crude product, wherein the crude product is a liquid mixture at 25° C. and 0.101 MPa, the hydrocarbon feed having a molybdenum content of at least 0.1 wtppm of molybdenum, the hydrocarbon feed having a Ni/V/Fe content of at least 10 wtppm, at least one of the catalysts comprising one or more metals from Columns 6-10 of the Periodic Table and/or one or more compounds of one or more metals from Columns 6-10 of the Periodic Table, and the Columns 6-10 metals catalyst having a pore size distribution with a median pore diameter of up to 150 angstroms; and controlling contacting conditions at a temperature of at least 300° C., a partial pressure of hydrogen of at most 7 MPa, and a LHSV of at least 0.1 $h^{-1}$ to produce the crude product, the crude product having a molybdenum content of at most 90% of the molybdenum content of the hydrocarbon feed and a Ni/V/Fe content between 80% and 120% of the Ni/V/Fe content of the hydrocarbon feed, wherein molybdenum and Ni/V/Fe contents are as determined by ASTM Method D5708 and median pore diameter is as determined by ASTM Method D4284.

In some embodiments, the invention describes a method of producing a crude product that includes contacting a hydrocarbon feed with one or more catalysts to produce a total product that includes the crude product, wherein the crude product is a liquid mixture at 25° C. and 0.101 MPa, the hydrocarbon feed having, per gram of hydrocarbon feed, a total Ni/V/Fe content of at least 0.00002 grams, and a total $C_5$ and $C_7$ asphaltene content of at least 0.01 grams, and at least one of the catalysts comprising one or more metals from Columns 6-10 of the Periodic Table, and/or one or more compounds of one or more metals from Columns 6-10 of the Periodic Table; and controlling contacting conditions at a temperature of at least 300° C., a partial pressure of hydrogen of at most 7 MPa, and a LHSV of at least 0.1 $h^{-1}$ to produce the crude product, the crude product having a Ni/V/Fe content between 80% and 120% of the Ni/V/Fe content of the hydrocarbon feed and a total $C_5$ and $C_7$ asphaltene content of at most 90% of the hydrocarbon feed $C_5$ and $C_7$ asphaltene content, wherein the $C_5$ and $C_7$ asphaltenes content is a sum of the $C_5$ asphaltenes as determined by ASTM Method D2007 and $C_7$ asphaltenes as determined by ASTM Method D3279.

In some embodiments, the invention describes a method of producing a crude product that includes contacting a hydrocarbon feed with one or more catalysts to produce a total product that includes the crude product, wherein the crude product is a liquid mixture at 25° C. and 0.101 MPa, the hydrocarbon feed having, per gram of hydrocarbon feed, a total Ni/V/Fe content of at least 0.00002 grams, and viscosity of at least 10 cSt at 37.8° C. and at least one of the catalysts comprising one or more metals from Column 6 of the Periodic Table, and/or one or more compounds of one or more metals from Column 6 of the Periodic Table; and controlling contacting conditions at a temperature of at least 300° C., a partial pressure of hydrogen of at most 7 MPa, and a LHSV of at least 0.1 $h^{-1}$ to produce the crude product, the crude product having a Ni/V/Fe content between 80% and 120% of the Ni/V/Fe content of the hydrocarbon feed and a viscosity at 37.8° C. of at most 50% of the viscosity of the hydrocarbon feed at 37.8° C., wherein viscosity is as determined by ASTM Method D445.

In some embodiments, the invention describes a method of producing a crude product that includes contacting a hydrocarbon feed with one or more catalysts to produce a total product that includes the crude product, wherein the crude product is a liquid mixture at 25° C. and 0.101 MPa, the hydrocarbon feed having, per gram of hydrocarbon feed, a total Ni/V/Fe content of at least 0.00002 grams, and a total residue content of at least 0.1 grams, and at least one of the catalysts comprising one or more metals from Columns 6-10 of the Periodic Table, and/or one or more compounds of one or more metals from Columns 6-10 of the Periodic Table; and controlling contacting conditions at a temperature of at least 300° C., a partial pressure of hydrogen of at most 7 MPa, and a LHSV of at least 0.1 h$^{-1}$ to produce the crude product, the crude product having a Ni/V/Fe content between 80% to 120% of the Ni/V/Fe content of the hydrocarbon feed and a residue content of at most 90% of the hydrocarbon feed residue content, wherein Ni/V/Fe content is as determined by ASTM Method D5708 and residue content is as determined by ASTM Method D5307.

In some embodiments, the invention describes a method of producing a crude product that includes contacting a hydrocarbon feed with one or more catalysts positioned in one or more contacting zones of a fixed bed reactor to produce a total product that includes the crude product, wherein the crude product is a liquid mixture at 25° C. and 0.101 MPa, the hydrocarbon feed having, per gram of hydrocarbon feed, a total residue content of at least 0.1 grams, and at least one of the catalysts comprising one or more metals from Column 6 of the Periodic Table, and/or one or more compounds of one or more metals from Column 6 of the Periodic Table; and controlling contacting conditions at a temperature of at least 300° C., a partial pressure of hydrogen of at most 7 MPa, and a LHSV of at least 0.1 h$^{-1}$ to produce the crude product, the crude product a residue content of at most 90% of the hydrocarbon feed residue content.

In some embodiments, the invention provides a hydrocarbon composition that includes per gram of hydrocarbon composition: at least 0.001 grams of hydrocarbons with a boiling range distribution between 38° C. and 200° C. at 0.101 MPa; at least 0.001 grams of hydrocarbons with a boiling range distribution between 204° C. and 343° C. at 0.101 MPa; at least 0.001 grams of hydrocarbons with a boiling range distribution between 343° C. and 650° C. at 0.101 MPa; at least 0.001 grams of hydrocarbons with an initial boiling point of at least 650° C. at 0.101 MPa; at least 0.000150 grams of Ni/V/Fe; and at most 0.01 grams of $C_5$ asphaltenes.

In some embodiments, the invention describes a method of producing a crude product that includes contacting a hydrocarbon feed with one or more catalysts to produce a total product that includes the crude product, wherein the crude product is a liquid mixture at 25° C. and 0.101 MPa, the hydrocarbon feed having a viscosity of at least 10 cSt at 37.8° C.; at least one of the catalysts comprises one or more metals from Columns 6-10 of the Periodic Table and/or one or more compounds of one or more metals from Columns 6-10 of the Periodic Table; and controlling contacting conditions at a temperature from 370° C. to 450° C., a partial pressure of hydrogen of at most 7 MPa, and an liquid hourly space velocity (LHSV) of at least 0.1 h$^{-1}$ to produce the crude product, the crude product having a viscosity at 37.8° C. of at most 50% of the viscosity of the hydrocarbon feed at 37.8° C., and wherein a P-value of a hydrocarbon feed/total product mixture is at least 1.0 during contacting, wherein viscosity is as determined by ASTM Method D445 and P-Value is as determined by ASTM Method D7060.

In some embodiments, the invention describes a method of treating a hydrocarbon feed that includes contacting a hydrocarbon feed with hydrogen in the presence of one or more catalysts to produce a total product that includes the crude product, wherein the crude product is a liquid mixture at 25° C. and 0.101 MPa and the hydrocarbon feed has a viscosity of at least 10 cSt at 37.8° C.; and controlling contacting conditions at a partial pressure of hydrogen of at most 7 MPa and a temperature of at most 450° C. such that a P-value of a hydrocarbon feed/total product mixture remains at least 1.0, a total consumption of hydrogen is at most 80 Nm$^3$/m$^3$, and the crude product has a viscosity of at most 50% at 37.8° C. of the hydrocarbon feed viscosity, wherein viscosity is as determined by ASTM Method D445 and P-Value is as determined by ASTM Method D7060.

In some embodiments, the invention describes a system for treating a hydrocarbon feed that includes an upstream contacting system comprising one or more catalysts, at least one of the catalysts comprising one or more metals from Column 6-10 of the Periodic Table, and/or one or more compounds of one or more metals from Column 6-10 of the Periodic Table; wherein contacting a first feed having a viscosity of at least 100 cSt at 37.8° C., with one or more of the catalysts in the upstream contacting system at a temperature of at least 300° C., a partial pressure of hydrogen of at most 7 MPa, and a LHSV of at least 0.1 h$^{-1}$ produces a crude product having a viscosity at 37.8° C. of at most 50% of the viscosity of the first feed at 37.8° C.; and a downstream contacting system coupled to the upstream contacting system and configured to receive and process a feed exiting the upstream contacting system, wherein the downstream contacting system is configured to subject the feed exciting the upstream contacting system to a cracking process.

In some embodiments, the invention describes a system for treating a hydrocarbon feed comprising: an upstream contacting system comprising one or more catalysts, at least one of the catalysts comprising one or more metals from Column 6 of the Periodic Table, and/or one or more compounds of one or more metals from Column 6 of the Periodic Table; wherein contacting a first feed having a viscosity of at least 100 cSt at 37.8° C., with one or more of the catalysts in the upstream contacting system at a temperature of at least 300° C., a partial pressure of hydrogen of at most 7 MPa, and a LHSV of at least 0.1 h$^{-1}$ produces a crude product having a viscosity at 37.8° C. of at most 50% of the viscosity of the first feed at 37.8° C.; and a downstream contacting system coupled to the upstream contacting system and configured to receive and process a feed exiting the upstream contacting system, wherein the downstream contacting system comprises a deasphalting unit.

In some embodiments, the invention describes a system producing a crude product that comprising. an upstream contacting system comprising one or more catalysts, at least one of the upstream catalysts comprising, per gram of catalyst, 0.0001 grams to 0.1 grams of one or more metals from Column 6 of the Periodic Table and/or one or more compounds of one or more metals from Column 6 of the Periodic Table, wherein contact of a hydrocarbon feed having a molybdenum content of at least 0.1 wtppm of molybdenum and at least 0.1 grams of residue per gram of hydrocarbon feed, with one or more of the catalysts in the upstream contacting system at a temperature of at most 450° C. and 7 MPa produces a hydrocarbon feed/total product mixture, the hydrocarbon feed/total product mixture having a molybdenum content of at most 90% of the molybdenum of the hydrocarbon feed; and a downstream contacting zone coupled to the upstream contacting zone, the downstream contacting zone configured to receive the hydrocarbon feed/total product mixture, the downstream contacting system comprising one or more catalysts, at least one of the downstream catalysts comprising, per gram of catalyst, at least 0.1 grams of one or more metals from Columns 6-10 of the Periodic Table and/or one or more compounds of one or more metals from Columns 6-10 of the Periodic Table, the Columns 6-10 catalyst having a pore size distribution with a median pore diameter of between 50 angstrom and 150 angstrom, wherein contact of the hydrocarbon feed/total product mixture at a temperature of at most 450° C. and 7 MPa produces a total product that includes a crude product, wherein the crude product is a liquid mixture at 25° C. and 0.101 MPa and the crude product has a molybdenum content of at most 90% of the molybdenum content of the hydrocarbon feed and at most 90% of the residue content of the hydrocarbon feed. The invention also provides a method of producing a crude product with molybdenum reduction using said system.

In some embodiments, the invention produces a hydrocarbon composition that includes at least 0.1 wtppm of molybdenum; at least 0.01 grams of hydrocarbons having a boiling range distribution between 38° C. and 200° C. per gram of hydrocarbon composition; and at least 0.1 grams of hydrocarbons having a boiling range distribution between 343° C. and 650° C. per gram of hydrocarbon composition.

In some embodiments, the invention provides a method of producing a crude product, that includes contacting a hydrocarbon feed with one or more catalysts to produce a total product that includes the crude product, wherein the crude product is a liquid mixture at 25° C. and 0.101 MPa, the hydrocarbon feed having a basic nitrogen content of at least 0.0001 grams per gram of hydrocarbon feed, at least one of the catalysts has at least 0.01 grams of one or more metals from Column 6 of the Periodic Table and/or one or more compounds of one or more metals from Column 6 of the Periodic Table per gram of catalyst, the Column 6 metal catalyst having a pore size distribution with median pore diameter of between 50 angstroms and 180 angstroms; controlling contacting conditions at a pressure of at least 3 MPa and a temperature of at least 300° C. to produce the crude product, the crude product having a basic nitrogen content of at most 90% of the basic nitrogen content of the hydrocarbon feed.

In some embodiments, the invention provides a method of producing a crude product, that includes contacting a hydrocarbon feed with one or more catalysts to produce a total product that includes the crude product, wherein the crude product is a liquid mixture at 25° C. and 0.101 MPa; the hydrocarbon feed has a residue content of at least 0.1 grams per gram of hydrocarbon feed; and at least one of the catalysts is obtainable by combining: a supported catalyst; one or more metals from Column 6 of the Periodic Table and/or one or more compounds of one or more metals from Column 6 of the Periodic Table; and a support; and controlling contacting conditions at a partial pressure of hydrogen of at least 3 MPa and a temperature of least 200° C. to produce the crude product; the crude product having a residue content of at most 90% of the residue content of the hydrocarbon feed.

In some embodiments, the invention provides a method of producing a crude product that includes contacting a hydrocarbon feed with one or more catalysts to produce a total product that includes the crude product, wherein the crude product is a liquid mixture at 25° C. and 0.101 MPa; the hydrocarbon feed has a micro-carbon residue (MCR) content of at least 0.0001 grams per gram of hydrocarbon feed; and at least one of the catalysts has: one or more metals from Column 6 of the Periodic Table and/or one or more compounds of one or more metals from Column 6 of the Periodic Table; and one or more metals from Columns 9-10 of the Periodic Table and/or one or more compounds of one or more metals from Columns 9-10 of the Periodic Table; and controlling contacting conditions at a partial pressure of hydrogen of at least 3 MPa and a temperature of at least 200° C. to produce the crude product, the crude product having a MCR content of at most 90% of the MCR content of the hydrocarbon feed, wherein MCR content is as determined by ASTM Method D4530.

In some embodiments, the invention provides a method of producing a crude product that includes providing one or more catalysts to a contacting zone, wherein at least one of the catalysts is a Column 6 metal catalyst, wherein the Column 6 metal catalyst is produced by the method comprising: combining one or more metals from Column 6 of the Periodic Table and/or one or more compounds of one or more metals from Column 6 of the Periodic Table with a support to form a mixture; and heating the mixture to a temperature of at most 200° C. to form a dried Column 6 metal catalyst; contacting a hydrocarbon feed with the dried Column 6 metal catalyst to produce a total product that includes the crude product, wherein the crude product is a liquid mixture at 25° C. and 0.101 MPa; wherein the hydrocarbon feed has a residue content of at least 0.1 grams per gram of hydrocarbon feed, and wherein contact of the hydrocarbon feed with the dried catalyst at least partially sulfides the catalyst; and controlling contacting conditions at a partial pressure of hydrogen of at least 3 MPa and a temperature of at least 200° C. such that the crude product has a residue content of at most 90% of the residue content of the hydrocarbon feed.

In some embodiments, the invention provides a method of producing a crude product that includes contacting a hydrocarbon feed with one or more catalysts to produce a total product that includes the crude product, wherein the crude product is a liquid mixture at 25° C. and 0.101 MPa; the hydrocarbon feed has a residue content of at least 0.1 grams per gram of hydrocarbon feed; and at least one of the catalysts has at most 0.1 grams, per gram of catalyst, of: one or more metals from Column 6 of the Periodic Table and/or one or more compounds of one or more metals from Column 6 of the Periodic Table; and one or more metals from Columns 9-10 of the Periodic Table and/or one or more compounds of one or more metals from Columns 9-10 of the Periodic Table, and a pore size distribution with a median pore diameter between 50 Å and 120 Å; and controlling contacting conditions at a partial pressure of hydrogen of at least 3 MPa and a temperature of at least 200° C. to produce the crude product, the crude product having a residue content of at most 90% of the residue content of the hydrocarbon feed.

In some embodiments, the invention provides a method of producing a crude product that includes contacting a crude feed with one or more catalysts to produce a total product that includes the crude product, wherein the crude product is a liquid mixture at 25° C. and 0.101 MPa; the crude feed having a residue content of at least 0.1 grams per gram of crude feed; and wherein at least one of the catalysts has, per gram of catalyst, at least 0.3 grams of: one or more metals from Columns 6-10 of the Periodic Table and/or one or more compounds of one or more metals from Columns 6-10 of the Periodic Table; and a binder; and controlling contacting conditions at a partial pressure of hydrogen of at least 3 MPa and a temperature of at least 200° C. such that the crude product has a residue content of at most 90% of the residue content of the hydrocarbon feed.

In some embodiments, the invention describes a method of producing a crude product that includes contacting a hydrocarbon feed with one or more catalysts to produce a total product that includes the crude product, wherein the crude product is a liquid mixture at 25° C. and 0.101 MPa; the hydrocarbon feed has a residue content of at least 0.1 grams per gram of hydrocarbon feed; and at least one of the catalysts is obtainable by combining: a mineral oxide having an average particle diameter of at most 500 micrometers; one or more metals from Column 6 of the Periodic Table and/or one or more compounds of one or more metals from Column 6 of the Periodic Table; and a support; and controlling contacting conditions at a partial pressure of hydrogen of least 3 MPa and a temperature of least 200° C. to produce the crude product; the crude product having a residue content of at most 90% of the residue content of the hydrocarbon feed.

In some embodiments, the invention provides a method of producing a crude product that includes contacting a hydrocarbon feed with one or more catalysts to produce a total product that includes the crude product, wherein the crude product is a liquid mixture at 25° C. and 0.101 MPa; the hydrocarbon feed has a viscosity of at least 10 cSt at 37.8° C.; and at least one of the catalysts is obtainable by combining: a mineral oxide fines; one or more metals from Column 6 of the Periodic Table and/or one or more compounds of one or more metals from Column 6 of the Periodic Table; and a support; and controlling contacting conditions at a partial pressure of hydrogen of at most 7 MPa and a temperature of at most 500° C. to produce the crude product; the crude product having a viscosity content of at most 50% of the hydrocarbon feed viscosity.

In some embodiments, the invention provides a catalyst that includes a support, mineral oxides, and one or more metals from Column 6 of the Periodic Table and/or one or more compounds of one or more metals from Column 6 of the Periodic Table, wherein the catalyst has a pore size distribution with a median pore diameter of at least 80 Å and the catalyst is obtainable by combining: a mineral oxide fines; the one or more of metals from Column 6 of the Periodic Table and/or the one or more compounds of one or more metals from Column 6 of the Periodic Table; and a support.

In further embodiments, features from specific embodiments may be combined with features from other embodiments. For example, features from one embodiment may be combined with features from any of the other embodiments.

In further embodiments, crude products are obtainable by any of the methods and systems described herein.

In further embodiments, additional features may be added to the specific embodiments described herein.

BRIEF DESCRIPTION OF THE DRAWINGS

Advantages of the present invention will become apparent to those skilled in the art with the benefit of the following detailed description and upon reference to the accompanying drawings in which:

FIG. 5 is a schematic of an embodiment of a blending zone in combination with a contacting system.

FIG. 6 is a schematic of an embodiment of a combination of a separation zone, a contacting system, and a blending zone.

FIG. 8 is a tabulation of representative properties of crude feed and crude product for an embodiment of contacting the crude feed with three catalysts.

FIG. 10 is a tabulation of representative properties of crude feed and crude product for an embodiment of contacting the crude feed with two catalysts.

FIG. 11 is another tabulation of representative properties of crude feed and crude product for an embodiment of contacting the crude feed with two catalysts.

FIG. 12 is a tabulation of crude feed and crude products for embodiments of contacting crude feeds with four different catalyst systems.

FIG. 18 is a tabulation of representative properties of crude feed and crude products for embodiments of contacting the crude feed with catalyst systems that include various amounts of a molybdenum catalyst and a vanadium catalyst, with a catalyst system that include a vanadium catalyst and a molybdenum/vanadium catalyst, and with glass beads.

FIG. 19 is a tabulation of properties of crude feed and crude products for embodiments of contacting crude feeds with one or more catalysts at various liquid hourly space velocities.

FIG. 20 is a tabulation of properties of crude feeds and crude products for embodiments of contacting the crude feeds at various contacting temperatures.

FIG. 21 is a tabulation of crude feed and crude products for embodiments of contacting the crude feed for greater than 500 hours.

FIG. 22 is a tabulation of crude feed and crude products for embodiments of contacting the crude feed with a molybdenum catalyst.

FIG. 23 is a tabulation of hydrocarbon feed and crude product for embodiments of contacting the hydrocarbon feed with two catalysts.

FIG. 24 is a tabulation of hydrocarbon feed and crude product for embodiments of contacting the hydrocarbon feed with two catalysts.

FIG. 25 is a tabulation of hydrocarbon feed and crud product for an embodiment of contacting the hydrocarbon feed with a dried catalyst.

Figure 1:
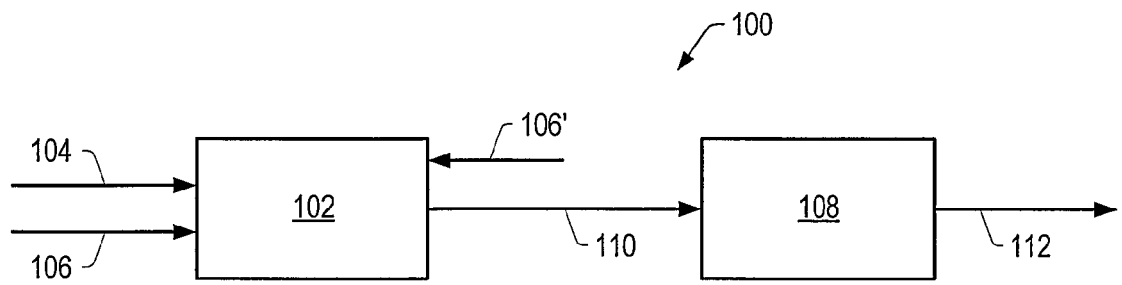
FIG. 1 is a schematic of an embodiment of a contacting system.

While the invention is susceptible to various modifications and alternative forms, specific embodiments thereof are shown by way of example in the drawings. The drawings may not be to scale. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Certain embodiments of the inventions are described herein in more detail. Terms used herein are defined as follows.

"ASTM" refers to American Standard Testing and Materials.

"API gravity" refers to API gravity at 15.5° C. (60° F.). API gravity is as determined by ASTM Method D6822.

Atomic hydrogen percentage and atomic carbon percentage of the hydrocarbon feed and the crude product are as determined by ASTM Method D5291.

Boiling range distributions for the hydrocarbon feed, the total product, and/or the crude product are as determined by ASTM Method D5307 unless otherwise mentioned.

"$C_5$ asphaltenes" refers to asphaltenes that are insoluble in n-pentane. $C_5$ asphaltenes content is as determined by ASTM Method D2007.

"$C_7$ asphaltenes" refers to asphaltenes that are insoluble in n-heptane. $C_7$ asphaltenes content is as determined by ASTM Method D3279.

"Column X metal(s)" refers to one or more metals of Column X of the Periodic Table and/or one or more compounds of one or more metals of Column X of the Periodic Table, in which X corresponds to a column number (for example, 1-12) of the Periodic Table. For example, "Column 6 metal(s)" refers to one or more metals from Column 6 of the Periodic Table and/or one or more compounds of one or more metals from Column 6 of the Periodic Table.

"Column X element(s)" refers to one or more elements of Column X of the Periodic Table, and/or one or more compounds of one or more elements of Column X of the Periodic Table, in which X corresponds to a column number (for example, 13-18) of the Periodic Table. For example, "Column 15 element(s)" refers to one or more elements from Column 15 of the Periodic Table and/or one or more compounds of one or more elements from Column 15 of the Periodic Table.

In the scope of this application, weight of a metal from the Periodic Table, weight of a compound of a metal from the Periodic Table, weight of an element from the Periodic Table, or weight of a compound of an element from the Periodic Table is calculated as the weight of metal or the weight of element. For example, if 0.1 grams of $MoO_3$ is used per gram of catalyst, the calculated weight of the molybdenum metal in the catalyst is 0.067 grams per gram of catalyst.

"Content" refers to the weight of a component in a substrate (for example, a hydrocarbon feed, a total product, or a crude product) expressed as weight fraction or weight percentage based on the total weight of the substrate. "Wtppm" refers to parts per million by weight.

"Crude feed" refers to a crude and/or disadvantaged crude that is to be treated herein.

"Crude feed/total product mixture" or "hydrocarbon feed/total product" refers to the mixture that contacts the catalyst during processing.

"Distillate" refers to hydrocarbons with a boiling range distribution between 204° C. (400° F.) and 343° C. (650° F.) at 0.101 MPa. Distillate content is as determined by ASTM Method D5307.

"Heteroatoms" refers to oxygen, nitrogen, and/or sulfur contained in the molecular structure of a hydrocarbon. Heteroatoms content is as determined by ASTM Methods E385 for oxygen, D5762 for total nitrogen, and D4294 for sulfur.

"Total basic nitrogen" refers to nitrogen compounds that have a pKa of less than 40. Basic nitrogen ("bn") is as determined by ASTM Method D2896.

"Hydrocarbon feed" refers to a feed that includes hydrocarbons. Hydrocarbon feed may include, but is not limited to, crudes, disadvantaged crudes, hydrocarbons obtained from refinery processes, or mixtures thereof. Examples of hydrocarbon feed obtained from refinery processes include, but are not limited to, long residue, short residue, vacuum residue, hydrocarbons boiling above 538° C. (1000° F.), or mixtures thereof.

"Hydrogen source" refers to hydrogen, and/or a compound and/or compounds that when in the presence of a hydrocarbon feed and the catalyst react to provide hydrogen to compound(s) in the hydrocarbon feed. A hydrogen source may include, but is not limited to, hydrocarbons (for example, $C_1$ to $C_4$ hydrocarbons such as methane, ethane, propane, and butane), water, or mixtures thereof. A mass balance may be conducted to assess the net amount of hydrogen provided to the compound(s) in the hydrocarbon feed.

"Flat plate crush strength" refers to compressive force needed to crush a catalyst. Flat plate crush strength is as determined by ASTM Method D4179.

"LHSV" refers to a volumetric liquid feed rate per total volume of catalyst and is expressed in hours ($h^{-1}$). Total volume of catalyst is calculated by summation of all catalyst volumes in the contacting zones, as described herein.

"Liquid mixture" refers to a composition that includes one or more compounds that are liquid at standard temperature and pressure (25° C., 0.101 MPa, hereinafter referred to as "STP"), or a composition that includes a combination of one of more compounds that are liquid at STP with one or more compounds that are solids at STP.

"Periodic Table" refers to the Periodic Table as specified by the International Union of Pure and Applied Chemistry (IUPAC), November 2003.

"Metals in metal salts of organic acids" refer to alkali metals, alkaline-earth metals, zinc, arsenic, chromium, or combinations thereof. A content of metals in metal salts of organic acids is as determined by ASTM Method D1318.

"Micro-Carbon Residue" ("MCR") content refers to a quantity of carbon residue remaining after evaporation and pyrolysis of a substrate. MCR content is as determined by ASTM Method D4530.

"Molybdenum content in the hydrocarbon feed" refers to the content of molybdenum in the feed. The molybdenum content includes the amount of inorganic molybdenum and organomolybdenum in the feed. Molybdenum content in the hydrocarbon feed is as determined by ASTM Method D5807.

"Naphtha" refers to hydrocarbon components with a boiling range distribution between 38° C. (100° F.) and 200° C. (392° F.) at 0.101 MPa. Naphtha content is as determined by ASTM Method D5307.

"Ni/V/Fe" refers to nickel, vanadium, iron, or combinations thereof.

"Ni/V/Fe content" refers to the content of nickel, vanadium, iron, or combinations thereof. The Ni/V/Fe content includes inorganic nickel, vanadium and iron compounds and/or organonickel, organovanadium, and organoiron compounds. The Ni/V/Fe content is as determined by ASTM Method D5708.

"$Nm^3/m^3$" refers to normal cubic meters of gas per cubic meter of hydrocarbon feed.

"Non-carboxylic containing organic oxygen compounds" refers to organic oxygen compounds that do not have a carboxylic ($-CO_2-$) group. Non-carboxylic containing organic oxygen compounds include, but are not limited to, ethers, cyclic ethers, alcohols, aromatic alcohols, ketones, aldehydes, or combinations thereof, which do not have a carboxylic group.

"Non-condensable gas" refers to components and/or mixtures of components that are gases at STP.

"P (peptization) value" or "P-value" refers to a numeral value, which represents the flocculation tendency of asphaltenes in the hydrocarbon feed. P-Value is as determined by ASTM Method D7060.

"Pore diameter", "median pore diameter", and "pore volume" refer to pore diameter, median pore diameter, and pore volume, as determined by ASTM Method D4284 (mercury porosimetry at a contact angle equal to 140°). A micromeritics® A9220 instrument (Micromeritics Inc., Norcross, Ga., U.S.A.) may be used to determine these values.

"Organometallic" refers to compound that includes an organic compound bonded or complexed with a metal of the Periodic Table. "Organometallic content" refers to the total content of metal in the organometallic compounds. Organometallic content is as determined by ASTM Method D5807.

"Residue" refers to components that have a boiling range distribution above 538° C. (1000° F.), as determined by ASTM Method D5307.

"Sediment" refers to impurities and/or coke that are insoluble in the hydrocarbon feed/total product mixture. Sediment is as determined by ASTM Method D4807. Sediment may also be determined by the Shell Hot Filtration Test ("SHFST") as described by Van Kemoort et al. in the Jour. Inst. Pet., 1951, pages 596-604.

"SCFB" refers to standard cubic feet of gas per barrel of hydrocarbon feed.

"Surface area" of a catalyst is as determined by ASTM Method D3663.

"TAN" refers to a total acid number expressed as milligrams ("mg") of KOH per gram ("g") of sample. TAN is as determined by ASTM Method D664.

"Used catalyst" refers to one or more catalysts that have been contacted with a hydrocarbon feed. A used catalyst includes, but is not limited to, a catalyst that has been contacted with a hydrocarbon feed and which has undergone further treatment (for example, regenerated catalysts).

"VGO" refers to hydrocarbons with a boiling range distribution between 343° C. (650° F.) and 538° C. (1000° F.) at 0.101 MPa. VGO content is as determined by ASTM Method D5307.

"Viscosity" refers to kinematic viscosity at 37.8° C. (100° F.). Viscosity is as determined using ASTM Method D445.

In the context of this application, it is to be understood that if the value obtained for a property of the substrate tested is outside of limits of the test method, the test method may be modified and/or recalibrated to test for such property.

Crudes may be produced and/or retorted from hydrocarbon containing formations and then stabilized. Crudes are generally solid, semi-solid, and/or liquid. Crudes may include crude oil. Stabilization may include, but is not limited to, removal of non-condensable gases, water, salts, or combinations thereof from the crude to form a stabilized crude. Such stabilization may often occur at, or proximate to, the production and/or retorting site.

Stabilized crudes typically have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of components per gram of crude. Examples of stabilized crudes include whole crudes, topped crudes, desalted crudes, desalted topped crudes, or combinations thereof. "Topped" refers to a crude that has been treated such that at least some of the components that have a boiling point below 35° C. at 0.101 MPa (95° F. at 1 atm) have been removed. Typically, topped crudes will have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged. Disadvantaged crudes may be unacceptable to a transportation carrier and/or a treatment facility, thus imparting a low economic value to the disadvantaged crude. The economic value may be such that a reservoir that includes the disadvantaged crude that is deemed too costly to produce, transport, and/or treat.

Properties of disadvantaged crudes may include, but are not limited to: a) TAN of at least 0.1, at least 0.3, or at least 1; b) viscosity of at least 10 cSt; c) API gravity at most 19, at most 15, or at most 10; d) a total Ni/V/Fe content of at least 0.00002 grams or at least 0.0001 grams of Ni/V/Fe per gram of crude; e) a total heteroatoms content of at least 0.005 grams of heteroatoms per gram of crude; f) a residue content of at least 0.01 grams of residue per gram of crude; g) a $C_5$ asphaltenes content of at least 0.04 grams of $C_5$ asphaltenes per gram of crude; h) a MCR content of at least 0.002 grams of MCR per gram of crude; i) a content of metals in metal salts of organic acids of at least 0.00001 grams of metals per gram of crude; or j) combinations thereof. In some embodiments, disadvantaged crude may include, per gram of disadvantaged crude, at least 0.2 grams of residue, at least 0.3 grams of residue, at least 0.5 grams of residue, or at least 0.9 grams of residue. In some embodiments, the disadvantaged crude may have a TAN in a range from 0.1 or 0.3 to 20, 0.3 or 0.5 to 10, or 0.4 or 0.5 to 5. In certain embodiments, disadvantaged crudes, per gram of disadvantaged crude, may have a sulfur content of at least 0.005, at least 0.01, or at least 0.02 grams.

In some embodiments, disadvantaged crudes have properties including, but not limited to: a) TAN of at least 0.5 or at least 1; b) an oxygen content of at least 0.005 grams of oxygen per gram of disadvantaged crude; c) a $C_5$ asphaltenes content of at least 0.04 grams of $C_5$ asphaltenes per gram of disadvantaged crude; d) a higher than desired viscosity (for example, >10 cSt for a hydrocarbon feed with API gravity of at least 5; e) a content of metals in metal salts of organic acids of at least 0.00001 grams of metals per gram of crude; or f) combinations thereof.

In some embodiments, disadvantaged crudes have properties including, but not limited to: a) a basic nitrogen content of at least 0.0001 grams of basic nitrogen compounds per gram of disadvantaged crude; b) a molybdenum content of at least 0.1 wtppm; c) a residue content of at least 0.3 grams of residue per gram of disadvantaged crude; or d) combinations thereof.

Disadvantaged crudes may include, per gram of disadvantaged crude: at least 0.001 grams, at least 0.005 grams, or at least 0.01 grams of hydrocarbons with a boiling range distribution between 95° C. and 200° C. at 0.101 MPa; at least 0.01 grams, at least 0.005 grams, or at least 0.001 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

Disadvantaged crudes may include, per gram of disadvantaged crude: at least 0.001 grams, at least 0.005 grams, or at least 0.01 grams of hydrocarbons with a boiling range distribution of at most 100° C. at 0.101 MPa; at least 0.001 grams, at least 0.005 grams, or at least 0.01 grams of hydrocarbons with a boiling range distribution between 100° C. and 200° C. at 0.101 MPa; at least 0.001 grams, at least 0.005 grams, or at least 0.01 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

Some disadvantaged crudes may include, per gram of disadvantaged crude, at least 0.001 grams, at least 0.005 grams, or at least 0.01 grams of hydrocarbons with a boiling range distribution of at most 100° C. at 0.101 MPa, in addition to higher boiling components. Typically, the disadvantaged crude has, per gram of disadvantaged crude, a content of such hydrocarbons of at most 0.2 grams or at most 0.1 grams.

Some disadvantaged crudes may include, per gram of disadvantaged crude, at least 0.001 grams, at least 0.005 grams, or at least 0.01 grams of hydrocarbons with a boiling range distribution of at least 200° C. at 0.101 MPa.

Some disadvantaged crudes may include, per gram of disadvantaged crude, at least 0.001 grams, at least 0.005 grams, or at least 0.01 grams of hydrocarbons with a boiling range distribution of at least 650° C.

Examples of disadvantaged crudes that might be treated using the processes described herein include, but are not limited to, crudes from of the following regions of the world: U.S. Gulf Coast and southern California, Canada Tar sands, Brazilian Santos and Campos basins, Egyptian Gulf of Suez, Chad, United Kingdom North Sea, Angola Offshore, Chinese Bohai Bay, Venezuelan Zulia, Malaysia, and Indonesia Sumatra.

Treatment of disadvantaged crudes may enhance the properties of the disadvantaged crudes such that the crudes are acceptable for transportation and/or treatment.

The crude feed may be topped, as described herein. The crude product resulting from treatment of the crude feed, as described herein, is generally suitable for transporting and/or treatment. Properties of the crude product produced as described herein are closer to the corresponding properties of West Texas Intermediate crude than the crude feed, or closer to the corresponding properties of Brent crude, than the crude feed, thereby enhancing the economic value of the crude feed. Such crude product may be refined with less or no pre-treatment, thereby enhancing refining efficiencies. Pre-treatment may include desulfurization, demetallization, and/or atmospheric distillation to remove impurities.

Treatment of a hydrocarbon feed in accordance with inventions described herein may include contacting the hydrocarbon feed with the catalyst(s) in a contacting zone and/or combinations of two or more contacting zones. In a contacting zone, at least one property of a hydrocarbon feed may be changed by contact of the hydrocarbon feed with one or more catalysts relative to the same property of the hydrocarbon feed. In some embodiments, contacting is performed in the presence of a hydrogen source. In some embodiments, the hydrogen source is one or more hydrocarbons that under certain contacting conditions react to provide relatively small amounts of hydrogen to compound(s) in the hydrocarbon feed.

FIG. 1 is a schematic of contacting system 100 that includes an upstream contacting zone 102. The hydrocarbon feed enters upstream contacting zone 102 via hydrocarbon feed conduit 104. A contacting zone may be a reactor, a portion of a reactor, multiple portions of a reactor, or combinations thereof. Examples of a contacting zone include a stacked bed reactor, a fixed bed reactor, an ebullating bed reactor, a continuously stirred tank reactor ("CSTR"), a fluidized bed reactor, a spray reactor, and a liquid/liquid contactor. In certain embodiments, the contacting system is on or coupled to an offshore facility. Contact of the hydrocarbon feed with the catalyst(s) in contacting system 100 may be a continuous process or a batch process.

The contacting zone may include one or more catalysts (for example, two catalysts). In some embodiments, contact of the hydrocarbon feed with a first catalyst of the two catalysts may reduce TAN of the hydrocarbon feed. Subsequent contact of the reduced TAN hydrocarbon feed with the second catalyst decreases heteroatoms content and increases API gravity. In other embodiments, TAN, viscosity, Ni/V/Fe content, heteroatoms content, residue content, API gravity, or combinations of these properties of the crude product change by at least 10% relative to the same properties of the hydrocarbon feed after contact of the hydrocarbon feed with one or more catalysts.

In certain embodiments, a volume of catalyst in the contacting zone is in a range from 10-60 vol %, 20-50 vol %, or 30-40 vol % of a total volume of hydrocarbon feed in the contacting zone. In some embodiments, a slurry of catalyst and hydrocarbon feed may include from 0.001-10 grams, 0.005-5 grams, or 0.01-3 grams of catalyst per 100 grams of hydrocarbon feed in the contacting zone.

Contacting conditions in the contacting zone may include, but are not limited to, temperature, pressure, hydrogen source flow, hydrocarbon feed flow, or combinations thereof. Contacting conditions in some embodiments are controlled to produce a crude product with specific properties. Temperature in the contacting zone may range from 50° C. to 500° C., 60° C. to 440° C., 70° C. to 430° C., 80° C. to 420° C. In some embodiments, temperature in a contacting zone may range from 350° C. to 450° C., 360° C. to 44° C., 370° C. to 430° C., or from 380° C. to 410° C. LHSV of the hydrocarbon feed will generally range from 0.1 to 30 $h^{-1}$, 0.4 $h^{-1}$ to 25 $h^{-1}$ 0.5 to 20 $h^{-1}$, 1 to 15 $h^{-1}$, 1.5 to 10 $h^{-1}$, or 2 to 5 $h^{-1}$. In some embodiments, LHSV is at least 5 $h^{-1}$, at least 11 $h^{-1}$, at least 15 $h^{-1}$, or at least 20 $h^{-1}$. A partial pressure of hydrogen in the contacting zone may range from 0.1-8 MPa, 1-7 MPa, 2-6 MPa, or 3-5 MPa. In some embodiments, a partial pressure of hydrogen may be at most 7 MPa, at most 6 MPa, at most 5 MPa, at most 4 MPa, at most 3 MPa, or at most 3.5 MPa, or at most 2 MPa.

In embodiments in which the hydrogen source is supplied as a gas (for example, hydrogen gas), a ratio of the gaseous hydrogen source to the hydrocarbon feed typically ranges from 0.1-100,000 $Nm^3/m^3$, 0.5-10,000 $Nm^3/m^3$, 1-8,000 $Nm^3/m^3$, 2-5,000 $Nm^3/m^3$, 5-3,000 $Nm^3/m^3$, or 10-800 $Nm^3/m^3$ contacted with the catalyst(s). The hydrogen source, in some embodiments, is combined with carrier gas(es) and recirculated through the contacting zone. Carrier gas may be, for example, nitrogen, helium, and/or argon. The carrier gas may facilitate flow of the hydrocarbon feed and/or flow of the hydrogen source in the contacting zones(s). The carrier gas may also enhance mixing in the contacting zone(s). In some embodiments, a hydrogen source (for example, hydrogen, methane or ethane) may be used as a carrier gas and recirculated through the contacting zone.

The hydrogen source may enter upstream contacting zone 102 co-currently with the hydrocarbon feed in hydrocarbon feed conduit 104 or separately via gas conduit 106. In upstream contacting zone 102, contact of the hydrocarbon feed with a catalyst produces a total product that includes a crude product, and, in some embodiments, gas. In some embodiments, a carrier gas is combined with the hydrocarbon feed and/or the hydrogen source in conduit 106. The total product may exit upstream contacting zone 102 and enter downstream separation zone 108 via total product conduit 110.

In downstream separation zone 108, the crude product and gas may be separated from the total product using generally known separation techniques, for example, gas-liquid separation. The crude product may exit downstream separation zone 108 via crude product conduit 112, and then be transported to transportation carriers, pipelines, storage vessels, refineries, other processing zones, or a combination thereof. The gas may include gas formed during processing (for example, hydrogen sulfide, carbon dioxide, and/or carbon monoxide), excess gaseous hydrogen source, and/or carrier gas. The excess gas may be recycled to contacting system 100, purified, transported to other processing zones, storage vessels, or combinations thereof.

In some embodiments, contacting the hydrocarbon feed with the catalyst(s) to produce a total product is performed in two or more contacting zones. The total product may be separated to form the crude product and gas(es).

Figure 2A:
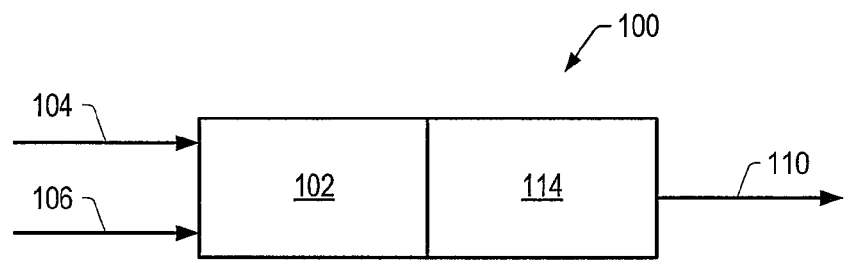
FIGS. 2A and 2B are schematics of embodiments of contacting systems that include two contacting zones.
Figure 2B:
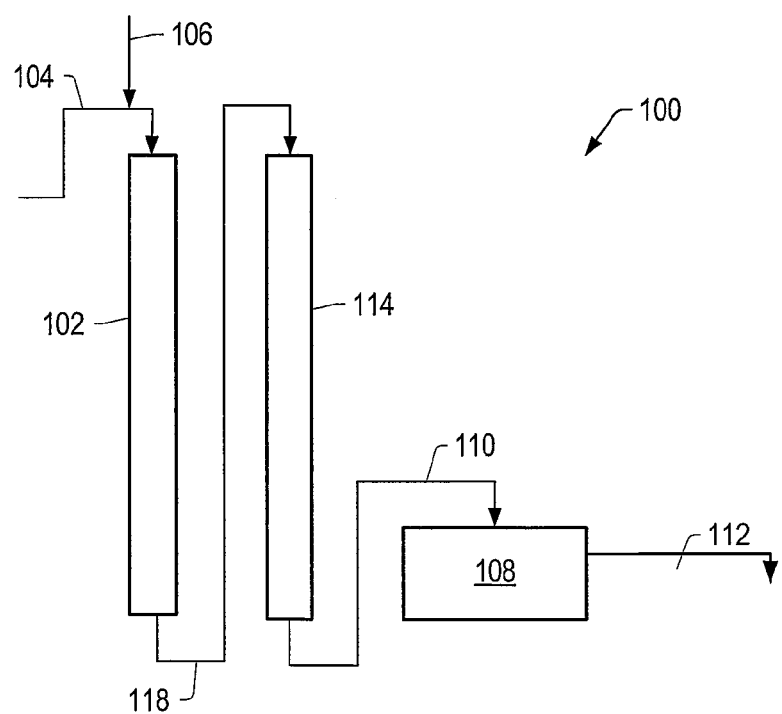
Figure 3A:
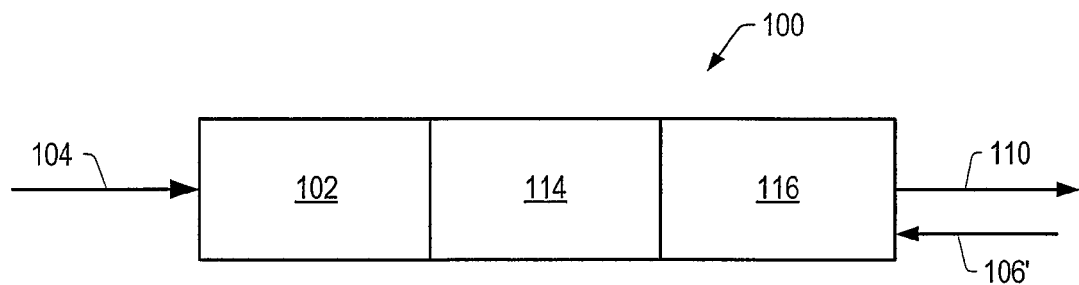
FIGS. 3A and 3B are schematics of embodiments of contacting systems that include three contacting zones.
Figure 3B:
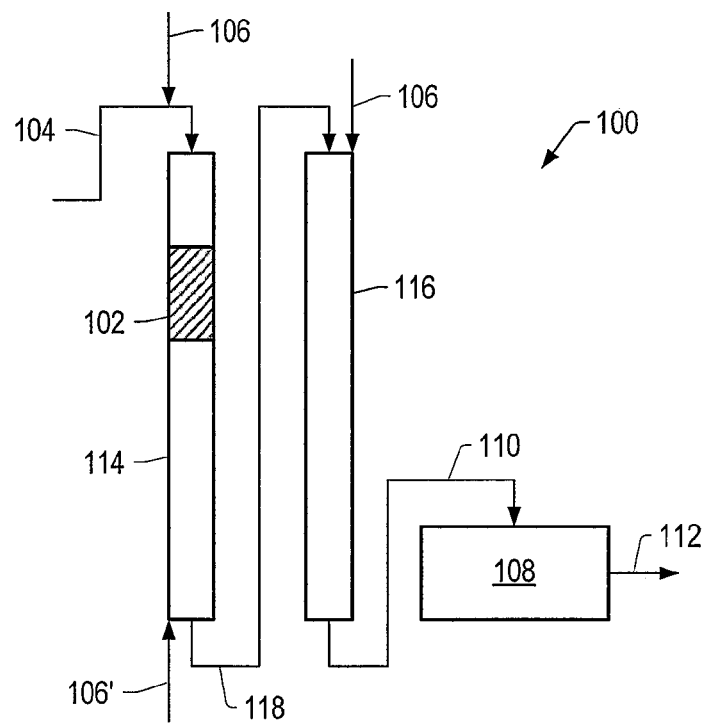

FIGS. 2-3 are schematics of embodiments of contacting system 100 that includes two or three contacting zones. In FIGS. 2A and 2B, contacting system 100 includes upstream contacting zone 102 and downstream contacting zone 114. FIGS. 3A and 3B include contacting zones 102, 114, 116. In FIGS. 2A and 3A, contacting zones 102, 114, 116 are depicted as separate contacting zones in one reactor. The hydrocarbon feed enters upstream contacting zone 102 via hydrocarbon feed conduit 104.

In some embodiments, the carrier gas is combined with the hydrogen source in gas conduit 106 and is introduced into the contacting zones as a mixture. In certain embodiments, as shown in FIGS. 3A and 3B, the hydrogen source and/or the carrier gas may enter the one or more contacting zones with the hydrocarbon feed separately via gas conduit 106 and/or in a direction counter to the flow of the hydrocarbon feed via, for example, gas conduit 106'. Addition of the hydrogen source and/or the carrier gas counter to the flow of the hydrocarbon feed may enhance mixing and/or contact of the hydrocarbon feed with the catalyst.

Contact of the hydrocarbon feed with catalyst(s) in upstream contacting zone 102 forms a feed stream. The feed stream flows from upstream contacting zone 102 to downstream contacting zone 114. In FIGS. 3A and 3B, the feed stream flows from downstream contacting zone 114 to additional downstream contacting zone 116.

Contacting zones 102, 114, 116 may include one or more catalysts. As shown in FIG. 2B, the feed stream exits upstream contacting zone 102 via feed stream conduit 118 and enters downstream contacting zone 114. As shown in FIG. 3B, the feed stream exits downstream contacting zone 114 via conduit 118 and enters additional downstream contacting zone 116.

The feed stream may be contacted with additional catalyst(s) in downstream contacting zone 114 and/or additional downstream contacting zone 116 to form the total product. The total product exits downstream contacting zone 114 and/or additional downstream contacting zone 116 and enters downstream separation zone 108 via total product conduit 110. The crude product and/or gas is (are) separated from the total product. The crude product exits downstream separation zone 108 via crude product conduit 112.

Figure 4:
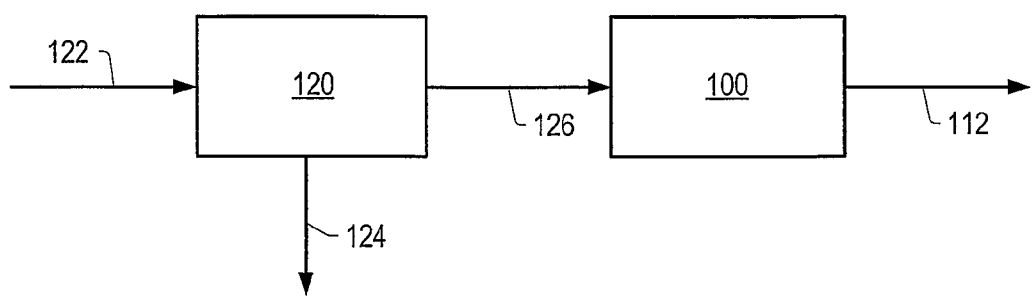
FIG. 4 is a schematic of an embodiment of a separation zone in combination with a contacting system.

FIG. 4 is a schematic of an embodiment of a separation zone upstream of contacting system 100. The disadvantaged crude (either topped or untopped) enters upstream separation zone 120 via crude conduit 122. In upstream separation zone 120, at least a portion of the disadvantaged crude is separated using techniques known in the art (for example, sparging, membrane separation, pressure reduction) to produce the hydrocarbon feed. For example, water may be at least partially separated from the disadvantaged crude. In another example, components that have a boiling range distribution below 95° C. or below 100° C. may be at least partially separated from the disadvantaged crude to produce the hydrocarbon feed. In some embodiments, at least a portion of naphtha and compounds more volatile than naphtha are separated from the disadvantaged crude. In some embodiments, at least a portion of the separated components exit upstream separation zone 120 via conduit 124.

The hydrocarbon feed obtained from upstream separation zone 120, in some embodiments, includes a mixture of components with a boiling range distribution of at least 100° C. or, in some embodiments, a boiling range distribution of at least 120° C. Typically, the separated hydrocarbon feed includes a mixture of components with a boiling range distribution between 100-1000° C., 120-900° C., or 200-800° C. At least a portion of the hydrocarbon feed exits upstream separation zone 120 and enters contacting system 100 (see, for example, the contacting zones in FIGS. 1-3) via additional hydrocarbon feed conduit 126 to be further processed to form a crude product. In some embodiments, upstream separation zone 120 may be positioned upstream or downstream of a desalting unit. After processing, the crude product exits contacting system 100 via crude product conduit 112.

In some embodiments, the crude product is blended with a crude that is the same as or different from the hydrocarbon feed. For example, the crude product may be combined with a crude having a different viscosity thereby resulting in a blended product having a viscosity that is between the viscosity of the crude product and the viscosity of the crude. In another example, the crude product may be blended with crude having a TAN that is different, thereby producing a product that has a TAN that is between the TAN of the crude product and the crude. The blended product may be suitable for transportation and/or treatment.

As shown in FIG. 5, in certain embodiments, hydrocarbon feed enters contacting system 100 via hydrocarbon feed conduit 104, and at least a portion of the crude product exits contacting system 100 via conduit 128 and is introduced into blending zone 130. In blending zone 130, at least a portion of the crude product is combined with one or more process streams (for example, a hydrocarbon stream such as naphtha produced from separation of one or more hydrocarbon feeds), a crude, a hydrocarbon feed, or mixtures thereof, to produce a blended product. The process streams, hydrocarbon feed, crude, or mixtures thereof are introduced directly into blending zone 130 or upstream of such blending zone via stream conduit 132. A mixing system may be located in or near blending zone 130. The blended product may meet product specifications designated by refineries and/or transportation carriers. Product specifications include, but are not limited to, a range of or a limit of API gravity, TAN, viscosity, or combinations thereof. The blended product exits blending zone 130 via blend conduit 134 to be transported or processed.

In FIG. 6, the disadvantaged crude enters upstream separation zone 120 through crude conduit 122, and the disadvantaged crude is separated as previously described to form the hydrocarbon feed. The hydrocarbon feed then enters contacting system 100 through additional hydrocarbon feed conduit 126. At least some components from the disadvantaged crude exit separation zone 120 via conduit 124. At least a portion of the crude product exits contacting system 100 and enters blending zone 130 through crude product conduit 128. Other process streams and/or crudes enter blending zone 130 directly or via stream conduit 132 and are combined with the crude product to form a blended product. The blended product exits blending zone 130 via blend conduit 134.

In some embodiments, the crude product and/or the blended product are transported to a refinery and distilled and/or fractionally distilled to produce one or more distillate fractions. The distillate fractions may be processed to produce commercial products such as transportation fuel, lubricants, or chemicals.

In some embodiments, after contact of the hydrocarbon feed with the catalyst, the crude product has a TAN of at most 90%, at most 50%, or at most 10% of the TAN of the hydrocarbon feed. In certain embodiments, the crude product has a TAN of at most 1, at most 0.5, at most 0.3, at most 0.2, at most 0.1, or at most 0.05. TAN of the crude product will frequently be at least 0.0001 and, more frequently, at least 0.001. In some embodiments, TAN of the crude product may be in a range from 0.001 to 0.5, 0.01 to 0.2, or 0.05 to 0.1. In some embodiments, TAN of the crude product may range from 0.001 to 0.5, 0.004 to 0.4, from 0.01 to 0.3, or from 0.1 to 0.2.

In some embodiments, the crude product has a total Ni/V/Fe content of at most 90%, at most 50%, at most 10%, at most 5%, or at most 3% of the Ni/V/Fe content of the hydrocarbon feed. In certain embodiments, the crude product has, per gram of crude product a total Ni/V/Fe content in a range from $1\times10^{-7}$ grams to $5\times10^{-5}$ grams, $3\times10^{-7}$ grams to $2\times10^{-5}$ grams, or $1\times10^{-6}$ grams to $1\times10^{-5}$ grams. In certain embodiments, the crude product has at most $2\times10^{-5}$ grams of Ni/V/Fe. In some embodiments, a total Ni/V/Fe content of the crude product is 70-130%, 80-120%, or 90-110% of the Ni/V/Fe content of the hydrocarbon feed.

In some embodiments, the crude product has a total molybdenum content of at most 90%, at most 50%, at most 10%, at most 5%, or at most 3% of the molybdenum content of the hydrocarbon feed. In certain embodiments, the crude product has a total molybdenum content ranging from 0.001 wtppm to 1 wtppm, from 0.005 wtppm to 0.05 wtppm, or from 0.01 to 0.1 wtppm.

In some embodiments, the crude product has a total content of metals in metal salts of organic acids of at most 90%, at most 50%, at most 10%, or at most 5% of the total content of metals in metal salts of organic acids in the hydrocarbon feed. Organic acids that generally form metal salts include, but are not limited to, carboxylic acids, thiols, imides, sulfonic acids, and sulfonates. Examples of carboxylic acids include, but are not limited to, naphthenic acids, phenanthrenic acids, and benzoic acid. The metal portion of the metal salts may include alkali metals (for example, lithium, sodium, and potassium), alkaline-earth metals (for example, magnesium, calcium, and barium), Column 12 metals (for example, zinc and cadmium), Column 15 metals (for example arsenic), Column 6 metals (for example, chromium), or mixtures thereof.

In certain embodiments, the crude product has a total content of metals in metal salts of organic acids, per gram of crude product, in a range from 0.0000001 grams to 0.00005 grams, 0.0000003 grams to 0.00002 grams, or 0.000001 grams to 0.00001 grams of metals in metal salt of organic acids per gram of crude product. In some embodiments, a total content of metals in metal salts of organic acids of the crude product is 70-130%, 80-120%, or 90-110% of the total content of metals in metal salts of organic acids in the hydrocarbon feed.

In certain embodiments, API gravity of the crude product produced from contact of the hydrocarbon feed with catalyst, at the contacting conditions, is 70-130%, 80-120%, 90-110%, or 100-130% of the API gravity of the hydrocarbon feed. In certain embodiments, API gravity of the crude product is from 14-40, 15-30, or 16-25.

In certain embodiments, the crude product has a viscosity of at most 90%, at most 80%, or at most 70% of the viscosity of the hydrocarbon feed. In some embodiments, the viscosity of the crude product is at most 90% of the viscosity of the hydrocarbon feed while the API gravity of the crude product is 70-130%, 80-120%, or 90-110% of the API gravity the hydrocarbon feed.

In some embodiments, the crude product has a total heteroatoms content of at most 90%, at most 50%, at most 10%, or at most 5% of the total heteroatoms content of the hydrocarbon feed. In certain embodiments, the crude product has a total heteroatoms content of at least 1%, at least 30%, at least 80%, or at least 99% of the total heteroatoms content of the hydrocarbon feed.

In some embodiments, the sulfur content of the crude product may be at most 90%, at most 50%, at most 10%, or at most 5% of the sulfur content of the crude product. In certain embodiments, the crude product has a sulfur content of at least 1%, at least 30%, at least 80%, or at least 99% of the sulfur content of the hydrocarbon feed. In some embodiments, the sulfur content of the crude product is 70-130%, 80-120%, or 90-110% of the sulfur content of the hydrocarbon feed.

In some embodiments, total nitrogen content of the crude product may be at most 90%, at most 80%, at most 10%, or at most 5% of a total nitrogen content of the hydrocarbon feed. In certain embodiments, the crude product has a total nitrogen content of at least 1%, at least 30%, at least 80%, or at least 99% of the total nitrogen content of the hydrocarbon feed.

In some embodiments, basic nitrogen content of the crude product may at most 95%, at most 90%, at most 50%, at most 10%, or at most 5% of the basic nitrogen content of the hydrocarbon feed. In certain embodiments, the crude product has a basic nitrogen content of at least 1%, at least 30%, at least 80%, or at least 99% of the basic nitrogen content of the hydrocarbon feed.

In some embodiments, the oxygen content of the crude product may be at most 90%, at most 50%, at most 30%, at most 10%, or at most 5% of the oxygen content of the hydrocarbon feed. In certain embodiments, the crude product has a oxygen content of at least 1%, at least 30%, at least 80%, or at least 99% of the oxygen content of the hydrocarbon feed. In some embodiments, the total content of carboxylic acid compounds of the crude product may be at most 90%, at most 50%, at most 10%, at most 5% of the content of the carboxylic acid compounds in the hydrocarbon feed. In certain embodiments, the crude product has a total content of carboxylic acid compounds of at least 1%, at least 30%, at least 80%, or at least 99% of the total content of carboxylic acid compounds in the hydrocarbon feed.

In some embodiments, selected organic oxygen compounds may be reduced in the hydrocarbon feed. In some embodiments, carboxylic acids and/or metal salts of carboxylic acids may be chemically reduced before non-carboxylic containing organic oxygen compounds. Carboxylic acids and non-carboxylic containing organic oxygen compounds in a crude product may be differentiated through analysis of the crude product using generally known spectroscopic methods (for example, infrared analysis, mass spectrometry, and/or gas chromatography).

The crude product, in certain embodiments, has an oxygen content of at most 90%, at most 80%, at most 70%, or at most 50% of the oxygen content of the hydrocarbon feed, and TAN of the crude product is at most 90%, at most 70%, at most 50%, or at most 40% of the TAN of the hydrocarbon feed. In certain embodiments, the crude product has an oxygen content of at least 1%, at least 30%, at least 80%, or at least 99% of the oxygen content of the hydrocarbon feed, and the crude product has a TAN of at least 1%, at least 30%, at least 80%, or at least 99% of the TAN of the hydrocarbon feed.

Additionally, the crude product may have a content of carboxylic acids and/or metal salts of carboxylic acids of at most 90%, at most 70%, at most 50%, or at most 40% of the hydrocarbon feed, and a content of non-carboxylic containing organic oxygen compounds within 70-130%, 80-120%, or 90-110% of the non-carboxylic containing organic oxygen compounds of the hydrocarbon feed.

In some embodiments, the crude product includes, in its molecular structures, from 0.05-0.15 grams or from 0.09-0.13 grams of hydrogen per gram of crude product. The crude product may include, in its molecular structure, from 0.8-0.9 grams or from 0.82-0.88 grams of carbon per gram of crude product. A ratio of atomic hydrogen to atomic carbon (H/C) of the crude product may be within 70-130%, 80-120%, or 90-110% of the atomic H/C ratio of the hydrocarbon feed. A crude product atomic H/C ratio within 10-30% of the hydrocarbon feed atomic H/C ratio indicates that uptake and/or consumption of hydrogen in the process is relatively small, and/or that hydrogen is produced in situ.

The crude product includes components with a range of boiling points. In some embodiments, the crude product includes, per gram of the crude product: at least 0.001 grams, or from 0.001-0.5 grams of hydrocarbons with a boiling range distribution of at most 100° C. at 0.101 MPa; at least 0.001 grams, or from 0.001-0.5 grams of hydrocarbons with a boiling range distribution between 100° C. and 200° C. at 0.101 MPa; at least 0.001 grams, or from 0.001-0.5 grams of hydrocarbons with a boiling range distribution between 200° C. and 300° C. at 0.101 MPa; at least 0.001 grams, or from 0.001-0.5 grams of hydrocarbons with a boiling range distribution between 300° C. and 400° C. at 0.101 MPa; and at least 0.001 grams, or from 0.001-0.5 grams of hydrocarbons with a boiling range distribution between 400° C. and 538° C. at 0.101 MPa.

In some embodiments the crude product includes, per gram of crude product, at least 0.001 grams of hydrocarbons with a boiling range distribution of at most 100° C. at 0.101 MPa and/or at least 0.001 grams of hydrocarbons with a boiling range distribution between 100° C. and 200° C. at 0.101 MPa.

In some embodiments, the crude product may have at least 0.001 grams, or at least 0.01 grams of naphtha per gram of crude product. In other embodiments, the crude product may have a naphtha content of at most 0.6 grams, or at most 0.8 grams of naphtha per gram of crude product.

In some embodiments, the crude product has a distillate content of 70-130%, 80-120%, or 90-110% of the distillate content of the hydrocarbon feed. The distillate content of the crude product may be, per gram of crude product, in a range from 0.00001-0.5 grams, 0.001-0.3 grams, or 0.002-0.2 grams.

In certain embodiments, the crude product has a VGO content of 70-130%, 80-120%, or 90-110% of the VGO content of the hydrocarbon feed. In some embodiments, the crude product has, per gram of crude product, a VGO content in a range from 0.00001-0.8 grams, 0.001-0.5 grams, 0.002-0.4 grams, or 0.001-0.3 grams.

In some embodiments, the crude product has a residue content of at most 90%, at most 80%, at most 50%, at most 30%, at most 20%, at most 10%, or at most 3% of the residue content of the hydrocarbon feed. In certain embodiments, the crude product has a residue content of 70-130%, 80-120%, or 90-110% of the residue content of the hydrocarbon feed. The crude product may have, per gram of crude product, a residue content in a range from 0.00001-0.8 grams, 0.0001-0.5 grams, 0.0005-0.4 grams, 0.001-0.3 grams, 0.005-0.2 grams, or 0.01-0.1 grams.

In some embodiments, the crude product has a total $C_5$ and $C_7$ asphaltenes content of at most 90%, at most 50%, at most 30%, or at most 10% of the total $C_5$ and $C_7$ asphaltenes content of the hydrocarbon feed. In certain embodiments, the hydrocarbon feed has, per gram of hydrocarbon feed, a total $C_5$ and $C_7$ asphaltenes content ranging from 0.001 grams to 0.2 grams, 0.01 to 0.15 grams, or 0.05 grams to 0.1 grams.

In certain embodiments, the crude product has a MCR content of 70-130%, 80-120%, or 90-110% of the MCR content of the hydrocarbon feed, while the crude product has a $C_5$ asphaltenes content of at most 90%, at most 80%, or at most 50% of the $C_5$ asphaltenes content of the hydrocarbon feed. In certain embodiments, the $C_5$ asphaltenes content of the hydrocarbon feed is at least 10%, at least 60%, or at least 70% of the $C_5$ asphaltenes content of the hydrocarbon feed while the MCR content of the crude product is within 10-30% of the MCR content of the hydrocarbon feed. In some embodiments, decreasing the $C_5$ asphaltenes content of the hydrocarbon feed while maintaining a relatively stable MCR content may increase the stability of the hydrocarbon feed/total product mixture.

In some embodiments, the $C_5$ asphaltenes content and MCR content may be combined to produce a mathematical relationship between the high viscosity components in the crude product relative to the high viscosity components in the hydrocarbon feed. For example, a sum of a hydrocarbon feed $C_5$ asphaltenes content and a hydrocarbon feed MCR content may be represented by S. A sum of a crude product $C_5$ asphaltenes content and a crude product MCR content may be represented by S'. The sums may be compared (S' to S) to assess the net reduction in high viscosity components in the hydrocarbon feed. S' of the crude product may be in a range from 1-99%, 10-90%, or 20-80% of S. In some embodiments, a ratio of MCR content of the crude product to $C_5$ asphaltenes content is in a range from 1.0-3.0, 1.2-2.0, or 1.3-1.9.

In certain embodiments, the crude product has an MCR content that is at most 90%, at most 80%, at most 50%, or at most 10% of the MCR content of the hydrocarbon feed. The crude product has, in some embodiments, from 0.0001-0.1 grams, 0.005-0.08 grams, or 0.01-0.05 grams of MCR per gram of crude product. In some embodiments, the crude product includes from greater than 0 grams, but less than 0.01 grams, 0.000001-0.001 grams, or 0.00001-0.0001 grams of total catalyst per gram of crude product. The catalyst may assist in stabilizing the crude product during transportation and/or treatment. The catalyst may inhibit corrosion, inhibit friction, and/or increase water separation abilities of the crude product. Methods described herein may be configured to add one or more catalysts described herein to the crude product during treatment.

The crude product produced from contacting system 100 has properties different than properties of the hydrocarbon feed. Such properties may include, but are not limited to: a) reduced TAN; b) reduced viscosity; c) reduced total Ni/V/Fe content; d) reduced content of sulfur, oxygen, nitrogen, or combinations thereof; e) reduced residue content; f) reduced content of $C_5$ and $C_7$ asphaltenes; g) reduced MCR content; h) increased API gravity; i) a reduced content of metals in metal salts of organic acids; j) reduced basic nitrogen content; or k) combinations thereof. In some embodiments, one or more properties of the crude product, relative to the hydrocarbon feed, may be selectively changed while other properties are not changed as much, or do not substantially change. For example, it may be desirable to only selectively reduce one or more components (for example, residue and/or viscosity) in a hydrocarbon feed without significantly changing the amount of Ni/V/Fe in the hydrocarbon feed. In this manner, hydrogen uptake during contacting may be "concentrated" on residue reduction, and not reduction of other components. Since less of such hydrogen is also being used to reduce other components in the hydrocarbon feed, the amount of hydrogen used during the process may be minimized. For example, a disadvantaged crude may have a high residue, but a Ni/V/Fe content that is acceptable to meet treatment and/or transportation specifications. Such hydrocarbon feed may be more efficiently treated by reducing residue without also reducing Ni/V/Fe.

Catalysts used in one or more embodiments of the inventions may include one or more bulk metals and/or one or more metals on a support. The metals may be in elemental form or in the form of a compound of the metal. The catalysts described herein may be introduced into the contacting zone as a precursor, and then become active as a catalyst in the contacting zone (for example, when sulfur and/or a hydrocarbon feed containing sulfur is contacted with the precursor). The catalyst or combination of catalysts used as described herein may or may not be commercial catalysts. Examples of commercial catalysts that are contemplated to be used as described herein include HDS3; HDS22; HDN60; C234; C311; C344; C411; C424; C344; C444; C447; C454; C448; C524; C534; DC2531; DN120; DN130; DN140; DN190; DN200; DN800; DN2118; DN2318; DN3100; DN3110; DN3300; DN3310; DN3330; RC400; RC410; RN412; RN400; RN420; RN440; RN450; RN650; RN5210; RN5610; RN5650; RM430; RM5030; Z603; Z623; Z673; Z703; Z713; Z723; Z753; and Z763, which are available from CRI International, Inc. (Houston, Tex., U.S.A.).

In some embodiments, catalysts used to change properties of the hydrocarbon feed include one or more Columns 5-10 metals on a support. Columns 5-10 metal(s) include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. The catalyst may have, per gram of catalyst, a total Columns 5-10 metal(s) content in a range from at least 0.0001 grams, at least 0.001 grams, at least 0.01 grams, or in a range 0.0001-0.6 grams, 0.001-0.3 grams, 0.005-0.1 grams, or 0.01-0.08 grams. In some embodiments, the catalyst includes Column 15 element(s) in addition to the Columns 5-10 metal(s). Examples of Column 15 elements include phosphorus. The catalyst may have a total Column 15 element content, per gram of catalyst, in range from 0.000001-0.1 grams, 0.00001-0.06 grams, 0.00005-0.03 grams, or 0.0001-0.001 grams.

In certain embodiments, the catalyst includes Column 6 metal(s). The catalyst may have, per gram of catalyst, a total Column 6 metal(s) content of at least 0.00001, at least 0.01 grams, at least 0.02 grams and/or in a range from 0.0001-0.6 grams, 0.001-0.3 grams, 0.005-0.1 grams, or 0.01-0.08 grams. In some embodiments, the catalyst includes from 0.0001-0.06 grams of Column 6 metal(s) per gram of catalyst.

In some embodiments, the catalyst includes Column 15 element(s) in addition to the Column 6 metal(s).

In some embodiments, the catalyst includes a combination of Column 6 metal(s) with one or more metals from Column 5 and/or Columns 7-10. A molar ratio of Column 6 metal to Column 5 metal may be in a range from 0.1-20, 1-10, or 2-5. A molar ratio of Column 6 metal to Columns 7-10 metal may be in a range from 0.1-20, 1-10, or 2-5. In some embodiments, the catalyst includes Column 15 element(s) in addition to the combination of Column 6 metal(s) with one or more metals from Columns 5 and/or 7-10. In other embodiments, the catalyst includes Column 6 metal(s) and Column 10 metal(s). A molar ratio of the total Column 10 metal to the total Column 6 metal in the catalyst may be in a range from 1-10, or from 2-5. In certain embodiments, the catalyst includes Column 5 metal(s) and Column 10 metal(s). A molar ratio of the total Column 10 metal to the total Column 5 metal in the catalyst may be in a range from 1-10, or from 2-5.

In some embodiments, Columns 5-10 metal(s) are incorporated in, or deposited on, a support to form the catalyst. In certain embodiments, Columns 5-10 metal(s) in combination with Column 15 element(s) are incorporated in, or deposited on, the support to form the catalyst. In embodiments in which the metal(s) and/or element(s) are supported, the weight of the catalyst includes all support, all metal(s), and all element(s). The support may be porous and may include refractory oxides, porous carbon based materials, zeolites, or combinations thereof. Refractory oxides may include, but are not limited to, alumina, silica, silica-alumina, titanium oxide, zirconium oxide, magnesium oxide, or mixtures thereof. Supports may be obtained from a commercial manufacturer such as Criterion Catalysts and Technologies LP (Houston, Tex., U.S.A.). Porous carbon based materials include, but are not limited to, activated carbon and/or porous graphite. Examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

The support, in some embodiments, is prepared such that the support has an average pore diameter of at least 150 Å, at least 170 Å, or at least 180 Å. In certain embodiments, a support is prepared by forming an aqueous paste of the support material. In some embodiments, an acid is added to the paste to assist in extrusion of the paste. The water and dilute acid are added in such amounts and by such methods as required to give the extrudable paste a desired consistency. Examples of acids include, but are not limited to, nitric acid, acetic acid, sulfuric acid, and hydrochloric acid.

The paste may be extruded and cut using generally known catalyst extrusion methods and catalyst cutting methods to form extrudates. The extrudates may be heat treated at a temperature in a range from 65-260° C. or from 85-235° C. for a period of time (for example, for 0.5-8 hours) and/or until the moisture content of the extrudate has reached a desired level. The heat treated extrudate may be further heat treated at a temperature in a range from 800-1200° C. or 900-1100° C.) to form the support having an average pore diameter of at least 150 Å.

In certain embodiments, the support includes gamma alumina, theta alumina, delta alumina, alpha alumina, or combinations thereof. The amount of gamma alumina, delta alumina, alpha alumina, or combinations thereof, per gram of catalyst support, may be in a range from 0.0001-0.99 grams, 0.001-0.5 grams, 0.01-0.1 grams, or at most 0.1 grams as determined by x-ray diffraction. In some embodiments, the support has, either alone or in combination with other forms of alumina, a theta alumina content, per gram of support, in a range from 0.1-0.99 grams, 0.5-0.9 grams, or 0.6-0.8 grams, as determined by x-ray diffraction. In some embodiments, the support may have at least 0.1 grams, at least 0.3 grams, at least 0.5 grams, or at least 0.8 grams of theta alumina, as determined by x-ray diffraction.

Supported catalysts may be prepared using generally known catalyst preparation techniques. Examples of catalyst preparations are described in U.S. Pat. No. 6,919,018 to Bhan; U.S. Pat. No. 6,759,364 to Bhan; U.S. Pat. No. 6,218,333 to Gabrielov et al.; U.S. Pat. No. 6,290,841 to Gabrielov et al.; and U.S. Pat. No. 5,744,025 to Boon et al.

In some embodiments, the support may be impregnated with metal to form a catalyst. In certain embodiments, the support is heat treated at temperatures in a range from 400-1200° C., 450-1000° C., or 600-900° C. prior to impregnation with a metal. In some embodiments, impregnation aids may be used during preparation of the catalyst. Examples of impregnation aids include a citric acid component, ethylenediaminetetraacetic acid (EDTA), ammonia, or mixtures thereof.

In certain embodiments, a catalyst may be formed by adding or incorporating the Columns 5-10 metal(s) to heat treated shaped mixtures of support ("overlaying"). Overlaying a metal on top of the heat treated shaped support having a substantially or relatively uniform concentration of metal often provides beneficial catalytic properties of the catalyst. Heat treating of a shaped support after each overlay of metal tends to improve the catalytic activity of the catalyst. Methods to prepare a catalyst using overlay methods are described in U.S. Pat. No. 6,759,364 to Bhan.

The Columns 5-10 metal(s) and support may be mixed with suitable mixing equipment to form a Columns 5-10 metal(s)/support mixture. The Columns 5-10 metal(s)/support mixture may be mixed using suitable mixing equipment. Examples of suitable mixing equipment include tumblers, stationary shells or troughs, Muller mixers (for example, batch type or continuous type), impact mixers, and any other generally known mixer, or generally known device, that will suitably provide the Columns 5-10 metal(s)/support mixture. In certain embodiments, the materials are mixed until the Columns 5-10 metal(s) is (are) substantially homogeneously dispersed in the support.

In some embodiments, the catalyst is heat treated at temperatures from 150-750° C., from 200-740° C., or from 400-730° C. after combining the support with the metal.

In some embodiments, the catalyst may be heat treated in the presence of hot air and/or oxygen rich air at a temperature in a range between 400° C. and 1000° C. to remove volatile matter such that at least a portion of the Columns 5-10 metals are converted to the corresponding metal oxide.

In other embodiments, however, the catalyst may be heat treated in the presence of air at temperatures in a range from 35° C. to 500° C., from 100° C. to 400° C., or from 150° C. to 300° C. for a period of time in a range from 1-3 hours to remove a majority of the volatile components without converting the Columns 5-10 metals to the metal oxide. Catalysts prepared by such a method are generally referred to as "uncalcined" catalysts or "dried". When catalysts are prepared in this manner in combination with a sulfiding method, the active metals may be substantially dispersed in the support. Preparations of uncalcined catalysts are described in U.S. Pat. No. 6,218,333 to Gabrielov et al., and U.S. Pat. No. 6,290,841 to Gabrielov et al.

In certain embodiments, a theta alumina support may be combined with Columns 5-10 metals to form a theta alumina support/Columns 5-10 metals mixture. The theta alumina support/Columns 5-10 metals mixture may be heat treated at a temperature of at least 400° C. to form the catalyst having a pore size distribution with a median pore diameter of at least 230 Å. Typically, such heat treating is conducted at temperatures of at most 1200° C.

In some embodiments, the support (either a commercial support or a support prepared as described herein) may be combined with a supported catalyst and/or a bulk metal catalyst. In some embodiments, the supported catalyst may include Column 15 metal(s). For example, the supported catalyst and/or the bulk metal catalyst may be crushed into a powder with an average particle size from 1-50 microns, 2-45 microns, or 5-40 microns. The powder may be combined with support to form an embedded metal catalyst. In some embodiments, the powder may be combined with the support and then extruded using standard techniques to form a catalyst having a pore size distribution with a median pore diameter in a range from 80-200 Å or 90-180 Å, or 120-130 Å.

Combining the catalyst with the support allows, in some embodiments, at least a portion of the metal to reside under the surface of the embedded metal catalyst (for example, embedded in the support), leading to less metal on the surface than would otherwise occur in the unembedded metal catalyst. In some embodiments, having less metal on the surface of the catalyst extends the life and/or catalytic activity of the catalyst by allowing at least a portion of the metal to move to the surface of the catalyst during use. The metals may move to the surface of the catalyst through erosion of the surface of the catalyst during contact of the catalyst with a hydrocarbon feed.

In some embodiments, the catalyst is prepared by combining one or more Columns 6-10 metal(s), mineral oxides having a particle size of at most 500 micrometers, and a support. The mineral oxides may include, alumina, silica, silica-alumina, titanium oxide, zirconium oxide, magnesium oxide, or mixtures thereof. The mineral oxides may be obtained from an extrudate process to produce support. For example, alumina fines can be obtained from an alumina extrudate production to produce catalyst supports. In some embodiments, mineral oxide fines may have a particle size of at most 500 micrometers, at most 150 micrometers, at most 100 micrometers, or at most 75 micrometers. The particle size of the mineral oxides may range from 0.2 micrometers to 500 micrometers, 0.3 micrometers to 100 micrometers, or 0.5 micrometers to 75 micrometers. Combining mineral oxides with one or more Columns 6-10 metal and a support may allow less metal to reside on the surface of the catalyst.

Intercalation and/or mixing of the components of the catalysts changes, in some embodiments, the structured order of the Column 6 metal in the Column 6 oxide crystal structure to a substantially random order of Column 6 metal in the crystal structure of the embedded catalyst. The order of the Column 6 metal may be determined using powder x-ray diffraction methods. The order of elemental metal in the catalyst relative to the order of elemental metal in the metal oxide may be determined by comparing the order of the Column 6 metal peak in an x-ray diffraction spectrum of the Column 6 oxide to the order of the Column 6 metal peak in an x-ray diffraction spectrum of the catalyst. From broadening and/or absence of patterns associated with Column 6 metal in an x-ray diffraction spectrum, it is possible to estimate that the Column 6 metal(s) are substantially randomly ordered in the crystal structure.

For example, molybdenum trioxide and the alumina support having a median pore diameter of at least 180 Å may be combined to form an alumina/molybdenum trioxide mixture. The molybdenum trioxide has a definite pattern (for example, definite $D_{001}$, $D_{002}$ and/or $D_{003}$ peaks). The alumina/Column 6 trioxide mixture may be heat treated at a temperature of at least 538° C. (1000° F.) to produce a catalyst that does not exhibit a pattern for molybdenum dioxide in an x-ray diffraction spectrum (for example, an absence of the $D_{001}$ peak). In some embodiments, the catalyst may be prepared by combining a supported catalyst and/or a used catalyst with a support and one or more Columns 6-10 metals to produce the catalyst. In some embodiments, the Columns 6-10 metals (for example, molybdenum oxides and/or tungsten oxides) have a particle size of at most 500 micrometers, at most 150 micrometers, at most 100 micrometers, or at most 75 micrometers. The particle size of the Columns 6-10 metals may range from 0.1 micrometers to 500 micrometers, 1 micrometers to 100 micrometers, or 10 micrometers to 75 micrometers. In some embodiments, at least 50 percent of the particles have a particle size between 2 micrometers to 15 micrometers. The mixture of the used catalyst with a support and one or more Columns 6-10 metals is dried at temperatures of at least 100° C. to remove any low boiling components and then heated to at least 500° C., at least 1000° C., at least 1200° C. or at least 1300° C. to convert the Columns 6-10 metals to metal oxides. The median pore diameter of the catalyst may range from 50 Å to 150 Å, 60 Å to 140 Å, or 70 Å to 130 Å.

The catalyst may include at least 0.01 grams, at least 0.1 grams, or at least 0.2 grams of used catalyst per gram of catalyst and at most 0.3 grams, at most 0.2 grams, or at most 0.1 grams of Columns 6-10 metal(s). In some embodiments, the catalyst includes from 0.001 grams to 0.3 grams, from 0.05 to 0.2 grams, or from 0.01 grams to 0.1 grams of used catalyst, per gram of catalyst. In certain embodiments, the ultrastable catalyst includes from 0.001 grams to 0.2 grams or 0.01 grams to 0.1 grams of Column 6 metal(s). In some embodiments, the ultrastable catalyst may include from 0.001 grams to 0.1 grams, 0.005 to 0.05 grams, or from 0.01 grams to 0.03 grams of Column 10 metal(s). In certain embodiments, the ultrastable catalyst may include from 0.001 grams to 0.1 grams, 0.005 grams to 0.05 grams, or from 0.01 grams to 0.03 grams of Column 9 metal(s). In some embodiments, the ultrastable catalyst includes from 0.0001 to 0.01 grams, 0.0005 grams to 0.005 grams, or 0.0008 to 0.003 grams of Column 15 element(s).

The catalyst, after sulfiding, when analyzed using scanning electron microscopy, exhibits a significantly lower degree of molybdenum disulfide ($MoS_2$) slab stacking with the stacks having reduced heights and length as compared to alternative molybdenum-containing hydroprocessing catalysts. Preparation of such catalysts are described in U.S. patent applications entitled "A Catalyst and Process for the Manufacture of Ultra-Low Sulfur Distillate Product" and "A Highly Stable Heavy Hydrocarbon Hydrodesulfurization Catalyst and Method of Making and Use Thereof" to Bhan.

In commercial applications, after sulfidation of the hydroprocessing catalysts, the hydroprocessing catalysts are typically heated to 400° C. over one or more months to control the generation of hydrogen sulfide. Slowly heating of hydroprocessing catalysts may inhibit deactivation of the catalyst. The catalyst described herein has enhanced stability in the presence of hydrogen sulfide when heated to 400° C. in less than three weeks. Being able to preheat the catalyst over a shorter period of time may increase the amount of hydrocarbon feed that can be processed through a contacting system.

In some embodiments, catalysts may be characterized by pore structure. Various pore structure parameters include, but are not limited to, pore diameter, pore volume, surface areas, or combinations thereof. The catalyst may have a distribution of total quantity of pore sizes versus pore diameters. The median pore diameter of the pore size distribution may be in a range from 30-1000 Å, 50-500 Å, or 60-300 Å. In some embodiments, catalysts that include at least 0.5 grams of gamma alumina per gram of catalyst have a pore size distribution with a median pore diameter in a range from 50 to 200 Å; 90 to 180 Å, 100 to 140 Å, or 120 to 130 Å. In some embodiments, the gamma alumina catalyst has a pore size distribution with a median pore diameter ranging from 50 Å to 150 Å, from 60 Å to 135 Å, or from 70 Å to 120 Å. In other embodiments, catalysts that include at least 0.1 grams of theta alumina per gram of catalyst have a pore size distribution with a median pore diameter in a range from 180-500 Å, 200-300 Å, or 230-250 Å. In some embodiments, the median pore diameter of the pore size distribution is at least 120 Å, at least 150 Å, at least 180 Å, at least 200 Å, at least 220 Å, at least 230 Å, or at least 300 Å. Such median pore diameters are typically at most 1000 Å.

The catalyst may have a pore size distribution with a median pore diameter of at least 60 Å or at least 90 Å. In some embodiments, the catalyst has a pore size distribution with a median pore diameter in a range from 90-180 Å, 100-140 Å, or 120-130 Å, with at least 60% of a total number of pores in the pore size distribution having a pore diameter within 45 Å, 35 Å, or 25 Å of the median pore diameter. In certain embodiments, the catalyst has a pore size distribution with a median pore diameter in a range from 70-180 Å, with at least 60% of a total number of pores in the pore size distribution having a pore diameter within 45 Å, 35 Å, or 25 Å of the median pore diameter.

In embodiments in which the median pore diameter of the pore size distribution is at least 180 Å, at least 200 Å, or at least 230 Å, greater that 60% of a total number of pores in the pore size distribution have a pore diameter within 50 Å, 70 Å, or 90 Å of the median pore diameter. In some embodiments, the catalyst has a pore size distribution with a median pore diameter in a range from 180-500 Å, 200-400 Å, or 230-300 Å, with at least 60% of a total number of pores in the pore size distribution having a pore diameter within 50 Å, 70 Å, or 90 Å of the median pore diameter.

In some embodiments, pore volume of pores may be at least 0.3 $cm^3/g$, at least 0.7 $cm^3/g$, or at least 0.9 $cm^3/g$. In certain embodiments, pore volume of pores may range from 0.3-0.99 $cm^3/g$, 0.4-0.8 $cm^3/g$, or 0.5-0.7 $cm^3/g$.

The catalyst having a pore size distribution with a median pore diameter in a range from 50-180 Å may, in some embodiments, have a surface area of at least 100 $m^2/g$, at least 120 $m^2/g$, at least 170 $m^2/g$, at least 220, or at least 270 $m^2/g$. Such surface area may be in a range from 100-300 $m^2/g$, 120-270 $m^2/g$, 130-250 $m^2/g$, or 170-220 $m^2/g$.

In certain embodiments, the catalyst having a pore size distribution with a median pore diameter in a range from 180-300 Å may have a surface area of at least 60 $m^2/g$, at least 90 $m^2/g$, least 100 $m^2/g$, at least 120 $m^2/g$, or at least 270 $m^2/g$. Such surface area may be in a range from 60-300 $m^2/g$, 90-280 $m^2/g$, 100-270 $m^2/g$, or 120-250 $m^2/g$.

In some embodiments, the catalyst is characterized using Raman spectroscopy. The catalyst that includes theta alumina and metals from Columns 6-10 may exhibit bands in a region between 800 $cm^{-1}$ and 900 $cm^{-1}$. Bands observed in the 800 $cm^{-1}$ to 900 $cm^{-1}$ region may be attributed to Metal-Oxygen-Metal antisymmetric stretching. In some embodiments, the catalyst that includes theta alumina and Column 6 metals exhibits bands near 810 $cm^{-1}$, near 835 $cm^{-1}$, and 880 $cm^{-1}$. In some embodiments, the Raman shift of a molybdenum catalyst at these bands may indicate that the catalyst includes a species intermediate between $Mo_7O_{24}^{6-}$ and $MO_4^{2-}$. In some embodiments, the intermediate species is crystalline.

In some embodiments, the catalyst that includes metals from Columns 5 may exhibit bands in a region between 650 $cm^{-1}$ and 1000 $cm^{-1}$. Bands observed near 650 $cm^{-1}$ and 1000 $cm^{-1}$ may be attributed to V=O motions. In some embodiments, the catalyst that includes theta alumina and Columns 5 and 6 metals exhibits bands near 670 $cm^{-1}$ and 990 $cm^{-1}$.

In certain embodiments, the catalyst exists in shaped forms, for example, pellets, cylinders, and/or extrudates. The catalyst typically has a flat plate crush strength in a range from 50-500 N/cm, 60-400 N/cm, 100-350 N/cm, 200-300 N/cm, or 220-280 N/cm.

In some embodiments, the catalyst and/or the catalyst precursor is sulfided to form metal sulfides (prior to use) using techniques known in the art (for example, ACTICAT™ process, CRI International, Inc.). In some embodiments, the catalyst may be dried then sulfided. Alternatively, the catalyst may be sulfided in situ by contact of the catalyst with a hydrocarbon feed that includes sulfur-containing compounds. In-situ sulfurization may utilize either gaseous hydrogen sulfide in the presence of hydrogen, or liquid-phase sulfurizing agents such as organosulfur compounds (including alkylsulfides, polysulfides, thiols, and sulfoxides). Ex-situ sulfurization processes are described in U.S. Pat. No. 5,468,372 to Seamans et al., and U.S. Pat. No. 5,688,736 to Seamans et al.

In certain embodiments, a first type of catalyst ("first catalyst") includes Columns 5-10 metal(s) in combination with a support, and has a pore size distribution with a median pore diameter in a range from 150-250 Å. The first catalyst may have a surface area of at least 100 $m^2/g$. The pore volume of the first catalyst may be at least 0.5 $cm^3/g$. The first catalyst may have a gamma alumina content of at least 0.5 grams of gamma alumina, and typically at most 0.9999 grams of gamma alumina, per gram of first catalyst. The first catalyst has, in some embodiments, a total content of Column 6 metal(s), per gram of catalyst, in a range from 0.0001 to 0.1 grams. The first catalyst is capable of removing a portion of the Ni/V/Fe from a hydrocarbon feed, removing a portion of the components that contribute to TAN of a hydrocarbon feed, removing at least a portion of the $C_5$ asphaltenes from a hydrocarbon feed, removing at least a portion of the metals in metal salts of organic acids in the hydrocarbon feed, or combinations thereof. Other properties (for example, sulfur content, VGO content, API gravity, residue content, or combinations thereof) may exhibit relatively small changes when the hydrocarbon feed is contacted with the first catalyst. Being able to selectively change properties of a hydrocarbon feed while only changing other properties in relatively small amounts may allow the hydrocarbon feed to be more efficiently treated. In some embodiments, one or more first catalysts may be used in any order.

In certain embodiments, the second type of catalyst ("second catalyst") includes Columns 5-10 metal(s) in combination with a support, and has a pore size distribution with a median pore diameter in a range from 90 Å to 180 Å. At least 60% of the total number of pores in the pore size distribution of the second catalyst have a pore diameter within 45 Å of the median pore diameter. Contact of the hydrocarbon feed with the second catalyst under suitable contacting conditions may produce a crude product that has selected properties (for example, TAN) significantly changed relative to the same properties of the hydrocarbon feed while other properties are only changed by a small amount. A hydrogen source, in some embodiments, may be present during contacting.

The second catalyst may reduce at least a portion of the components that contribute to the TAN of the hydrocarbon feed, at least a portion of the components that contribute to relatively high viscosities, and reduce at least a portion of the Ni/V/Fe content of the crude feed. Additionally, contact of hydrocarbon feeds with the second catalyst may produce a crude product with a relatively small change in the sulfur content relative to the sulfur content of the hydrocarbon feed. For example, the crude product may have a sulfur content of 70%-130% of the sulfur content of the hydrocarbon feed. The crude product may also exhibit relatively small changes in distillate content, VGO content, and residue content relative to the hydrocarbon feed.

In some embodiments, the hydrocarbon feed may have a relatively low content of Ni/V/Fe (for example, at most 50 wtppm), but a relatively high TAN, asphaltenes content, or content of metals in metal salts of organic acids. A relatively high TAN (for example, TAN of at least 0.3) may render the hydrocarbon feed unacceptable for transportation and/or refining. A disadvantaged crude with a relatively high $C_5$ asphaltenes content may exhibit less stability during processing relative to other crudes with relatively low $C_5$ asphaltenes content. Contact of the hydrocarbon feed with the second catalysts, may remove acidic components and/or $C_5$ asphaltenes contributing to TAN from the hydrocarbon feed. In some embodiments, reduction of $C_5$ asphaltenes and/or components contributing to TAN may reduce the viscosity of the hydrocarbon feed/total product mixture relative to the viscosity of the hydrocarbon feed. In certain embodiments, one or more combinations of second catalysts may enhance stability of the total product/crude product mixture, increase catalyst life, allow minimal net hydrogen uptake by the hydrocarbon feed, or combinations thereof, when used to treat hydrocarbon feed as described herein.

In some embodiments, a third type of catalyst ("third catalyst") may be obtainable by combining a support with Column 6 metal(s) to produce a catalyst precursor. The catalyst precursor may be heated in the presence of one or more sulfur containing compounds at a temperature below 500° C. (for example, below 482° C.) for a relatively short period of time to form the uncalcined third catalyst. Typically, the catalyst precursor is heated to at least 100° C. for 2 hours. In certain embodiments, the third catalyst may, per gram of catalyst, have a Column 15 element content in a range from 0.001-0.03 grams, 0.005-0.02 grams, or 0.008-0.01 grams. The third catalyst may exhibit significant activity and stability when used to treat the hydrocarbon feed as described herein. In some embodiments, the catalyst precursor is heated at temperatures below 500° C. in the presence of one or more sulfur compounds.

The third catalyst may reduce at least a portion of the components that contribute to the TAN of the hydrocarbon feed, reduce at least a portion of the metals in metal salts of organic acids, reduce a Ni/V/Fe content of the crude product, and reduce the viscosity of the crude product. Additionally, contact of hydrocarbon feeds with the third catalyst may produce a crude product with a relatively small change in the sulfur content relative to the sulfur content of the hydrocarbon feed and with relatively minimal net hydrogen uptake by the hydrocarbon feed. For example, a crude product may have a sulfur content of 70%-130% of the sulfur content of the hydrocarbon feed. The crude product produced using the third catalyst may also exhibit relatively small changes in API gravity, distillate content, VGO content, and residue content relative to the hydrocarbon feed. The ability to reduce the TAN, the metals in metal salts of organic salts, the Ni/V/Fe content, and the viscosity of the crude product while also only changing by a small amount the API gravity, distillate content, VGO content, and residue contents relative to the hydrocarbon feed, may allow the crude product to be used by a variety of treatment facilities.

The third catalyst, in some embodiments, may reduce at least a portion of the MCR content of the hydrocarbon feed, while maintaining hydrocarbon feed/total product stability. In certain embodiments, the third catalyst may have a Column 6 metal(s) content in a range from 0.0001-0.1 grams, 0.005-0.05 grams, or 0.001-0.01 grams and a Column 10 metal(s) content in a range from 0.0001-0.05 grams, 0.005-0.03 grams, or 0.001-0.01 grams per gram of catalyst. A Columns 6 and 10 metal(s) catalyst may facilitate reduction of at least a portion of the components that contribute to MCR in the hydrocarbon feed at temperatures in a range from 300-500° C. or 350-450° C. and pressures in a range from 0.1-10 MPa, 1-8 MPa, or 2-5 MPa.

In certain embodiments, a fourth type of catalyst ("fourth catalyst") includes Column 5 metal(s) in combination with a theta alumina support. The fourth catalyst has a pore size distribution with a median pore diameter of at least 180 Å. In some embodiments, the median pore diameter of the fourth catalyst may be at least 220 Å, at least 230 Å, at least 250 Å, or at least 300 Å. The support may include at least 0.1 grams, at least 0.5 grams, at least 0.8 grams, or at least 0.9 grams of theta alumina per gram of support. The fourth catalyst may include, in some embodiments, at most 0.1 grams of Column 5 metal(s) per gram of catalyst, and at least 0.0001 grams of Column 5 metal(s) per gram of catalyst. In certain embodiments, the Column 5 metal is vanadium.

In some embodiments, the hydrocarbon feed may be contacted with an additional catalyst subsequent to contact with the fourth catalyst. The additional catalyst may be one or more of the following: the first catalyst, the second catalyst, the third catalyst, the fifth catalyst, the sixth catalyst, the seventh catalyst, commercial catalysts described herein, or combinations thereof.

In some embodiments, hydrogen may be generated during contacting of the hydrocarbon feed with the fourth catalyst at a temperature in a range from 300-400° C., 320-380° C., or 330-370° C. The crude product produced from such contacting may have a TAN of at most 90%, at most 80%, at most 50%, or at most 10% of the TAN of the hydrocarbon feed. Hydrogen generation may be in a range from 1-50 $Nm^3/m^3$, 10-40 $Nm^3/m^3$, or 15-25 $Nm^3/m^3$. The crude product may have a total Ni/V/Fe content of at most 90%, at most 80%, at most 70%, at most 50%, at most 10%, or at least 1% of total Ni/V/Fe content of the hydrocarbon feed.

In certain embodiments, a fifth type of catalyst ("fifth catalyst") includes Column 6 metal(s) in combination with a theta alumina support. The fifth catalyst has a pore size distribution with a median pore diameter of at least 180 Å, at least 220 Å, at least 230 Å, at least 250 Å, at least 300 Å, or at most 500 Å. The support may include at least 0.1 grams, at least 0.5 grams, or at most 0.999 grams of theta alumina per gram of support. In some embodiments, the support has an alpha alumina content of below 0.1 grams of alpha alumina per gram of catalyst. The catalyst includes, in some embodiments, at most 0.1 grams of Column 6 metal(s) per gram of catalyst and at least 0.0001 grams of Column 6 metal(s) per gram of catalyst. In some embodiments, the Column 6 metal(s) are molybdenum and/or tungsten.

In certain embodiments, net hydrogen uptake by the hydrocarbon feed may be relatively low (for example, from 0.01-100 $Nm^3/m^3$) when the hydrocarbon feed is contacted with the fifth catalyst at a temperature in a range from 310-400° C., from 320-370° C., or from 330-360° C. Net hydrogen uptake by the hydrocarbon feed may be in a range from 1-20 $Nm^3/m^3$, 2-15 $Nm^3/m^3$, or 3-10 $Nm^3/m^3$. The crude product produced from contact of the hydrocarbon feed with the fifth catalyst may have a TAN of at most 90%, at most 80%, at most 50%, or at most 10% of the TAN of the hydrocarbon feed. TAN of the crude product may be in a range from 0.01-0.1, 0.03-0.05, or 0.02-0.03.

In certain embodiments, a sixth type of catalyst ("sixth catalyst") includes Column 5 metal(s) and Column 6 metal(s) in combination with the theta alumina support. The sixth catalyst has a pore size distribution with a median pore diameter of at least 180 Å. In some embodiments, the median pore diameter of pore size distribution may be at least 220 Å, at least 230 Å, at least 250 Å, at least 300 Å, or at most 500 Å. The support may include at least 0.1 grams, at least 0.5 grams, at least 0.8 grams, at least 0.9 grams, or at most 0.99 grams of theta alumina per gram of support. The catalyst may include, in some embodiments, a total of Column 5 metal(s) and Column 6 metal(s) of at most 0.1 grams per gram of catalyst, and at least 0.0001 grams of Column 5 metal(s) and Column 6 metal(s) per gram of catalyst. In some embodiments, the molar ratio of total Column 6 metal to total Column 5 metal may be in a range from 0.1-20, 1-10, or 2-5. In certain embodiments, the Column 5 metal is vanadium and the Column 6 metal(s) are molybdenum and/or tungsten.

When the hydrocarbon feed is contacted with the sixth catalyst at a temperature in a range from 310-400° C., from 320-370° C., or from 330-360° C., net hydrogen uptake by the hydrocarbon feed may be in a range from −10 $Nm^3/m^3$ to 20 $Nm^3/m^3$, −7 $Nm^3/m^3$ to 10 $Nm^3/m^3$, or −5 $Nm^3/m^3$ to 5 $Nm^3/m^3$. Negative net hydrogen uptake is one indication that hydrogen is being generated in situ. The crude product produced from contact of the hydrocarbon feed with the sixth catalyst may have a TAN of at most 90%, at most 80%, at most 50%, at most 10%, or at least 1% of the TAN of the hydrocarbon feed. TAN of the crude product may be in a range from 0.01-0.1, 0.02-0.05, or 0.03-0.04.

Low net hydrogen uptake during contacting of the hydrocarbon feed with the fourth, fifth, or sixth catalyst reduces the overall requirement of hydrogen during processing while producing a crude product that is acceptable for transportation and/or treatment. Since producing and/or transporting hydrogen is costly, minimizing the usage of hydrogen in a process decreases overall processing costs.

In some embodiments, contact of hydrocarbon feed with the fourth catalyst, the fifth catalyst, the sixth catalyst or combinations thereof at a temperature in a range from 360° C. to 500° C., from 380° C. to 480° C., from 400° C. to 470° C., or from 410° C. to 460° C., produces the crude product with a residue content of at least 90%, at least 80%, at least 50%, at least 30% or at least 10% of the residue content of the hydrocarbon feed.

At elevated temperatures (for example greater than 360° C.), impurities and/or coke may form during contact of the hydrocarbon feed with one or more catalysts. When contact is performed in a continuously stirred reactor, formation of impurities and/or coke may be determined by measuring an amount of sediment produced during contacting. In some embodiments, the content of sediment produced may be at most 0.002 grams or at most 0.001 grams, per gram of hydrocarbon feed/total product. When the content of sediment approaches 0.001 grams, adjustment of contacting conditions may be necessary to prevent shutdown of the process and/or to maintain a suitable flow rate of hydrocarbon feed through the contacting zone. The sediment content may range, per gram of hydrocarbon feed/total product, from 0.00001 grams to 0.03 grams, from 0.0001 grams to 0.02 grams, from 0.001 to 0.01 grams. Contact of the crude product with the fourth catalyst, the fifth catalyst, the sixth catalyst, or combinations thereof at elevated temperatures allows reduction of residue with minimal formation of sediment.

In certain embodiments, a seventh type of catalyst ("seventh catalyst") has a total content of Column 6 metal(s) in a range from 0.0001-0.06 grams of Column 6 metal(s) per gram of catalyst. The Column 6 metal is molybdenum and/or tungsten. The seventh catalyst is beneficial in producing a crude product that has a TAN of at most 90% of the TAN of the hydrocarbon feed.

In certain embodiments, an eighth type of catalyst ("eighth catalyst") includes Columns 6-10 metal(s) in combination with a support, and has a pore size distribution with a median pore diameter in a range from 50 Å to 180 Å. The eighth catalyst may have a surface area of at least 200 m$^2$/g. The pore volume of the eighth catalyst may be at least 0.5 cm$^3$/g. The eighth catalyst may have a gamma alumina content of at least 0.5 grams of gamma alumina, and typically at most 0.9999 grams of gamma alumina, per gram of eighth catalyst. The eighth catalyst has, in some embodiments, a total content of Column 6 metal(s), per gram of eighth catalyst, in a range from 0.0001 grams to 0.1 grams, or from 0.01 grams to 0.05 grams. The eighth catalyst is capable of removing a portion of the Ni/V/Fe and/or a portion of the molybdenum from the hydrocarbon feed. In some embodiments, the eighth catalyst selectively removes organometallic compounds (for example, vanadium, molybdenum, and/or nickel porphyrins) while only changing the amount of inorganic metal compounds (for example, nickel oxides, nickel sulfide, vanadium oxides and/or vanadium sulfides) by a relatively small amount. The concentration of organometallic compounds in a hydrocarbon feed may be monitored by spectrophotometric methods as described by Yen in "The Role of Trace Metals in Petroleum" (Ann Arbor Science Publishers, Inc. Ann Arbor Mich., 1975, page 36). Removal of organometallic compounds may enhance lives of catalysts positioned downstream of the eighth catalyst.

In some embodiments, a ninth type of catalyst ("ninth catalyst") includes Columns 6-10 metal(s) in combination with a support and has a pore size distribution with a median pore diameter in a range from 50 Å to 180 Å. The ninth catalyst support may include at least 0.01 grams, at least 0.05 grams, or at least 0.1 grams of silica-alumina per gram of ninth catalyst. The ninth catalyst may have a Column 6 metal(s) content in a range from 0.0001 to 0.3 grams, 0.005 grams to 0.2 grams, or 0.001 grams to 0.1 grams and a Column 10 metal(s) content in a range from 0.0001 grams to 0.05 grams, 0.005 grams to 0.03 grams, or 0.001 grams to 0.01 grams per gram of ninth catalyst. In certain embodiments, the ninth catalyst may, per gram of ninth catalyst, have a Column 15 element content in a range from 0.001 grams to 0.03 grams, 0.005 grams to 0.02 grams, or 0.008 grams to 0.01 grams. The ninth catalyst may facilitate reduction of at least a portion of the components that contribute to residue, at least a portion of the $C_5$ and $C_7$ asphaltenes, and at least a portion of components that contribute to high viscosities in the hydrocarbon feed at temperatures in a range from 300° C. to 500° C., 350° C. to 450° C., or 370° C. to 430° C. and pressures in a range from 0.1 to 8 MPa, 1 to 7 MPa, or 2 to 5 MPa. In some embodiments, the ninth catalyst may reduce at least a portion of components that contribute to the MCR content of the hydrocarbon feed, while maintaining hydrocarbon feed/total product stability. In certain embodiments, the ninth catalyst may reduce at least a portion of the basic nitrogen components in a hydrocarbon feed at temperatures of at least 200° C. and pressures of at least 3 MPa.

Contact of a hydrocarbon feed with the eighth and ninth catalyst at temperatures of at most 500° C. and pressure of at most 7 MPa may produce a crude product having a residue content, a total $C_5$ asphaltenes and $C_7$ asphaltenes content, and/or a viscosity of at most 90%, at most 80%, at most 70%, at most 50%, at most 30% of the residue content, the total $C_5$ asphaltenes and $C_7$ asphaltenes content, and/or the viscosity of the hydrocarbon feed while maintaining a Ni/V/Fe content between 70% and 130%, between 80% and 120%, or between 90 and 110% of the hydrocarbon feed Ni/V/Fe content. In some embodiments, the viscosity of the crude product is at most 99% of the viscosity of the hydrocarbon feed after contact with the eighth and ninth catalysts.

In some embodiments, a tenth type of catalyst ("tenth catalyst") includes Columns 6-10 metal(s) in combination with a support and has a pore size distribution with a median pore diameter in a range from 50 Å to 120 Å. The tenth catalyst support may include at least 0.01 grams, at least 0.05 grams, at least 0.1 grams of silica-alumina per gram of tenth catalyst. The tenth catalyst may have a Column 6 metal(s) content in a range from 0.0001 grams to 0.1 grams, 0.005 grams to 0.03 grams, or 0.001 grams to 0.05 grams and a Column 10 metal(s) content in a range from 0.0001 grams to 0.05 grams, 0.005 grams to 0.03 grams, or 0.001 grams to 0.01 grams per gram of catalyst. The tenth catalyst may facilitate reduction of at least a portion of the components that contribute to residue, at least a portion of the $C_5$ and $C_7$ asphaltenes, and at least a portion of components that contribute to high viscosities in the hydrocarbon feed. In some embodiments, the tenth catalyst may reduce at least a portion of components that contribute to the MCR content of the hydrocarbon feed, while maintaining hydrocarbon feed/total product stability.

In certain embodiments, an eleventh type of catalyst ("eleventh catalyst") is obtainable by combining a used catalyst with a support and Columns 6-10 metals to produce an the eleventh catalyst. The eleventh catalyst may have from 0.001 grams to 0.3 grams, 0.005 grams to 0.2 grams, or 0.01 grams to 0.1 grams of Column 6 metal(s) per gram of eleventh catalyst. In some embodiments, the eleventh catalyst may have at most 0.1 grams of Column 6 metal(s). In some embodiments, the eleventh catalyst may include from 0.001 grams to 0.1 grams, 0.005 to 0.05 grams, or from 0.01 grams to 0.03 grams of Column 10 metal(s) per gram of eleventh catalyst. In certain embodiments, the eleventh catalyst may include from 0.001 grams to 0.1 grams, 0.005 to 0.05 grams, or from 0.01 grams to 0.03 grams of Column 9 metal(s) per gram of eleventh catalyst. The eleventh catalyst has, in some embodiments, a pore size distribution with a median pore diameter from 50 Å to 130 Å. The eleventh catalyst may reduce at least a portion of the components that contribute to higher viscosities, a portion of the components that contribute to residue and/or basic nitrogen compounds in the hydrocarbon feed.

In some embodiments, a twelfth type of catalyst ("twelfth catalyst") may be obtainable by combining a support with Column 6 metal(s) to produce a catalyst precursor. The catalyst precursor may be heated in the presence of one or more sulfur containing compounds at a temperature below 300° C. or below 150° C. for a time period of less than 24 hours, less than 12 hours, less than 8 hours, or less than 6 hours to form the dried twelfth catalyst. Typically, the catalyst precursor is heated from 100° C. to 150° C. for 8 hours. In certain embodiments, the twelfth catalyst may, per gram of catalyst, have a Column 15 element content in a range from 0.001 grams to 0.03 grams, 0.005 grams to 0.02 grams, or 0.008 grams to 0.01 grams. The twelfth catalyst may exhibit significant activity and stability when used to treat the hydrocarbon feed as described herein. In some embodiments, the dried catalyst may be sulfided in situ with a hydrocarbon feed having sufficient sulfur content to convert a portion of the metal oxides to metal sulfides. The twelfth catalyst may reduce at least a portion of the components that contribute to higher viscosities, a portion of the components that contribute to residue, basic nitrogen compounds, $C_5$ asphaltenes and $C_7$ asphaltenes in the hydrocarbon feed.

A thirteenth type of catalyst ("thirteenth" catalyst may be prepared by combining Columns 6-10 metal(s) with mineral oxides having a particle size of at most 500 micrometer, and a support. The thirteenth catalyst may have from 0.001 grams to 0.3 grams, 0.005 grams to 0.2 grams, or 0.01 grams to 0.1 grams of Column 6 metal(s), per gram of thirteenth catalyst. In some embodiments, the thirteenth catalyst may have at most 0.1 grams of Column 6 metal(s). In certain embodiments, the thirteenth catalyst has at most 0.06 grams of Column 6 metal(s) per gram of thirteenth catalyst. In some embodiments, the thirteenth catalyst may include from 0.001 grams to 0.1 grams, 0.005 grams to 0.05 grams, or from 0.01 grams to 0.03 grams of Column 10 metal(s) per gram of catalyst. In certain embodiments, the thirteenth catalyst may include from 0.001 grams to 0.1 grams, 0.005 to 0.05 grams, or from 0.01 grams to 0.03 grams of Column 9 metal(s) and/or Columns 10 metal(s) per gram of thirteenth catalyst. The thirteenth catalyst may include, per gram of thirteenth catalyst, from 0.01 grams to 0.8 grams, 0.02 grams to 0.7 grams, or 0.03 grams to 0.6 grams of mineral oxides. The thirteenth catalyst has, in some embodiments, a pore size distribution with a median pore diameter from 50 Å to 130 Å. The thirteenth catalyst may have less than 1% of pores having a pore size of at most 70 Å; from 20% to 30% of pores having a pore size between 70-100 Å; from 30% to 40% of pores having a pore size between 100-130 Å; from 1% to 10% of pores having a pore size between 130-150 Å; from 0.1% to 5% of pores having a pore size between 150-180 Å; from 0.1% to 5% of pores having a pore size between 150-180 Å; from 0.1 to 5% of pores having a pore size between 180-200 Å; from 0.001% to 1% of pores having a pore size between 200-1000 Å; from 1% to 10% of pores having a pore size between 1000-5000 Å; from 20% to 25% of pores having a pore size of at least 5000 Å The thirteenth catalyst may reduce at least a portion of the components that contribute to higher viscosities, a portion of the components that contribute to residue, $C_5$ asphaltenes, and/or basic nitrogen compounds in the hydrocarbon feed.

Other embodiments of the first through thirteenth catalysts may also be made and/or used as is otherwise described herein.

Selecting the catalyst(s) of this application and controlling operating conditions may allow a crude product to be produced that has TAN and/or selected properties changed relative to the hydrocarbon feed while other properties of the hydrocarbon feed are not significantly changed. The resulting crude product may have enhanced properties relative to the hydrocarbon feed and, thus, be more acceptable for transportation and/or refining.

Arrangement of two or more catalysts in a selected sequence may control the sequence of property improvements for the hydrocarbon feed. For example, TAN, API gravity, at least a portion of the $C_5$ asphaltenes, at least a portion of the iron, at least a portion of the nickel, and/or at least a portion of the vanadium in the hydrocarbon feed can be reduced before at least a portion of heteroatoms in the hydrocarbon feed are reduced.

Arrangement and/or selection of the catalysts may, in some embodiments, improve lives of the catalysts and/or the stability of the hydrocarbon feed/total product mixture. Improvement of a catalyst life and/or stability of the hydrocarbon feed/total product mixture during processing may allow a contacting system to operate for at least 3 months, at least 6 months, or at least 1 year without replacement of the catalyst in the contacting zone.

Combinations of selected catalysts may allow reduction in at least a portion of the Ni/V/Fe, at least a portion of the $C_5$ asphaltenes, at least a portion of the metals in metal salts of organic acids, at least a portion of the components that contribute to TAN, at least a portion of the residue, or combinations thereof, from the hydrocarbon feed before other properties of the hydrocarbon feed are changed, while maintaining the stability of the hydrocarbon feed/total product mixture during processing (for example, maintaining a hydrocarbon feed P-value of above 1.5). Alternatively, $C_5$ asphaltenes, TAN, and/or API gravity may be incrementally reduced by contact of the hydrocarbon feed with selected catalysts. The ability to incrementally and/or selectively change properties of the hydrocarbon feed may allow the stability of the hydrocarbon feed/total product mixture to be maintained during processing.

In some embodiments, the first catalyst (described above) may be positioned upstream of a series of catalysts. Such positioning of the first catalyst may allow removal of high molecular weight contaminants, metal contaminants, and/or metals in metal salts of organic acids, while maintaining the stability of the hydrocarbon feed/total product mixture.

The first catalyst allows, in some embodiments, for removal of at least a portion of Ni/V/Fe, removal of acidic components, removal of components that contribute to a decrease in the life of other catalysts in the system, or combinations thereof, from the hydrocarbon feed. For example, reducing at least a portion of $C_5$ asphaltenes in the hydrocarbon feed/total product mixture relative to the hydrocarbon feed inhibits plugging of other catalysts positioned downstream, and thus, increases the length of time the contacting system may be operated without replenishment of catalyst. Removal of at least a portion of the Ni/V/Fe from the hydrocarbon feed may, in some embodiments, increase a life of one or more catalysts positioned after the first catalyst.

The second catalyst(s) and/or the third catalyst(s) may be positioned downstream of the first catalyst. Further contact of the hydrocarbon feed/total product mixture with the second catalyst(s) and/or third catalyst(s) may further reduce TAN, reduce the content of Ni/V/Fe, reduce sulfur content, reduce oxygen content, and/or reduce the content of metals in metal salts of organic acids.

In some embodiments, contact of the hydrocarbon feed with the second catalyst(s) and/or the third catalyst(s) may produce a hydrocarbon feed/total product mixture that has a reduced TAN, a reduced sulfur content, a reduced oxygen content, a reduced content of metals in metal salts of organic acids, a reduced asphaltenes content, a reduced viscosity, or combinations thereof, relative to the respective properties of the hydrocarbon feed while maintaining the stability of the hydrocarbon feed/total product mixture during processing. The second catalyst may be positioned in series, either with the second catalyst being upstream of the third catalyst, or vice versa.

The ability to deliver hydrogen to specified contacting zones tends to minimize hydrogen usage during contacting. Combinations of catalysts that facility generation of hydrogen during contacting, and catalysts that uptake a relatively low amount of hydrogen during contacting, may be used to change selected properties of a crude product relative to the same properties of the hydrocarbon feed. For example, the fourth catalyst may be used in combination with the first catalyst(s), second catalyst(s), third catalyst(s), fifth catalyst(s), sixth catalyst(s), and/or seventh catalyst(s) to change selected properties of a hydrocarbon feed, while only changing other properties of the hydrocarbon feed by selected amounts, and/or while maintaining hydrocarbon feed/total product stability. The order and/or number of catalysts may be selected to minimize net hydrogen uptake while maintaining the hydrocarbon feed/total product stability. Minimal net hydrogen uptake allows residue content, VGO content, distillate content, API gravity, or combinations thereof of the hydrocarbon feed to be maintained within 20% of the respective properties of the hydrocarbon feed, while the TAN and/or the viscosity of the crude product is at most 90% of the TAN and/or the viscosity of the hydrocarbon feed.

Reduction in net hydrogen uptake by the hydrocarbon feed may produce a crude product that has a boiling range distribution similar to the boiling point distribution of the hydrocarbon feed, and a reduced TAN relative to the TAN of the hydrocarbon feed. The atomic H/C of the crude product may also only change by relatively small amounts as compared to the atomic H/C of the hydrocarbon feed.

Hydrogen generation in specific contacting zones may allow selective addition of hydrogen to other contacting zones and/or allow selective reduction of properties of the hydrocarbon feed. In some embodiments, fourth catalyst(s) may be positioned upstream, downstream, or between additional catalyst(s) described herein. Hydrogen may be generated during contacting of the hydrocarbon feed with the fourth catalyst(s), and hydrogen may be delivered to the contacting zones that include the additional catalyst(s). The delivery of the hydrogen may be counter to the flow of the hydrocarbon feed. In some embodiments, the delivery of the hydrogen may be concurrent to the flow of the hydrocarbon feed.

For example, in a stacked configuration (see, for example, FIG. 2B), hydrogen may be generated during contacting in one contacting zone (for example, contacting zone 102 in FIG. 2B), and hydrogen may be delivered to an additional contacting zone (for example, contacting zone 114 in FIG. 2B) in a direction that is counter to flow of the hydrocarbon feed. In some embodiments, the hydrogen flow may be concurrent with the flow of the hydrocarbon feed. Alternatively, in a stacked configuration (see, for example, FIG. 3B), hydrogen may be generated during contacting in one contacting zone (for example, contacting zone 102 in FIG. 3B). A hydrogen source may be delivered to a first additional contacting zone in a direction that is counter to flow of the hydrocarbon feed (for example, adding hydrogen through conduit 106' to contacting zone 114 in FIG. 3B), and to a second additional contacting zone in a direction that is concurrent to the flow of the hydrocarbon feed (for example, adding hydrogen through conduit 106' to contacting zone 116 in FIG. 3B).

In some embodiments, the fourth catalyst and the sixth catalyst are used in series, either with the fourth catalyst being upstream of the sixth catalyst, or vice versa. The combination of the fourth catalyst with an additional catalyst(s) may reduce TAN, reduce Ni/V/Fe content, and/or reduce a content of metals in metal salts of organic acids, with low net uptake of hydrogen by the hydrocarbon feed. Low net hydrogen uptake may allow other properties of the crude product to be only changed by small amounts relative to the same properties of the hydrocarbon feed.

In some embodiments, two different seventh catalysts may be used in combination. The seventh catalyst used upstream from the downstream seventh catalyst may have a total content of Column 6 metal(s), per gram of catalyst, in a range from 0.0001-0.06 grams. The downstream seventh catalyst may have a total content of Column 6 metals(s), per gram of downstream seventh catalyst, that is equal to or larger than the total content of Column 6 metal(s) in the upstream seventh catalyst, or at least 0.02 grams of Column 6 metal(s) per gram of catalyst. In some embodiments, the position of the upstream seventh catalyst and the downstream seventh catalyst may be reversed. The ability to use a relatively small amount of catalytic active metal in the downstream seventh catalyst may allow other properties of the crude product to be only changed by small amounts relative to the same properties of the hydrocarbon feed (for example, a relatively small change in heteroatom content, API gravity, residue content, VGO content, or combinations thereof).

Contact of the hydrocarbon feed with the upstream and downstream seventh catalysts may produce a crude product that has a TAN of at most 90%, at most 80%, at most 50%, at most 10%, or at least 1% of the TAN of the hydrocarbon feed. In some embodiments, the TAN of the hydrocarbon feed may be incrementally reduced by contact with the upstream and downstream seventh catalysts (for example, contact of the hydrocarbon feed with a catalyst to form an initial crude product with changed properties relative to the hydrocarbon feed, and then contact of the initial crude product with an additional catalyst to produce the crude product with changed properties relative to the initial crude product). The ability to reduce TAN incrementally may assist in maintaining the stability of the hydrocarbon feed/total product mixture during processing.

In some embodiments, catalyst selection and/or order of catalysts in combination with controlled contacting conditions (for example, temperature and/or hydrocarbon feed flow rate) may assist in reducing hydrogen uptake by the hydrocarbon feed, maintaining hydrocarbon feed/total product mixture stability during processing, and changing one or more properties of the crude product relative to the respective properties of the hydrocarbon feed. Stability of the hydrocarbon feed/total product mixture may be affected by various phases separating from the hydrocarbon feed/total product mixture. Phase separation may be caused by, for example, insolubility of the hydrocarbon feed and/or crude product in the hydrocarbon feed/total product mixture, flocculation of asphaltenes from the hydrocarbon feed/total product mixture, precipitation of components from the hydrocarbon feed/total product mixture, or combinations thereof.

At certain times during the contacting period, the concentration of hydrocarbon feed and/or total product in the hydrocarbon feed/total product mixture may change. As the concentration of the total product in the hydrocarbon feed/total product mixture changes due to formation of the crude product, solubility of the components of the hydrocarbon feed and/or components of the total product in the hydrocarbon feed/total product mixture tends to change. For example, the hydrocarbon feed may contain components that are soluble in the hydrocarbon feed at the beginning of processing. As properties of the hydrocarbon feed change (for example, TAN, MCR, $C_5$ asphaltenes, P-value, or combinations thereof), the components may tend to become less soluble in the hydrocarbon feed/total product mixture. In some instances, the hydrocarbon feed and the total product may form two phases and/or become insoluble in one another. Solubility changes may also result in the hydrocarbon feed/total product mixture forming two or more phases. Formation of two phases, through flocculation of asphaltenes, change in concentration of hydrocarbon feed and total product, and/or precipitation of components, tends to reduce the life of one or more of the catalysts. Additionally, the efficiency of the process may be reduced. For example, repeated treatment of the hydrocarbon feed/total product mixture may be necessary to produce a crude product with desired properties.

During processing, the P-value of the hydrocarbon feed/total product mixture may be monitored and the stability of the process, hydrocarbon feed, and/or hydrocarbon feed/total product mixture may be assessed. Typically, a P-value that is at most 1.0 indicates that flocculation of asphaltenes from the hydrocarbon feed generally occurs. If the P-value is initially at least 1.0, and such P-value increases or is relatively stable during contacting, then this indicates that the hydrocarbon feed is relatively stabile during contacting. Hydrocarbon feed/total product mixture stability, as assessed by P-value, may be controlled by controlling contacting conditions, by selection of catalysts, by selective ordering of catalysts, or combinations thereof. Such controlling of contacting conditions may include controlling LHSV, temperature, pressure, hydrogen uptake, hydrocarbon feed flow, or combinations thereof.

Typically, hydrocarbon feed having viscosities that inhibit the hydrocarbon feed from being transported and/or pumped are contacted at elevated hydrogen pressures (for example, at least 7 MPa, at least 10 MPa or at least 15 MPa) to produce products that are more fluid. At elevated hydrogen pressures coke formation is inhibited, thus the properties of the hydrocarbon feed may be changed with minimal coke production. Since reduction of viscosity, residue and $C_5/C_7$ asphaltenes is not dependent on hydrogen pressure reduction of these properties may not occur unless the contacting temperature is at least 300° C. For some hydrocarbon feeds, temperatures of at least 350° C. may be required to reduce desired properties of the hydrocarbon feed to produce a product that meets the desired specifications. At increased temperatures coke formation may occur, even at elevated hydrogen pressures. As the properties of the hydrocarbon feed are changed, the P-value of the hydrocarbon feed/total product may decrease below 1.0 and/or sediment may form, causing the product mixture to become unstable. Since, elevated hydrogen pressures require large amounts of hydrogen, a process capable of reducing properties that are independent of pressure at minimal temperatures is desirable.

Contact of a hydrocarbon feed having a viscosity of at least 10 cSt at 37.8° C. (for example, at least 100 cSt, at least 1000 cSt, or at least 2000 cSt) in a controlled temperature range of 370° C. to 450° C., 390° C. to 440° C., or from 400° C. to 430° C. at pressures of at most 7 MPa with one or more catalysts described herein produces a crude product having changed properties (for example, viscosity, residue and $C_5/C_7$ asphaltenes) of at most 50%, at most 30%, at most 20%, at most 10%, at most 1% of the respective property of the hydrocarbon feed. During contact, the P-value remains may be kept above 1.0 by controlling the contacting temperature. For example, in some embodiments, if the temperature increases above 450° C., the P-value drops below 1.0 and the hydrocarbon feed/total product mixture becomes unstable. If the temperature decreases below 370° C., minimal changes to the hydrocarbon feed properties occurs.

In some embodiments, contacting temperatures are controlled such that $C_5$ asphaltenes and/or other asphaltenes are removed while maintaining the MCR content of the hydrocarbon feed. Reduction of the MCR content through hydrogen uptake and/or higher contacting temperatures may result in formation of two phases that may reduce the stability of the hydrocarbon feed/total product mixture and/or life of one or more of the catalysts. Control of contacting temperature and hydrogen uptake in combination with the catalysts described herein allows the $C_5$ asphaltenes to be reduced while the MCR content of the hydrocarbon feed only changes by a relatively small amount.

In some embodiments, contacting conditions are controlled such that temperatures in one or more contacting zones may be different. Operating at different temperatures allows for selective change in hydrocarbon feed properties while maintaining the stability of the hydrocarbon feed/total product mixture. The hydrocarbon feed enters a first contacting zone at the start of a process. A first contacting temperature is the temperature in the first contacting zone. Other contacting temperatures (for example, second temperature, third temperature, fourth temperature, et cetera) are the temperatures in contacting zones that are positioned after the first contacting zone. A first contacting temperature may be in a range from 100-420° C. and a second contacting temperature may be in a range that is 20-100° C., 30-90° C., or 40-60° C. different than the first contacting temperature. In some embodiments, the second contacting temperature is greater than the first contacting temperature. Having different contacting temperatures may reduce TAN and/or $C_5$ asphaltenes content in a crude product relative to the TAN and/or the $C_5$ asphaltenes content of the hydrocarbon feed to a greater extent than the amount of TAN and/or $C_5$ asphaltene reduction, if any, when the first and second contacting temperatures are the same as or within 10° C. of each other.

For example, a first contacting zone may include a first catalyst(s) and/or a fourth catalyst(s) and a second contacting zone may include other catalyst(s) described herein. The first contacting temperature may be 350° C. and the second contacting temperature may be 300° C. Contact of the hydrocarbon feed in the first contacting zone with the first catalyst and/or fourth catalyst at the higher temperature prior to contact with the other catalyst(s) in the second contacting zone may result in greater TAN and/or $C_5$ asphaltenes reduction in the hydrocarbon feed relative to the TAN and/or $C_5$ asphaltenes reduction in the same hydrocarbon feed when the first and second contacting temperatures are within 10° C.

In some embodiments, contacting conditions are controlled such that the total hydrogen partial pressure of the contacting zone is maintained at a desired pressure, at a set flow rate and elevated temperatures. The ability to operate at partial pressures of hydrogen of at most 3.5 MPa allows an increase in LHSV (for example an increase to at least 0.5 $h^{-1}$, at least 1 $h^{-1}$, at least 2 $h^{-1}$, at least 5 $h^{-1}$, or at least 10 $h^{-1}$) with the same or longer catalyst life as contacting at hydrogen partial pressures of at least 4 MPa. Operating at lower partial pressures of hydrogen decreases the cost of the operation and allows contacting to be performed where limited amounts of hydrogen are available.

For example, a contacting zone may include a fourth catalyst and/or a fifth catalyst. The contacting conditions may be: temperature of above 360° C., a LHSV of 1 $h^{-1}$, a total hydrogen partial pressure of 3.5 MPa. Contact of the hydrocarbon feed with the fourth and/or fifth catalyst at these conditions may allow continuous use of a catalyst for at least 500 hours, while reducing desired properties of the hydrocarbon feed.

In some embodiments, removal of at least a portion of the organometallic compounds and/or metals from the hydrocarbon feed is performed before the hydrocarbon feed is contacted with other catalysts. For example, a small amount of organomolybdenum (for example, at most 50 wtppm, at most 20 wtppm, or at most 10 wtppm) in a hydrocarbon feed may reduce the activity of a catalyst upon contact of the hydrocarbon feed with the catalyst. Organomolybdenum may form molybdenum sulfides during contacting with the catalyst. The molybdenum sulfides may precipitate from solution causing solid molybdenum compounds to accumulate in the reactor. The accumulation of precipitates in the reactor may lead to a pressure drop in the contacting zone, thus inhibiting hydrocarbon feed from passing through the contacting zone at desired flow rates. Organometallic compounds may also promote formation of coke during contacting. Removal of at least a portion of the "active" organometallic compounds and/or metals from the hydrocarbon feed may increase the lives of catalysts used in a hydroprocessing process and/or increase efficiency of the treatment process. Removal of the active organometallic compounds may further allow the hydrocarbon feed to be processed in a more efficient manner. For example, a first contacting zone may include an eighth catalyst and a second contacting zone may include a ninth catalyst. Contact of a hydrocarbon feed having at least 0.1 wtppm of molybdenum at contacting temperatures of at most 7 MPa, a LHSV of at least 0.1 $h^{-1}$, and a temperature of at least 300° C. with the eight catalyst may result in reduction of at least a portion of the organomolybdenum in the hydrocarbon feed. Contact of the reduced molybdenum hydrocarbon feed with the ninth catalyst may result in at least a portion of the Ni/V/Fe and at least a portion of the components contributing residue, $C_5/C_7$ asphaltenes, and/or viscosity to be reduced to produce a crude product suitable for transportation and/or further processing.

In some embodiments, a sixth catalyst and/or tenth catalyst may be positioned in a third contacting zone downstream of the first contacting zone and upstream of the second contacting zone. Contact of the reduced molybdenum hydrocarbon feed with the catalyst in the third contacting zone may reduce additional amounts of Ni/V/Fe without an increasing the operating pressure above 7 MPa.

Hydrocarbon feeds having an API gravity of at most 10 (for example, bitumen and/or heavy oil/tar sands crude) may be converted into various hydrocarbons streams through a series of processing steps. For example, crude may be mined from a hydrocarbon formation and bitumen may be extracted from the crude. During the extraction process, the bitumen is diluted with naphtha. Before the bitumen is treated, the diluent naphtha is removed and the resulting product is vacuum distilled unit to produce light hydrocarbons and heavy hydrocarbons. The light hydrocarbons are transported for further processing. The heavier bitumen components are typically processed in one or more cokers and one or more residue hydrocracking units (for example, ebullating bed units such as an LC-Finer). Coking (for example, fluid coking and/or delayed coking processes) involves the thermal cracking of bitumen molecules into lighter components.

In the residue hydrocracking unit, heavier bitumen components are contacted with a catalyst in the presence of hydrocarbons to produce lighter components and an unconverted residual stream. The unconverted residual stream may be sent to the fluid cokers to supplement the feed to those units. The residue hydrocracking unit may process 50,000 barrels per day of a 60/40 mix of bitumen and vacuum topped bitumen feed.

Reduction of the viscosity and/or residue content of a hydrocarbon feed to produce a feed stream that may be processed in a residue hydrocracking unit may enhance the processing rate of hydrocarbon feed. A system using the methods and catalysts described herein to change properties of a hydrocarbon feed may be positioned upstream of one or more cracking units (for example, an ebullating bed cracking unit, a fluid catalytic cracking unit, thermal cracking unit, or other units known to convert hydrocarbon feed to lighter components). Treatment of the hydrocarbon feed in one or more systems described herein may produce a feed that improves the processing rate of the cracking unit by at least a factor of 2, at least a factor of 4, at least a factor of 10, or at least a factor of 100. For example, a system for treating a hydrocarbon feed having a viscosity of at least 100 cSt at 37.8° C. and/or 0.1 grams of residue per gram of hydrocarbon feed may include one or more contacting systems described herein positioned upstream of a cracking unit. The contacting system may include one or more catalysts described herein capable of producing a crude product having a viscosity of at most 50% of the viscosity of the hydrocarbon feed at 37.8° C. and/or at most 90% of the residue of the hydrocarbon feed. The crude product and/or a mixture of the crude product and hydrocarbon feed may enter a residue hydrocracking unit. Since the crude product and/or mixture of the crude product and hydrocarbon feed has a lower viscosity than the original hydrocarbon feed, the processing rate through the cracking unit may be improved.

Hydrocarbon feeds having at least 0.01 grams of $C_5$ asphaltenes may be deasphalted prior to hydroprocessing treatment in a refinery operation. Deasphalting processes may involve solvent extraction and/or contacting the crude with a catalyst to remove asphaltenes. Reduction of at least a portion of the components that contribute to viscosity, at least a portion of the components that contribute to residue and/or asphaltenes prior to the deasphalting process may eliminate the need for solvent extraction, reduce the amount of required solvent, and/or enhance the efficiency of the deasphalting process. For example, a system for treating a hydrocarbon feed having, per gram of hydrocarbon feed, at least 0.01 grams of $C_5$ asphaltenes and/or 0.1 grams of residue and a viscosity of at least 10 cSt at 37.8° C. may include one or more contacting systems described herein positioned upstream of an deasphalting unit. The contacting system may include one or more catalysts described herein capable of producing a crude product having a $C_5$ asphaltenes content of at most 50% of the hydrocarbon feed $C_5$ asphaltenes content, a residue content of at most 90% of the hydrocarbon feed residue content, a viscosity of at most 50% of the hydrocarbon viscosity or combinations thereof. The crude product and/or a mixture of the crude product and hydrocarbon feed may enter the deasphalting unit. Since the crude product and/or mixture of the crude product and the hydrocarbon feed has a lower asphaltene, residue and/or viscosity than the original hydrocarbon feed, the processing efficiency of the deasphalting unit may be increased by at least 5%, at least 10%, at least 20% or at least 50% of the original efficiency.

In some embodiments, contact of a crude feed with one or more catalysts described herein produces a crude product that has enhanced concentrations of naphtha. The naphtha may be separated from the crude product and mixed with crude feed to produce a feed that is suitable for transportation and/or meets pipeline specification. For example, a crude feed may be contacted with at least a third catalyst and a zeolite catalyst. The zeolite catalyst may be a 10 wt %, 20 wt %, 30 wt %, or 40 wt % USY zeolite catalyst, and/or an ultra stable Y zeolite catalyst. The zeolite catalyst may reduce a portion of the hydrocarbons to produce naphtha. The naphtha may be separated from the crude product using known fractional distillation methods and mixed with the crude feed, a different crude feed, and/or other hydrocarbons to form a blend.

EXAMPLES

Non-limiting examples of support preparation, catalyst preparations, and systems with selected arrangement of catalysts and controlled contacting conditions are set forth below.

Example 1

Preparation of a Catalyst Support

A support was prepared by mulling 576 grams of alumina (Criterion Catalysts and Technologies LP, Michigan City, Mich., U.S.A.) with 585 grams of water and 8 grams of glacial nitric acid for 35 minutes. The resulting mulled mixture was extruded through a 1.3 Trilobe™ die plate, dried between 90 and 125° C., and then calcined at 918° C., which resulted in 650 grams of a calcined support with a median pore diameter of 182 Å. The calcined support was placed in a Lindberg furnace. The furnace temperature was raised to 1000-1100° C. over 1.5 hours, and then held in this range for 2 hours to produce the support. The support included, per gram of support, 0.0003 grams of gamma alumina, 0.0008 grams of alpha alumina, 0.0208 grams of delta alumina, and 0.9781 grams of theta alumina, as determined by x-ray diffraction. The support had a surface area of 110 m$^2$/g and a total pore volume of 0.821 cm$^3$/g. The support had a pore size distribution with a median pore diameter of 232 Å, with 66.7% of the total number of pores in the pore size distribution having a pore diameter within 85 Å of the median pore diameter.

This example demonstrates how to prepare a support that has a pore size distribution of at least 180 Å and includes at least 0.1 grams of theta alumina.

Example 2

Preparation of a Vanadium Catalyst having a Pore Size Distribution with a Median Pore Diameter of at Least 230 Å

The vanadium catalyst was prepared in the following manner. The alumina support, prepared by the method described in Example 1, was impregnated with a vanadium impregnation solution prepared by combining 7.69 grams of VOSO$_4$ with 82 grams of deionized water. A pH of the solution was 2.27.

The alumina support (100 g) was impregnated with the vanadium impregnation solution, aged for 2 hours with occasional agitation, dried at 125° C. for several hours, and then calcined at 480° C. for 2 hours. The resulting catalyst contained 0.04 grams of vanadium, per gram of catalyst, with the balance being support. The vanadium catalyst had a pore size distribution with a median pore diameter of 350 Å, a pore volume of 0.69 cm$^3$/g, and a surface area of 110 m$^2$/g. Additionally, 66.7% of the total number of pores in the pore size distribution of the vanadium catalyst had a pore diameter within 70 Å of the median pore diameter.

This example demonstrates the preparation of a Column 5 catalyst having a pore size distribution with a median pore diameter of at least 230 Å.

Example 3

Preparation of a Molybdenum Catalyst having a Pore Size Distribution with a Median Pore Diameter of at Least 230 Å

The molybdenum catalyst was prepared in the following manner. The alumina support prepared by the method described in Example 1 was impregnated with a molybdenum impregnation solution. The molybdenum impregnation solution was prepared by combining 4.26 grams of (NH$_4$)$_2$Mo$_2$O$_7$, 6.38 grams of MoO$_3$, 1.12 grams of 30% H$_2$O$_2$, 0.27 grams of monoethanolamine (MEA), and 6.51 grams of deionized water to form a slurry. The slurry was heated to 65° C. until dissolution of the solids. The heated solution was cooled to room temperature. The pH of the solution was 5.36. The solution volume was adjusted to 82 mL with deionized water.

The alumina support (100 grams) was impregnated with the molybdenum impregnation solution, aged for 2 hours with occasional agitation, dried at 125° C. for several hours, and then calcined at 480° C. for 2 hours. The resulting catalyst contained 0.04 grams of molybdenum per gram of catalyst, with the balance being support. The molybdenum catalyst had a pore size distribution with a median pore diameter of 250 Å, a pore volume of 0.77 cm$^3$/g, and a surface area of 116 m$^2$/g. Additionally, 67.7% of the total number of pores in the pore size distribution of the molybdenum catalyst had a pore diameter within 86 Å of the median pore diameter.

Figure 7:
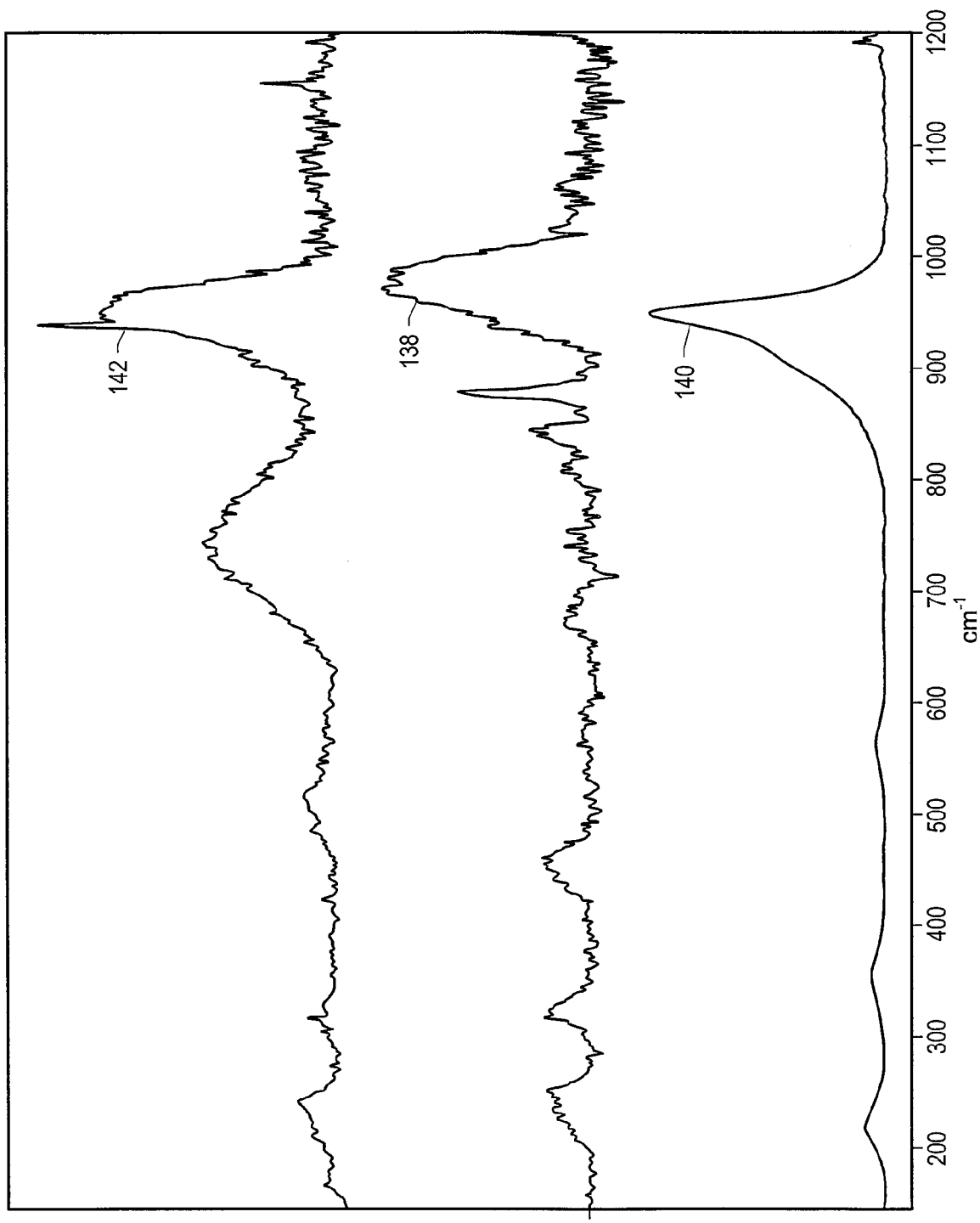
FIG. 7 depicts a Raman spectrum of a vanadium catalyst and various molybdenum catalysts.

The molybdenum catalyst exhibited bands near 810 cm$^{-1}$, 834 cm$^{-1}$, and 880 cm$^{-1}$ when analyzed by Raman Spectroscopy. The Raman spectrum of the catalyst was obtained on a Chromex Raman 200 spectrometer operated at four-wavenumber resolution. The excitation wavelength was 785 nm at a power of approximately 45 mW at the sample. The spectrometer wavenumber scale was calibrated using the known bands of 4-acetominophenol. The band positions of 4-actiominophenol were reproduced to within ±cm$^{-1}$. A molybdenum catalyst with a gamma alumina support did not exhibit bands between 810 cm$^{-1}$ and 900 cm$^{-1}$ when analyzed by Raman Spectroscopy. FIG. 7 depicts the spectrum of the two catalysts. Plot 138 represents the molybdenum catalyst having a pore size distribution with a median pore diameter of 250 Å. Plot 140 represents a Column 6/Column 10 metal catalyst that includes at least 0.5 grams of gamma alumina having a pore size distribution with a median pore diameter of 120 Å.

This example demonstrates the preparation of a Column 6 metal catalyst having a pore size distribution with a median pore diameter of at least 230 Å. This example also demonstrates preparation of a Column 6 metal catalyst having bands near 810 cm$^{-1}$, 834 cm$^{-1}$, and 880 cm$^{-1}$, as determined by Raman Spectroscopy. The catalyst prepared by this method is different than a gamma alumina catalyst having a pore size distribution with a median pore diameter of at least 100 Å.

Example 4

Preparation of a Molybdenum/Vanadium Catalyst having a Pore Size Distribution with a Median Pore Diameter of at Least 230 Å

The molybdenum/vanadium catalyst was prepared in the following manner. The alumina support, prepared by the method described in Example 1, was impregnated with a molybdenum/vanadium impregnation solution prepared as follows. A first solution was made by combining 2.14 grams of (NH$_4$)$_2$Mo$_2$O$_7$, 3.21 grams of MoO$_3$, 0.56 grams of 30% hydrogen peroxide (H$_2$O$_2$), 0.14 grams of monoethanolamine (MEA), and 3.28 grams of deionized water to form a slurry. The slurry was heated to 65° C. until dissolution of the solids. The heated solution was cooled to room temperature.

A second solution was made by combining 3.57 grams of VOSO$_4$ with 40 grams of deionized water. The first solution and second solution were combined and sufficient deionized water was added to bring the combined solution volume up to 82 ml to yield the molybdenum/vanadium impregnation solution. The alumina was impregnated with the molybdenum/vanadium impregnation solution, aged for 2 hours with occasional agitation, dried at 125° C. for several hours, and then calcined at 480° C. for 2 hours. The resulting catalyst contained, per gram of catalyst, 0.02 grams of vanadium and 0.02 grams of molybdenum, with the balance being support. The molybdenum/vanadium catalyst had a pore size distribution with a median pore diameter of 300 Å.

This example demonstrates the preparation of a Column 6 metal and a Column 5 metal catalyst having a pore size distribution with a median pore diameter of at least 230 Å. The vanadium/molybdenum catalyst exhibited bands near 770 cm$^{-1}$ and 990 cm$^{-1}$ when analyzed by Raman Spectroscopy. FIG. 7 depicts the spectrum of the vanadium catalyst. Plot 142 represents the molybdenum catalyst having a pore size distribution with a median pore diameter of 250 Å.

This example also demonstrates the preparation of a Column 5 catalyst having bands near 770 cm$^{-1}$ and 990 cm$^{-1}$ when analyzed by Raman Spectroscopy.

Example 5

Contact of a Crude Feed with Three Catalysts

A tubular reactor with a centrally positioned thermowell was equipped with thermocouples to measure temperatures throughout a catalyst bed. The catalyst bed was formed by filling the space between the thermowell and an inner wall of the reactor with catalysts and silicon carbide (20-grid, Stanford Materials; Aliso Viejo, Calif.). Such silicon carbide is believed to have low, if any, catalytic properties under the process conditions described herein. All catalysts were blended with an equal volume amount of silicon carbide before placing the mixture into the contacting zone portions of the reactor.

The crude feed flow to the reactor was from the top of the reactor to the bottom of the reactor. Silicon carbide was positioned at the bottom of the reactor to serve as a bottom support. A bottom catalyst/silicon carbide mixture (42 cm$^3$) was positioned on top of the silicon carbide to form a bottom contacting zone. The bottom catalyst had a pore size distribution with a median pore diameter of 77 Å, with 66.7% of the total number of pores in the pore size distribution having a pore diameter within 20 Å of the median pore diameter. The bottom catalyst contained 0.095 grams of molybdenum and 0.025 grams of nickel per gram of catalyst, with the balance being an alumina support.

A middle catalyst/silicone carbide mixture (56 cm$^3$) was positioned on top of the bottom contacting zone to form a middle contacting zone. The middle catalyst had a pore size distribution with a median pore diameter of 98 Å, with 66.7% of the total number of pores in the pore size distribution having a pore diameter within 24 Å of the median pore diameter. The middle catalyst contained 0.02 grams of nickel and 0.08 grams of molybdenum per gram of catalyst, with the balance being an alumina support.

A top catalyst/silicone carbide mixture (42 cm$^3$) was positioned on top of the middle contacting zone to form a top contacting zone. The top catalyst had a pore size distribution with a median pore diameter of 192 Å and contained 0.04 grams of molybdenum per gram of catalyst, with the balance being primarily a gamma alumina support.

Silicon carbide was positioned on top of the top contacting zone to fill dead space and to serve as a preheat zone. The catalyst bed was loaded into a Lindberg furnace that included five heating zones corresponding to the preheat zone, the top, middle, and bottom contacting zones, and the bottom support.

The catalysts were sulfided by introducing a gaseous mixture of 5 vol % hydrogen sulfide and 95 vol % hydrogen gas into the contacting zones at a rate of 1.5 liter of gaseous mixture per volume (mL) of total catalyst (silicon carbide was not counted as part of the volume of catalyst). Temperatures of the contacting zones were increased to 204° C. (400° F.) over 1 hour and held at 204° C. for 2 hours. After holding at 204° C., the contacting zones were increased incrementally to 316° C. (600° F.) at a rate of 10° C. (50° F.) per hour. The contacting zones were maintained at 316° C. for an hour, then incrementally raised to 370° C. (700° F.) over 1 hour and held at 370° C. for two hours. The contacting zones were allowed to cool to ambient temperature.

Crude from the Mars platform in the Gulf of Mexico was filtered, then heated in an oven at a temperature of 93° C. (200° F.) for 12-24 hours to form the crude feed having the properties summarized in Table 1, FIG. 8. The crude feed was fed to the top of the reactor. The crude feed flowed through the preheat zone, top contacting zone, middle contacting zone, bottom contacting zone, and bottom support of the reactor. The crude feed was contacted with each of the catalysts in the presence of hydrogen gas. Contacting conditions were as follows: ratio of hydrogen gas to the crude feed provided to the reactor was 328 Nm$^3$/m$^3$ (2000 SCFB), LHSV was 1 h$^{-1}$, and pressure was 6.9 MPa (1014.7 psi). The three contacting zones were heated to 370° C. (700° F.) and maintained at 370° C. for 500 hours. Temperatures of the three contacting zones were then increased and maintained in the following sequence: 379° C. (715° F.) for 500 hours, and then 388° C. (730° F.) for 500 hours, then 390° C. (734° F.) for 1800 hours, and then 394° C. (742° F.) for 2400 hours.

The total product (that is, the crude product and gas) exited the catalyst bed. The total product was introduced into a gas-liquid phase separator. In the gas-liquid separator, the total product was separated into the crude product and gas. Gas input to the system was measured by a mass flow controller. Gas exiting the system was measured by a wet test meter. The crude product was periodically analyzed to determine a weight percentage of components of the crude product. The results listed are averages of the determined weight percentages of components. Crude product properties are summarized in Table 1 of FIG. 8.

As shown in Table 1, the crude product had, per gram of crude product, a sulfur content of 0.0075 grams, a residue content of 0.255 grams, an oxygen content of 0.0007 grams. The crude product had a ratio of MCR content to C$_5$ asphaltenes content of 1.9 and a TAN of 0.09. The total of nickel and vanadium was 22.4 wtppm.

Figure 9:
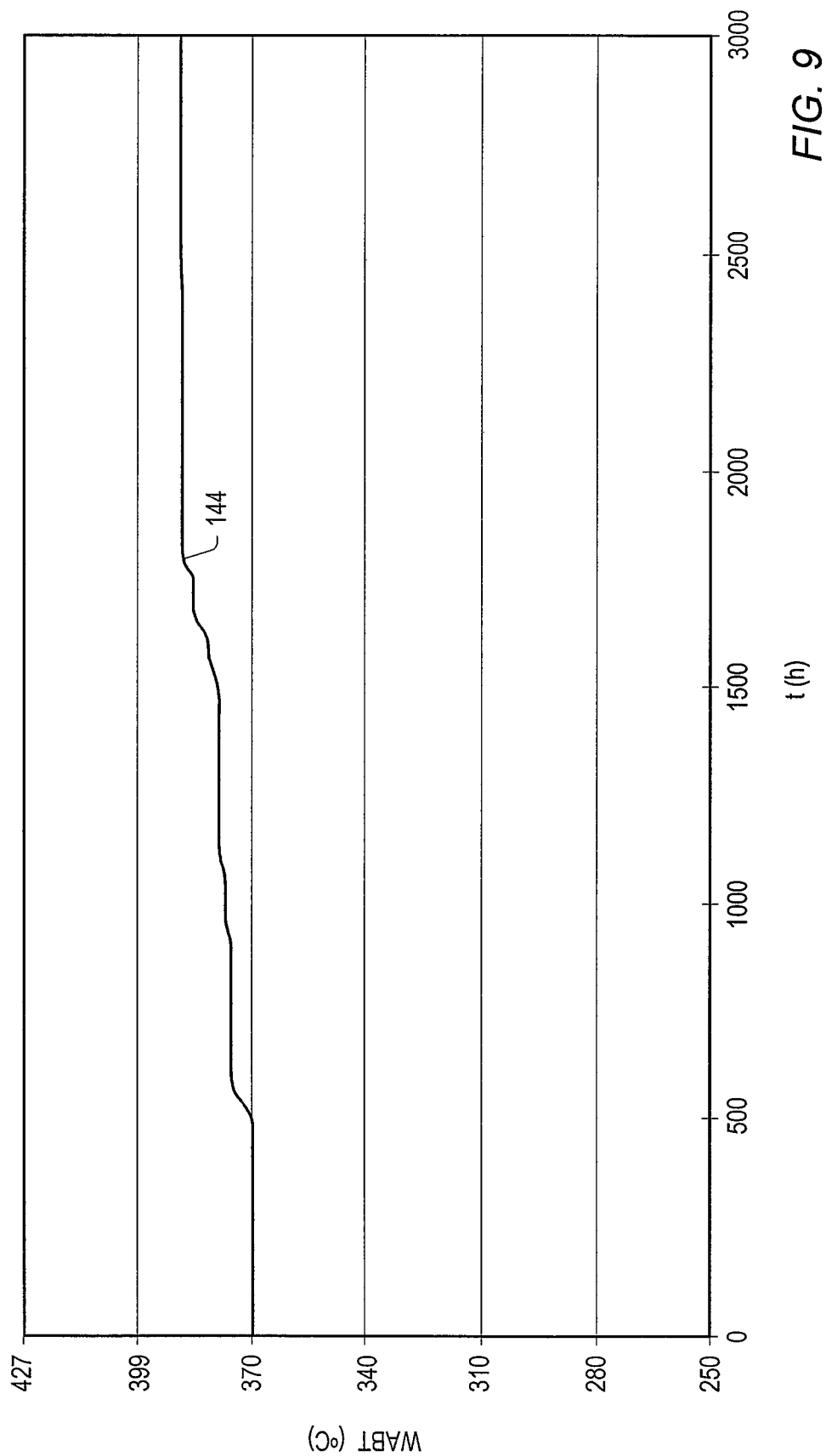
FIG. 9 is a graphical representation of weighted average bed temperature versus length of run for an embodiment of contacting the crude feed with one or more catalysts.

The lives of the catalysts were determined by measuring a weighted average bed temperature ("WABT") versus run length of the crude feed. The catalysts lives may be correlated to the temperature of the catalyst bed. It is believed that as catalyst life decreases, a WABT increases. FIG. 9 is a graphical representation of WABT versus time for improvement of the crude feed in the contacting zones described in this example. Plot 144 represents the average WABT of the three contacting zones versus hours of run time for contacting a crude feed with the top, middle, and bottom catalysts. Over a majority of the run time, the WABT of the contacting zones only changed approximately 20° C. From the relatively stable WABT, it was possible to estimate that the catalytic activity of the catalyst had not been affected. Typically, a pilot unit run time of 3000-3500 hours correlates to 1 year of commercial operation.

This example demonstrates that contacting the crude feed with one catalyst having a pore size distribution with a median pore diameter of at least 180 Å and additional catalysts having a pore size distribution with a median pore diameter in a range between 90-180 Å, with at least 60% of the total number of pores in the pore size distribution having a pore diameter within 45 Å of the median pore diameter, with controlled contacting conditions, produced a total product that included the crude product. As measured by P-value, crude feed/total product mixture stability was maintained. The crude product had reduced TAN, reduced Ni/V/Fe content, reduced sulfur content, and reduced oxygen content relative to the crude feed, while the residue content and the VGO content of the crude product was 90%-110% of those properties of the crude feed.

Example 6

Contact of a Crude Feed with Two Catalysts that have a Pore Size Distribution with a Median Pore Diameter in a Range between 90-180 Å

The reactor apparatus (except for the number and content of contacting zones), catalyst sulfiding method, method of separating the total product and method of analyzing the crude product were the same as described in Example 5. Each catalyst was mixed with an equal volume of silicon carbide.

The crude feed flow to the reactor was from the top of the reactor to the bottom of the reactor. The reactor was filled from bottom to top in the following manner. Silicon carbide was positioned at the bottom of the reactor to serve as a bottom support. A bottom catalyst/silicon carbide mixture (80 cm$^3$) was positioned on top of the silicon carbide to form a bottom contacting zone. The bottom catalyst had a pore size distribution with a median pore diameter of 127 Å, with 66.7% of the total number pores in the pore size distribution having a pore diameter within 32 Å of the median pore diameter. The bottom catalyst included 0.11 grams of molybdenum and 0.02 grams of nickel per gram of catalyst, with the balance being support.

A top catalyst/silicone carbide mixture (80 cm$^3$) was positioned on top of the bottom contacting zone to form the top contacting zone. The top catalyst had a pore size distribution with a median pore diameter of 100 Å, with 66.7% of the total number of pores in the pore size distribution having a pore diameter within 20 Å of the median pore diameter. The top catalyst included 0.03 grams of nickel and 0.12 grams of molybdenum per gram of catalyst, with the balance being alumina. Silicon carbide was positioned on top of the first contacting zone to fill dead space and to serve as a preheat zone. The catalyst bed was loaded into a Lindberg furnace that included four heating zones corresponding to the preheat zone, the two contacting zones, and the bottom support.

BS-4 crude (Venezuela) having the properties summarized in Table 2, FIG. 10, was fed to the top of the reactor. The crude feed flowed through the preheat zone, top contacting zone, bottom contacting zone, and bottom support of the reactor. The crude feed was contacted with each of the catalysts in the presence of hydrogen gas. The contacting conditions were as follows: ratio of hydrogen gas to the crude feed provided to the reactor was 160 Nm$^3$/m$^3$ (1000 SCFB), LHSV was 1 h$^{-1}$, and pressure was 6.9 MPa (1014.7 psi). The two contacting zones were heated to 260° C. (500° F.) and maintained at 260° C. (500° F.) for 287 hours. Temperatures of the two contacting zones were then increased and maintained in the following sequence: 270° C. (525° F.) for 190 hours, then 288° C. (550° F.) for 216 hours, then 315° C. (600° F.) for 360 hours, and then 343° C. (650° F.) for 120 hours for a total run time of 1173 hours.

The total product exited the reactor and was separated as described in Example 5. The crude product had an average TAN of 0.42 and an average API gravity of 12.5 during processing. The crude product had, per gram of crude product, 0.0023 grams of sulfur, 0.0034 grams of oxygen, 0.441 grams of VGO, and 0.378 grams of residue. Additional properties of the crude product are listed in TABLE 2 in FIG. 10.

This example demonstrates that contacting the crude feed with the catalysts having pore size distributions with a median pore diameter in a range between 90-180 Å produced a crude product that had a reduced TAN, a reduced Ni/V/Fe content, and a reduced oxygen content, relative to the properties of the crude feed, while residue content and VGO content of the crude product were 99% and 100% of the respective properties of the crude feed.

Example 7

Contact of a Crude Feed with Two Catalysts

The reactor apparatus (except for number and content of contacting zones), catalysts, the total product separation method, crude product analysis, and catalyst sulfiding method were the same as described in Example 6.

A crude feed (BC-11 crude) having the properties summarized in Table 3, FIG. 11, was fed to the top of the reactor. The crude feed flowed through the preheat zone, top contacting zone, bottom contacting zone, and bottom support of the reactor. The contacting conditions were as follows: ratio of hydrogen gas to the crude feed provided to the reactor was 80 Nm$^3$/m$^3$ (500 SCFB), LHSV was 2 h$^{-1}$, and pressure was 6.9 MPa (1014.7 psi). The two contacting zones were heated incrementally to 343° C. (650° F.). A total run time was 1007 hours. The crude product had an average TAN of 0.16 and an average API gravity of 16.2 during processing. The crude product had 1.9 wtppm of calcium, 6 wtppm of sodium, 0.6 wtppm of zinc, and 3 wtppm of potassium. The crude product had, per gram of crude product, 0.0033 grams of sulfur, 0.002 grams of oxygen, 0.376 grams of VGO, and 0.401 grams of residue. Additional properties of the crude product are listed in Table 3 in FIG. 11.

This example demonstrates that contacting of the crude feed with the selected catalysts with pore size distributions in a range of 90-180 Å produced a crude product that had a reduced TAN, a reduced total calcium, sodium, zinc, and potassium content while sulfur content, VGO content, and residue content of the crude product were 76%, 94%, and 103% of the respective properties of the crude feed.

Examples 8-11

Contact of a Crude Feed with Four Catalyst Systems and at Various Contacting Conditions Each reactor apparatus (except for the number and content of contacting zones), each total product separation method, and each crude product analysis were the same as described in Example 5. The catalysts were sulfided using the method as described in U.S. Pat. No. 6,290,841 to Gabrielov et al. All catalysts were mixed with silicon carbide in a volume ratio of 2 parts silicon carbide to 1 part catalyst unless otherwise indicated. The crude feed flow through each reactor was from the top of the reactor to the bottom of the reactor. Silicon carbide was positioned at the bottom of each reactor to serve as a bottom support. Each reactor had a bottom contacting zone and a top contacting zone. After the catalyst/silicone carbide mixtures were placed in the contacting zones of each reactor, silicone carbide was positioned on top of the top contacting zone to fill dead space and to serve as a preheat zone in each reactor. Each reactor was loaded into a Lindberg furnace that included four heating zones corresponding to the preheat zone, the two contacting zones, and the bottom support.

In Example 8, an uncalcined molybdenum/nickel catalyst/silicon carbide mixture (48 cm$^3$) was positioned in the bottom contacting zone. The catalyst included, per gram of catalyst, 0.146 grams of molybdenum, 0.047 grams of nickel, and 0.021 grams of phosphorus, with the balance being alumina support.

A molybdenum catalyst/silicon carbide mixture (12 cm$^3$) with the catalyst having a pore size distribution with a median pore diameter of 180 Å was positioned in the top contacting zone. The molybdenum catalyst had a total content of 0.04 grams of molybdenum per gram of catalyst, with the balance being support that included at least 0.50 grams of gamma alumina per gram of support.

In Example 9, an uncalcined molybdenum/cobalt catalyst/silicon carbide mixture (48 cm$^3$) was positioned in the both contacting zones. The uncalcined molybdenum/cobalt catalyst included 0.143 grams of molybdenum, 0.043 grams of cobalt, and 0.021 grams of phosphorus with the balance being alumina support.

A molybdenum catalyst/silicon carbide mixture (12 cm$^3$) was positioned in the top contacting zone. The molybdenum catalyst was the same as in the top contacting zone of Example 8.

In Example 10, the molybdenum catalyst as described in the top contacting zone of Example 8 was mixed with silicon carbide and positioned in the both contacting zones (60 cm$^3$).

In Example 11, an uncalcined molybdenum/nickel catalyst/silicone carbide mixture (48 cm$^3$) was positioned in the bottom contacting zone. The uncalcined molybdenum/nickel catalyst included, per gram of catalyst, 0.09 grams of molybdenum, 0.025 grams of nickel, and 0.01 grams of phosphorus, with the balance being alumina support.

A molybdenum catalyst/silicon carbide mixture (12 cm$^3$) was positioned in the top contacting zone. The molybdenum catalyst was the same as in the top contacting zone of Example 8.

Crude from the Mars platform (Gulf of Mexico) was filtered, then heated in an oven at a temperature of 93° C. (200° F.) for 12-24 hours to form the crude feed for Examples 8-11 having the properties summarized in Table 4, FIG. 12. The crude feed was fed to the top of the reactor in these examples. The crude feed flowed through the preheat zone, top contacting zone, bottom contacting zone, and bottom support of the reactor. The crude feed was contacted with each of the catalysts in the presence of hydrogen gas. Contacting conditions for each example were as follows: ratio of hydrogen gas to crude feed during contacting was 160 Nm$^3$/m$^3$ (1000 SCFB), and the partial pressure of hydrogen of each system was 6.9 MPa (1014.7 psi). LHSV was 2.0 h$^{-1}$ during the first 200 hours of contacting, and then lowered to 1.0 h$^{-1}$ for the remaining contacting times. Temperatures in all contacting zones were 343° C. (650° F.) for 500 hours of contacting. After 500 hours, the temperatures in all contacting zones were controlled as follows: the temperature in the contacting zones were raised to 354° C. (670° F.), held at 354° C. for 200 hours; raised to 366° C. (690° F.), held at 366° C. for 200 hours; raised to 371° C. (700° F.), held at 371° C. for 1000 hours; raised to 385° C. (725° C.), held at 385° C. for 200 hours; then raised to a final temperature of 399° C. (750° C.) and held at 399° C. for 200 hours, for a total contacting time of 2300 hours.

The crude products were periodically analyzed to determine TAN, hydrogen uptake by the crude feed, P-value, VGO content, residue content, and oxygen content. Average values for properties of the crude products produced in Examples 8-11 are listed in Table 4 in FIG. 12.

Figure 13:
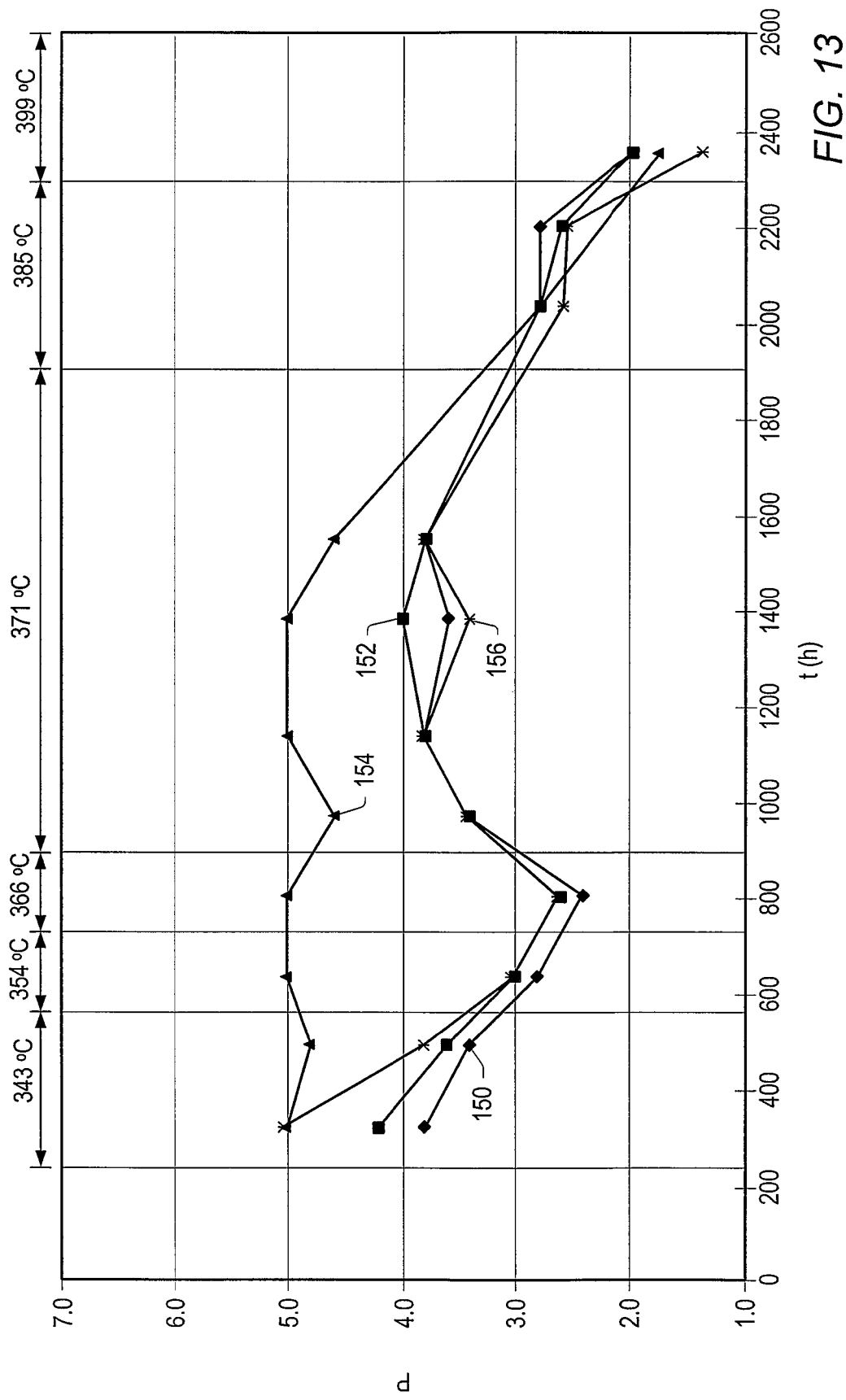
FIG. 13 is a graphical representation of P-value of crude products versus run time for embodiments of contacting crude feeds with four different catalyst systems.

FIG. 13 is a graphical representation of P-value of the crude product versus run time for each of the catalyst systems of Examples 8-11. The crude feed had a P-value of at least 1.5. Plots 150, 152, 154, and 156 represent the P-value of the crude product obtained by contacting the crude feed with the four catalyst systems of Examples 8-11 respectively. For 2300 hours, the P-value of the crude product remained of at least 1.5 for catalyst systems of Examples 8-10. In Example 11, the P-value was above 1.5 for most of the run time. At the end of the run (2300 hours) for Example 11, the P-value was 1.4. From the P-value of the crude product for each trial, it may be inferred that the crude feed in each trial remained relatively stable during contacting (for example, the crude feed did not phase separate). As shown in FIG. 13, the P-value of the crude product remained relatively constant during significant portions of each trial, except in Example 10, in which the P-value increased.

Figure 14:
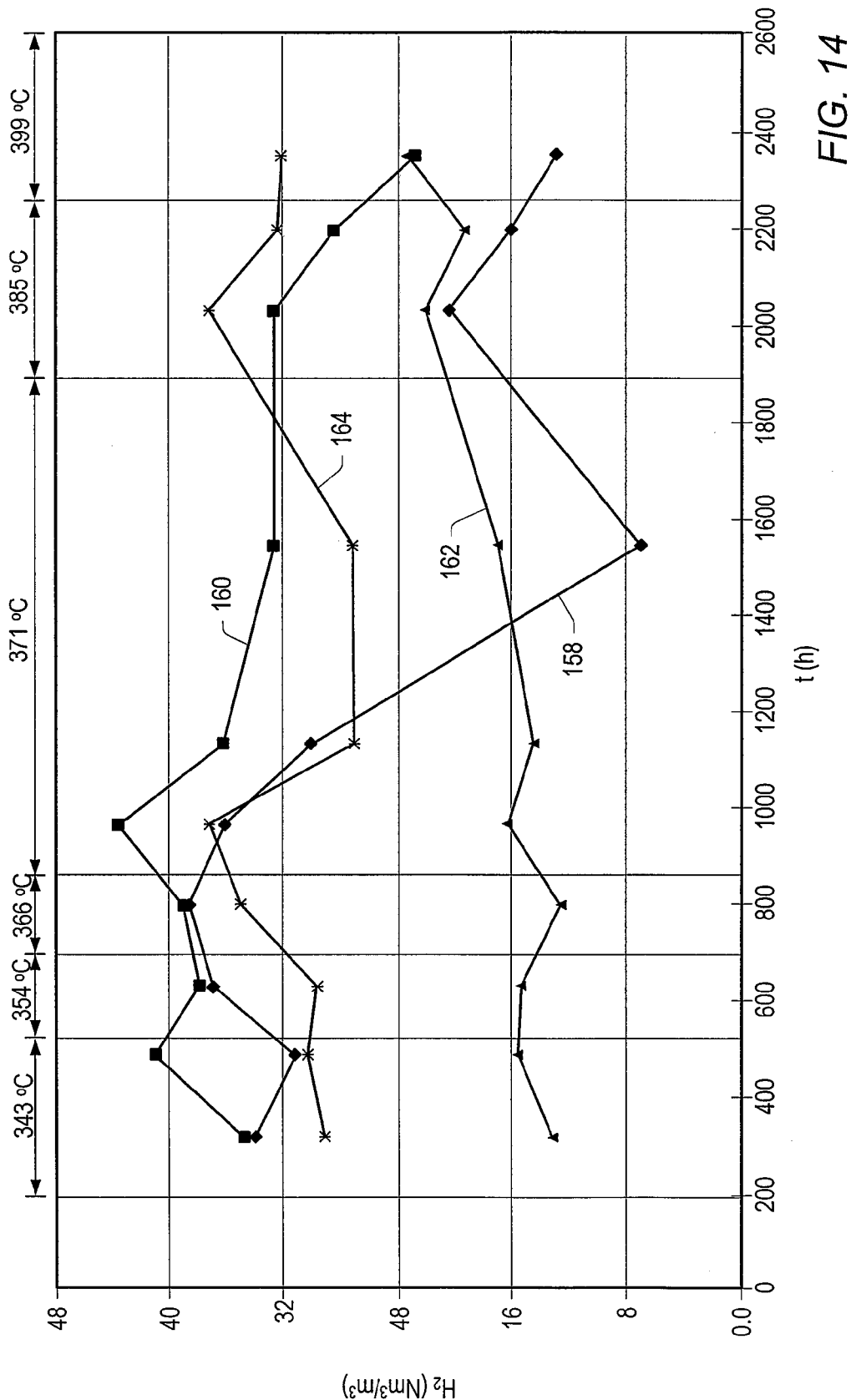
FIG. 14 is a graphical representation of net hydrogen uptake by crude feeds versus run time for embodiments of contacting crude feeds with four different catalyst systems.

FIG. 14 is a graphical representation of net hydrogen uptake by crude feed versus run time for four catalyst systems in the presence of hydrogen gas. Plots 158, 160, 162, 164 represent net hydrogen uptake obtained by contacting the crude feed with each of the catalyst systems of Examples 8-11, respectively. Net hydrogen uptake by a crude feed over a run time period of 2300 hours was in a range between 7-48 Nm$^3$/m$^3$ (43.8-300 SCFB). As shown in FIG. 14, the net hydrogen uptake of the crude feed was relatively constant during each trial.

Figure 15:
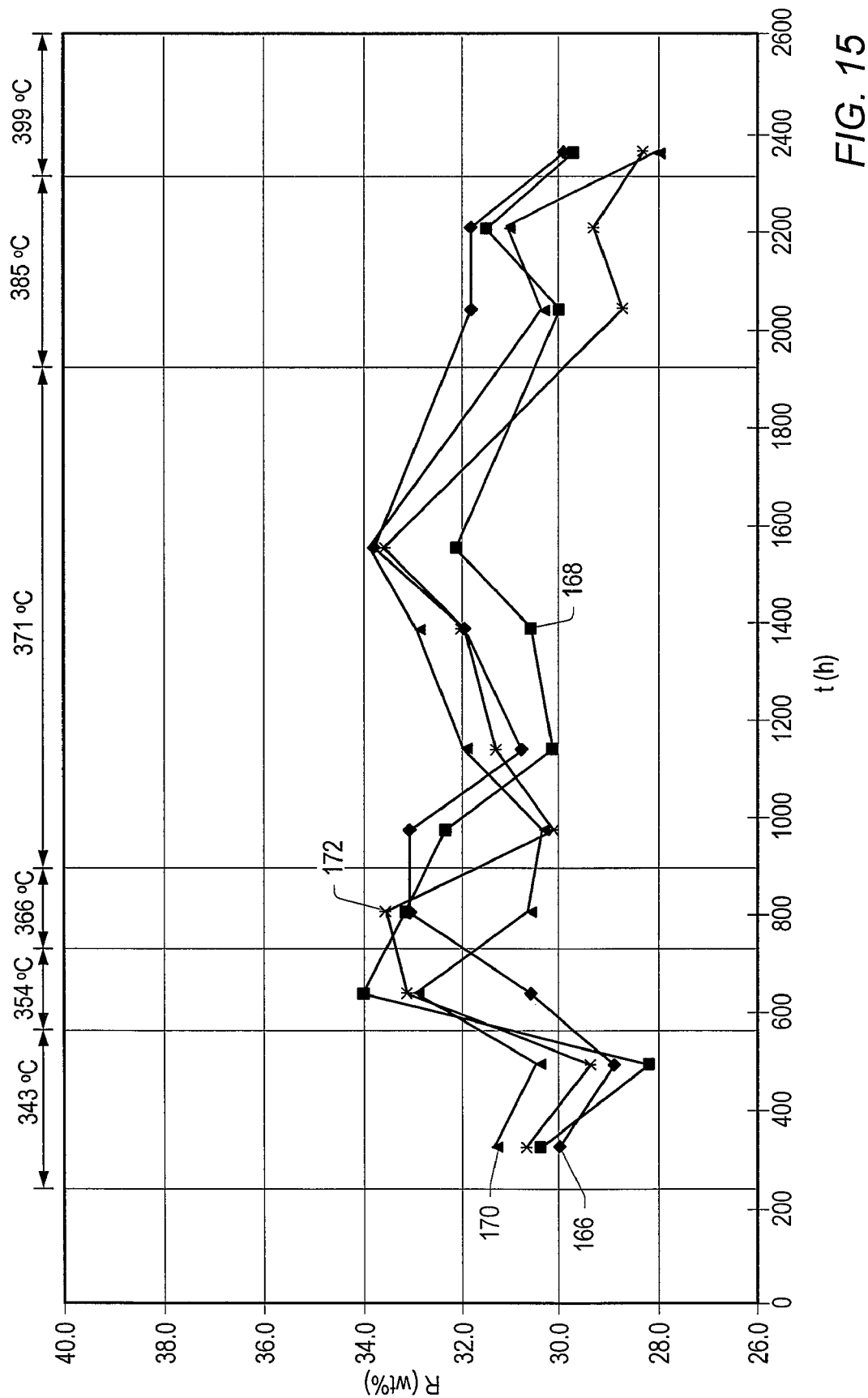
FIG. 15 is a graphical representation of residue content, expressed in weight percentage, of crude products versus run time for embodiments of contacting crude feeds with four different catalyst systems.

FIG. 15 is a graphical representation of residue content, expressed in weight percentage, of crude product versus run time for each of the catalyst systems of Examples 8-11. In each of the four trials, the crude product had a residue content of 88-90% of the residue content of the crude feed. Plots 166, 168, 170, 172 represent residue content of the crude product obtained by contacting the crude feed with the catalyst systems of Examples 8-11, respectively. As shown in FIG. 15, the residue content of the crude product remained relatively constant during significant portions of each trial.

Figure 16:
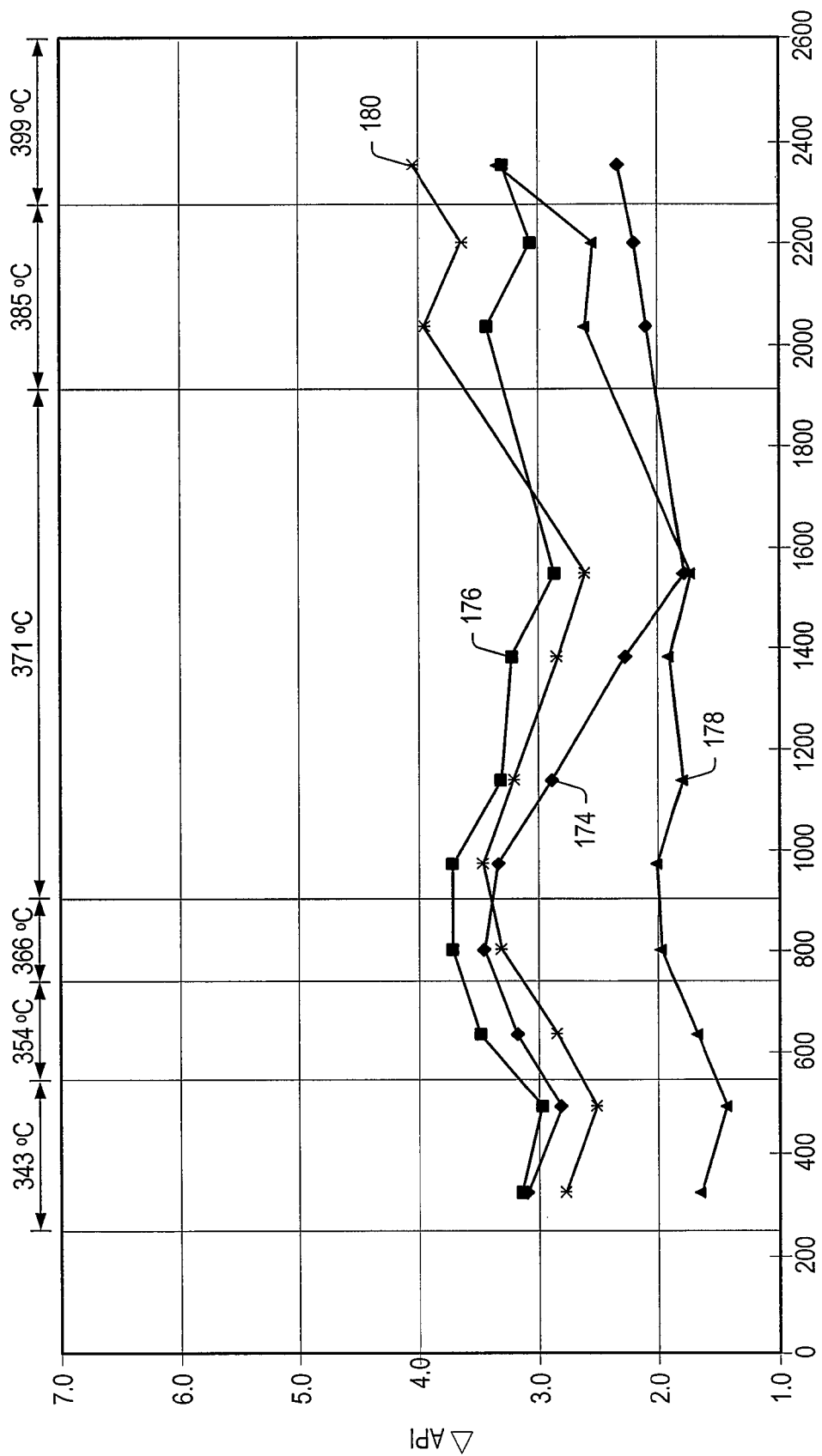
FIG. 16 is a graphical representation of change in API gravity of crude products versus run time for embodiments of contacting the crude feed with four different catalyst systems.

FIG. 16 is a graphical representation of change in API gravity of the crude product versus run time for each of the catalyst systems of Examples 8-11. Plots 174, 176, 178, 180 represent API gravity of the crude product obtained by contacting the crude feed with the catalyst systems of Examples 8-11, respectively. In each of the four trials, each crude product had a viscosity in a range from 58.3-72.7 cSt. The API gravity of each crude products increased by 1.5 to 4.1 degrees. The increased API gravity corresponds to an API gravity of the crude products in a range from 21.7-22.95. API gravity in this range is 110-117% of the API gravity of the crude feed.

Figure 17:
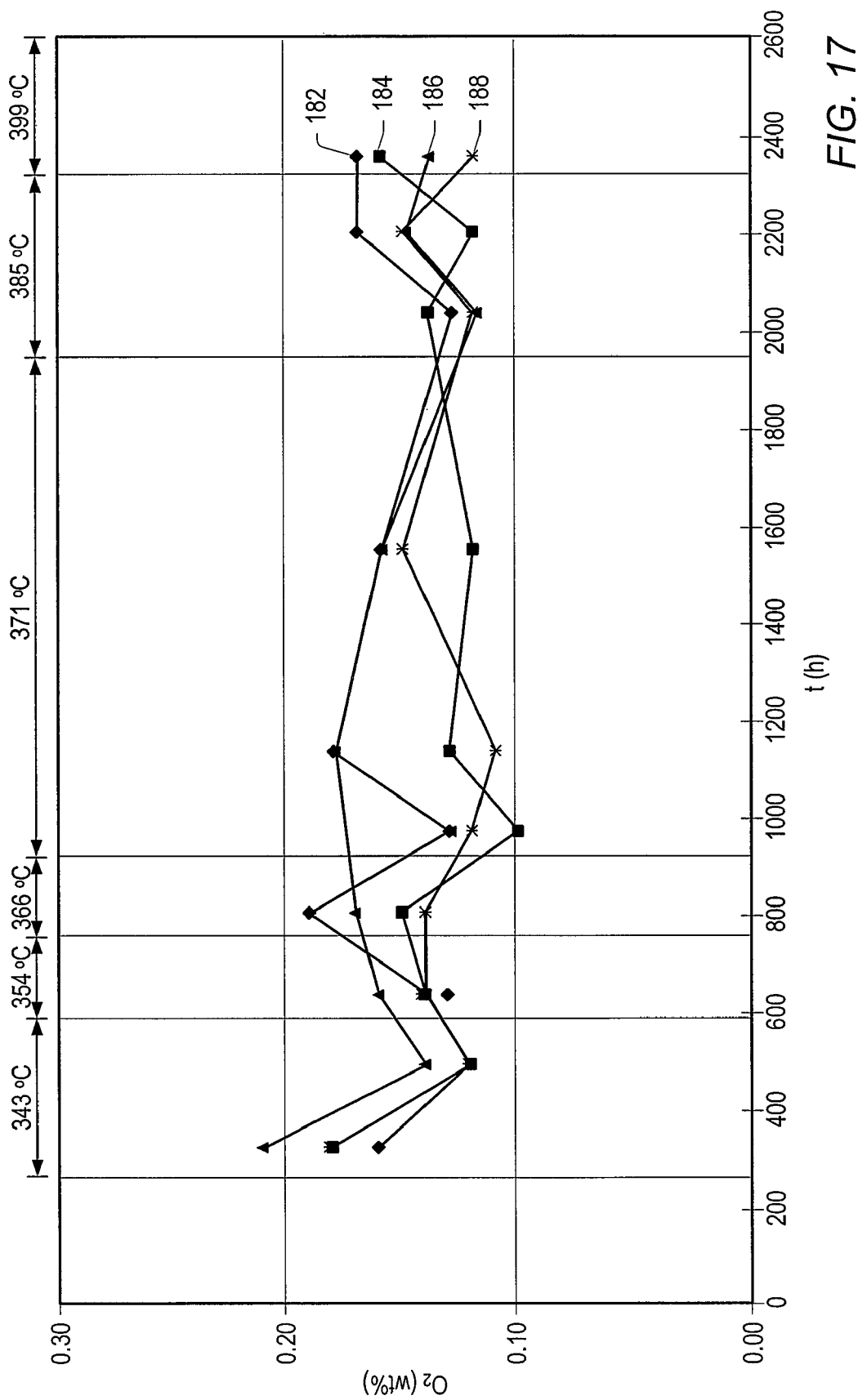
FIG. 17 is a graphical representation of oxygen content, expressed in weight percentage, of crude products versus run time for embodiments of contacting crude feeds with four different catalyst systems.

FIG. 17 is a graphical representation of oxygen content, expressed in weight percentage, of the crude product versus run time for each of the catalyst systems of Examples 8-11. Plots 182, 184, 186, 188 represent oxygen content of the crude product obtained by contacting the crude feed with the catalyst systems of Examples 8-11, respectively. Each crude product had an oxygen content of at most 16% of the crude feed. Each crude product had an oxygen content in a range from 0.0014-0.0015 grams per gram of crude product during each trial. As shown in FIG. 17, the oxygen content of the crude product remained relatively constant after 200 hours of contacting time. The relatively constant oxygen content of the crude product demonstrates that selected organic oxygen compounds are reduced during the contacting. Since TAN was also reduced in these examples, it may be inferred that at least a portion of the carboxylic containing organic oxygen compounds are reduced selectively over the non-carboxylic containing organic oxygen compounds.

In Example 11, at reaction conditions of: 371° C. (700° F.), a pressure of 6.9 MPa (1014.7 psi), and a ratio of hydrogen to crude feed of 160 Nm$^3$/m$^3$ (1000 SCFB), the reduction of crude feed MCR content was 17.5 wt %, based on the weight of the crude feed. At a temperature of 399° C. (750° F.), at the same pressure and ratio of hydrogen to crude feed, the reduction of crude feed MCR content was 25.4 wt %, based on the weight of the crude feed.

In Example 9, at reaction conditions of: 371° C. (700° F.), a pressure of 6.9 MPa (1014.7 psi), and a ratio of hydrogen to crude feed of 160 Nm$^3$/m$^3$ (1000 SCFB), the reduction of crude feed MCR content was 17.5 wt %, based on the weight of the crude feed. At a temperature of 399° C. (750° F.), at the same pressure and ratio of hydrogen to crude feed, the reduction of crude feed MCR content was 19 wt %, based on the weight of the crude feed.

This increased reduction in crude feed MCR content demonstrates that the uncalcined Columns 6 and 10 metals catalyst facilitates MCR content reduction at higher temperatures than the uncalcined Columns 6 and 9 metals catalyst.

These examples demonstrate that contact of a crude feed with a relatively high TAN (TAN of 0.8) with one or more catalysts produces the crude product, while maintaining the crude feed/total product mixture stability and with relatively small net hydrogen uptake. Selected crude product properties were at most 70% of the same properties of the crude feed, while selected properties of the crude product were within 20-30% of the same properties of the crude feed.

Specifically, as shown in Table 4, each of the crude products was produced with a net hydrogen uptake by the crude feeds of at most 44 Nm$^3$/m$^3$ (275 SCFB). Such products had an average TAN of at most 4% of the crude feed, and an average total Ni/V content of at most 61% of the total Ni/V content of the crude feed, while maintaining a P-value for the crude feed of above 3. The average residue content of each crude product was 88-90% of the residue content of the crude feed. The average VGO content of each crude product was 115-117% of the VGO content of the crude feed. The average API gravity of each crude product was 110-117% of the API gravity of the crude feed, while the viscosity of each crude product was at most 45% of the viscosity of the crude feed.

Examples 12-14

Contact of a Crude Feed with Catalysts having a Pore Size Distribution with a Median Pore Diameter of at Least 180 Å with Minimal Hydrogen Consumption In Examples 12-14, each reactor apparatus (except for number and content of contacting zones), each catalyst sulfiding method, each total product separation method and each crude product analysis were the same as described in Example 5. All catalysts were mixed with an equal volume of silicon carbide. The crude feed flow to each reactor was from the top of the reactor to the bottom of the reactor. Silicon carbide was positioned at the bottom of each reactor to serve as a bottom support. Each reactor contained one contacting zone. After the catalyst/silicone carbide mixtures were placed in the contacting zone of each reactor, silicone carbide was positioned on top of the top contacting zone to fill dead space and to serve as a preheat zone in each reactor. Each reactor was loaded into a Lindberg furnace that included three heating zones corresponding to the preheat zone, the contacting zone, and the bottom support. The crude feed was contacted with each of the catalysts in the presence of hydrogen gas.

A catalyst/silicon carbide mixture (40 cm$^3$) was positioned on top of the silicon carbide to form the contacting zone. For Example 12, the catalyst was the vanadium catalyst as prepared in Example 2. For Example 13, the catalyst was the molybdenum catalyst as prepared in Example 3. For Example 14, the catalyst was the molybdenum/vanadium catalyst as prepared in Example 4.

The contacting conditions for Examples 12-14 were as follows: ratio of hydrogen to the crude feed provided to the reactor was 160 Nm$^3$/m$^3$ (1000 SCFB), LHSV was 1 h$^{-1}$, and pressure was 6.9 MPa (1014.7 psi). The contacting zones were heated incrementally to 343° C. (650° F.) over a period of time and maintained at 343° C. for 120 hours for a total run time of 360 hours.

Total products exited the contacting zones and were separated as described in Example 5. Net hydrogen uptake during contacting was determined for each catalyst system. In Example 12, net hydrogen uptake was −10.7 Nm$^3$/m$^3$ (−65 SCFB), and the crude product had a TAN of 6.75. In Example 13, net hydrogen uptake was in a range from 2.2-3.0 Nm$^3$/m$^3$ (13.9-18.7 SCFB), and the crude product had a TAN in a range from 0.3-0.5. In Example 14, during contacting of the crude feed with the molybdenum/vanadium catalyst, net hydrogen uptake was in a range from −0.05 Nm$^3$/m$^3$ to 0.6 Nm$^3$/m$^3$ (−0.36 SCFB to 4.0 SCFB), and the crude product had a TAN in a range from 0.2-0.5.

From the net hydrogen uptake values during contacting, it was estimated that hydrogen was generated at the rate of 10.7 Nm$^3$/m$^3$ (65 SCFB) during contacting of the crude feed and the vanadium catalyst. Generation of hydrogen during contacting allows less hydrogen to be used in the process relative to an amount of hydrogen used in conventional processes to improve properties of disadvantaged crudes. The requirement for less hydrogen during contacting tends to decrease the costs of processing a crude.

Additionally, contact of the crude feed with the molybdenum/vanadium catalyst produced a crude product with a TAN that was lower than the TAN of the crude product produced from the individual molybdenum catalyst.

Examples 15-18

Contact of a Crude Feed with a Vanadium Catalyst and an Additional Catalyst

Each reactor apparatus (except for number and content of contacting zones), each catalyst sulfiding method, each total product separation method, and each crude product analysis were the same as described in Example 5. All catalysts were mixed with silicon carbide in a volume ratio of 2 parts silicon carbide to 1 part catalyst unless otherwise indicated. The crude feed flow to each reactor was from the top of the reactor to the bottom of the reactor. Silicon carbide was positioned at the bottom of each reactor to serve as a bottom support. Each reactor had a bottom contacting zone and a top contacting zone. After the catalyst/silicone carbide mixtures were placed in the contacting zones of each reactor, silicone carbide was positioned on top of the top contacting zone to fill dead space and to serve as a preheat zone in each reactor. Each reactor was loaded into a Lindberg furnace that included four heating zones corresponding to the preheat zone, the two contacting zones, and the bottom support.

In each example, the vanadium catalyst was prepared as described in Example 2 and used with the additional catalyst.

In Example 15, an additional catalyst/silicon carbide mixture (45 cm$^3$) was positioned in the bottom contacting zone, with the additional catalyst being the molybdenum catalyst prepared by the method described in Example 3. The vanadium catalyst/silicone carbide mixture (15 cm$^3$) was positioned in the top contacting zone.

In Example 16, an additional catalyst/silicon carbide mixture (30 cm$^3$) was positioned in the bottom contacting zone, with the additional catalyst being the molybdenum catalyst prepared by the method described in Example 3. The vanadium catalyst/silicon carbide mixture (30 cm$^3$) was positioned in the top contacting zone.

In Example 17, an additional catalyst/silicone mixture (30 cm$^3$) was positioned in the bottom contacting zone, with the additional catalyst being the molybdenum/vanadium catalyst as prepared in Example 4. The vanadium catalyst/silicon carbide mixture (30 cm$^3$) was positioned in the top contacting zone.

In Example 18, Pyrex® (Glass Works Corporation, New York, U.S.A.) beads (30 cm$^3$) were positioned in each contacting zone.

Crude (Santos Basin, Brazil) for Examples 15-18 having the properties summarized in Table 5, FIG. 18 was fed to the top of the reactor. The crude feed flowed through the preheat zone, top contacting zone, bottom contacting zone, and bottom support of the reactor. The crude feed was contacted with each of the catalysts in the presence of hydrogen gas. Contacting conditions for each example were as follows: ratio of hydrogen gas to the crude feed provided to the reactor was 160 Nm$^3$/m$^3$ (1000 SCFB) for the first 86 hours and 80 Nm$^3$/m$^3$ (500 SCFB) for the remaining time period, LHSV was 1 h$^{-1}$, and pressure was 6.9 MPa (1014.7 psi). The contacting zones were heated incrementally to 343° C. (650° F.) over a period of time and maintained at 343° C. for a total run time of 1400 hours.

These examples demonstrate that contact of a crude feed with a Column 5 metal catalyst having a pore size distribution with a median pore diameter of 350 Å in combination with an additional catalyst having a pore size distribution with a median pore diameter in a range from 250-300 Å, in the presence of a hydrogen source, produces a crude product with properties that are changed relative to the same properties of crude feed, while only changing by small amounts other properties of the crude product relative to the same properties of the crude feed. Additionally, during processing, relatively small hydrogen uptake by the crude feed was observed.

Specifically, as shown in Table 5, FIG. 18, the crude product has a TAN of at most 15% of the TAN of the crude feed for Examples 15-17. The crude products produced in Examples 15-17 each had a total Ni/V/Fe content of at most 44%, an oxygen content of at most 50%, and viscosity of at most 75% relative to the same properties of the crude feed. Additionally, the crude products produced in Examples 15-17 each had an API gravity of 100-103% of the API gravity of the crude feed.

In contrast, the crude product produced under non-catalytic conditions (Example 18) produced a product with increased viscosity and decreased API gravity relative to the viscosity and API gravity of the crude feed. From the increased viscosity and decreased API gravity, it may be possible to infer that coking and/or polymerization of the crude feed was initiated.

Examples 19

Contact of a Crude Feed at Various LHSV

The contacting systems and the catalysts were the same as described in Example 6. The properties of the crude feeds are listed in Table 6 in FIG. 19. The contacting conditions were as follows: a ratio of hydrogen gas to the crude feed provided to the reactor was 160 Nm$^3$/m$^3$ (1000 SCFB), pressure was 6.9 MPa (1014.7 psi), and temperature of the contacting zones was 371° C. (700° F.) for the total run time. In Example 19, the LHSV during contacting was increased over a period of time from 1 h$^{-1}$ to 12 h$^{-1}$, maintained at 12 h$^{-1}$ for 48 hours, and then the LHSV was increased to 20.7 h$^{-1}$ and maintained at 20.7 h$^{-1}$ for 96 hours.

In Example 19, the crude product was analyzed to determine TAN, viscosity, density, VGO content, residue content, heteroatoms content, and content of metals in metal salts of organic acids during the time periods that the LHSV was at 12 h$^{-1}$ and at 20.7 h$^{-1}$. Average values for the properties of the crude products are shown in Table 6, FIG. 19.

As shown in Table 6, FIG. 19, the crude product for Example 19 had a reduced TAN and a reduced viscosity relative to the TAN and the viscosity of the crude feed, while the API gravity of the crude product was 104-110% of the API gravity of the crude feed. A weight ratio of MCR content to C$_5$ asphaltenes content was at least 1.5. The sum of the MCR content and C$_5$ asphaltenes content was reduced relative to the sum of the MCR content and C$_5$ asphaltenes content of the crude feed. From the weight ratio of MCR content to C$_5$ asphaltenes content and the reduced sum of the MCR content and the C$_5$ asphaltenes, it may be inferred that asphaltenes rather than components that have a tendency to form coke are being reduced. The crude product also had total content of potassium, sodium, zinc, and calcium of at most 60% of the total content of the same metals of the crude feed. The sulfur content of the crude product was 80-90% of the sulfur content of the crude feed.

Examples 6 and 19 demonstrate that contacting conditions can be controlled such that a LHSV through the contacting zone is greater than 10 h$^{-1}$, as compared to a process that has a LHSV of 1 h$^{-1}$, to produce crude products with similar properties. The ability to selectively change a property of a crude feed at liquid hourly space velocities greater than 10 h$^{-1}$ allows the contacting process to be performed in vessels of reduced size relative to commercially available vessels. A smaller vessel size may allow the treatment of disadvantaged crudes to be performed at production sites that have size constraints (for example, offshore facilities).

Example 20

Contact of a Crude Feed at Various Contacting Temperatures

The contacting systems and the catalysts were the same as described in Example 6. The crude feed having the properties listed in Table 7 in FIG. 20 was added to the top of the reactor and contacted with the two catalysts in the two contacting zones in the presence of hydrogen to produce a crude product. The two contacting zones were operated at different temperatures.

Contacting conditions in the top contacting zone were as follows: LHSV was 1 h$^{-1}$; temperature in the top contacting zone was 260° C. (500° F.); a ratio of hydrogen to crude feed was 160 Nm$^3$/m$^3$ (1000 SCFB); and pressure was 6.9 MPa (1014.7 psi).

Contacting conditions in the bottom contacting zone were as follows: LHSV was 1 h$^{-1}$; temperature in the bottom contacting zone was 315° C. (600° F.); a ratio of hydrogen to crude feed was 160 Nm$^3$/m$^3$ (1000 SCFB); and pressure was 6.9 MPa (1014.7 psi).

The total product exited the bottom contacting zone and was introduced into the gas-liquid phase separator. In the gas-liquid phase separator, the total product was separated into the crude product and gas. The crude product was periodically analyzed to determine TAN and C$_5$ asphaltenes content.

Average values for the properties of crude product obtained during the run are listed in Table 7, FIG. 20. The crude feed had a TAN of 9.3 and a C$_5$ asphaltenes content of 0.055 grams of C$_5$ asphaltenes per gram of crude feed. The crude product had an average TAN of 0.7 and an average C$_5$ asphaltenes content of 0.039 grams of C$_5$ asphaltenes per gram of crude product. The C$_5$ asphaltenes content of the crude product was at most 71% of the C$_5$ asphaltenes content of the crude product.

The total content of potassium and sodium in the crude product was at most 53% of the total content of the same metals in the crude feed. The TAN of the crude product was at most 10% of the TAN of the crude feed. A P-value of 1.5 or higher was maintained during contacting.

As demonstrated in Examples 6 and 20, having a first (in this case, top) contacting temperature that is 50° C. lower than the contacting temperature of the second (in this case, bottom) zone tends to enhance the reduction of C$_5$ asphaltenes content in the crude product relative to the C$_5$ asphaltenes content of the crude feed. Additionally, reduction of the content of metals in metal salts of organic acids was enhanced using controlled temperature differentials. For example, reduction in the total potassium and sodium content of the crude product from Example 20 was enhanced relative to the reduction of the total potassium and sodium content of the crude product from Example 6 with a relatively constant crude feed/total product mixture stability for each example, as measured by P-value.

Using a lower temperature of a first contacting zone allows removal of the high molecular weight compounds (for example, C$_5$ asphaltenes and/or metals salts of organic acids) that have a tendency to form polymers and/or compounds having physical properties of softness and/or stickiness (for example, gums and/or tars). Removal of these compounds at lower temperature allow such compounds to be removed before they plug and coat the catalysts, thereby increasing the life of the catalysts operating at higher temperatures that are positioned after the first contacting zone.

Example 21

Contact of a Crude Feed with at Least One Catalyst having a Pore Size Distribution with a Median Pore Diameter of at Least 180 Å for Greater than 500 Hours The reactor apparatus (except for number and content of contacting zones), the total product separation method, crude product analysis, the catalysts and catalyst sulfiding method were the same as described in Example 5.

A molybdenum catalyst (11.25 cm$^3$) prepared by the method described in Example 3 and mixed with silicon carbide (22.50 cm$^3$) to form a molybdenum catalyst/silicon carbide mixture (37.75 cm$^3$) was positioned in the bottom contacting zone. A vanadium catalyst (3.75 cm$^3$) prepared by the method described in Example 4 was mixed with silicon carbide (7.5 cm$^3$) to form a vanadium catalyst/silicone carbide mixture (11.25 cm$^3$) was positioned in the top contacting zone.

A crude feed (BC-10 crude) having the properties summarized in Table 8, FIG. 21, was fed to the top of the reactor. The crude feed flowed through the preheat zone, top contacting zone, bottom contacting zone, and bottom support of the reactor. The contacting conditions were as follows: ratio of hydrogen gas to the crude feed provided to the reactor was 160 Nm$^3$/m$^3$ (1000 SCFB), LHSV was 2 h$^{-1}$, and pressure was 3.4 MPa (500 psig). The two contacting zones were heated incrementally to 343° C. (650° F.).

After total run time of 1175 hours, the crude product had a TAN of 0.44 and an API gravity of 15.9. The crude product had 0.6 wtppm of calcium, 0.8 wtppm of sodium, 0.9 wtppm of zinc, 1.5 wtppm of potassium, 0.8 wtppm silicon. The crude product had, per gram of crude product, 0.0043 grams of sulfur, 0.003 grams of oxygen, 0.407 grams of VGO, and 0.371 grams of residue. Additional properties of the crude product are listed in Table 8 in FIG. 21.

After total run time of 5207 hours with no catalyst replacement, the crude product had a TAN of 0.27 and an API gravity of 15.7. The crude product had 0.4 wtppm of calcium, 1.1 wtppm of sodium, 0.9 wtppm of zinc, and 1.7 wtppm of potassium. The crude product had, per gram of crude product, 0.00396 grams of sulfur, 0.407 grams of VGO, and 0.38 grams of residue. Additional properties of the crude product are listed in Table 8 in FIG. 21.

This example demonstrates that contacting of the crude feed with the selected catalysts and at least one of the catalysts having a pore size distribution with a median pore diameter of greater than 180 Å produced a crude product that had a reduced TAN, a reduced total calcium, sodium, zinc, potassium and silicon content while sulfur content, VGO content, and residue content of the crude product were 100%, 102%, and 95.6% of the respective properties of the crude feed. This example also demonstrates that the TAN of the crude product is at least 30% of the TAN of the crude feed after 500 hours without replacement of the catalysts. This example also demonstrates that one or more properties of the crude feed may be changed at a lower pressure, higher throughput at elevated temperatures. This example also demonstrates that a Column 6 metal catalyst that exhibits bands between 810 cm$^{-1}$ to 870 cm$^{-1}$ as determined by Raman Spectroscopy produces a total product that includes a crude product with a TAN that is at least 90% of the TAN of the crude feed.

Example 22

Contact of a Crude Feed and a Catalyst in an Continuously Stirred Reactor (CSTR)

A molybdenum catalyst (25.5 grams, 50 cm$^{-3}$) prepared as in Example 3 was charged to a CSTR. Crude feed (BS-4) having the properties listed in Table 9 in FIG. 22 was metered at a flow rate of 24.1 g/hr to produce a LHSV of 0.5 h$^{-1}$. A temperature 421° C. (790° F.), a partial pressure of hydrogen of 14 MPa (2000 psig), and ratio of hydrogen source to crude feed of 320 Nm$^3$/m$^3$ (2000 SCFB) were maintained through out the run. Total product was removed from the top of the reactor and separated into crude product and process gases.

During the run, an amount of sediment was monitored to determine if the reaction vessel was filling with impurities and/or coke. The amount of sediment, per gram of crude feed, ranged between 0.0001 grams and 0.00013 grams during the run.

Properties of the crude product after 286 hours are tabulated in Table 9 of FIG. 22. The crude product had a TAN of 0.26 and an API gravity of 21.2. The crude product had 2.2 wtppm of calcium, 0.2 wtppm of sodium, 6.4 wtppm of zinc, 0.7 wtppm of silicon, 0.2 wtppm of potassium, 2.9 wtppm nickel, 0.6 wtppm vanadium, and 2.3 wtppm iron. The crude product had, per gram of crude product, 0.018 grams of sulfur, 0.386 of distillate, 0.41 grams of VGO, and 0.204 grams of residue.

This example demonstrates that contact of a crude feed with hydrogen in the presence of at least one molybdenum catalyst that exhibits bands in the range 810 cm$^{-1}$ to 870 cm$^{-1}$ as determined by Raman Spectroscopy produces a total product that includes a crude product with a residue content of at least 90% of the residue content of the crude feed. This example also demonstrates that contact of a crude feed with hydrogen in the presence of at least one molybdenum catalyst that exhibits bands in the range 810 cm$^{-1}$ to 870 cm$^{-1}$ as determined by Raman Spectroscopy produces a total product that includes a crude product with a TAN that is at least 90% of the TAN of the crude feed.

Comparative Example 23

Contact of a Crude Feed and a Catalyst in an Continuously Stirred Reactor (CSTR)

The reactor apparatus, the total product separation method, crude product analysis, and catalyst sulfiding method were the same as described in Example 22. The catalyst had a pore size distribution with a median pore diameter of 192 Å and contained 0.04 grams of molybdenum per gram of catalyst, with the balance being primarily a gamma alumina support. The catalyst did not exhibit absorption in the range Δ810 cm$^{-1}$ to Δ870 cm$^{-1}$ as determined by Raman Spectroscopy. The properties of the crude product after 213 hours are tabulated in Table 9 of FIG. 22. At 213 hours a content of sediment, per gram of crude feed, was 0.0019 grams, per gram of crude feed/total product. After 765 hours the sediment had increased to 0.00329 grams, per gram of crude feed/total product. An increase in sediment relative to sediment content of the crude feed/total product mixture when contacting the crude feed with the molybdenum catalyst of Example 22 indicates that impurities and/or coke are forming at an increased rate. An increased rate of sediment formation decreases contacting time and/or catalyst life, thus the catalyst of Example 22 has a longer catalyst life than the catalyst of Example 23.

Example 24

Preparation of a Columns 6-10 Metal(s) Catalyst having at Least 10 wt % Molybdenum A support (200 grams) that contained 0.02 grams of silica-alumina and 0.98 grams alumina per gram of support was impregnated with a molybdenum/nickel solution. A first solution was prepared by combining 62.34 grams of $(NH_4)_2Mo_2O_7$ and 17.49 grams of $MoO_3$, 3 grams of monoethanolamine, 12.22 grams of 30% hydrogen peroxide, and 50.47 grams of deionized water to form a slurry. The slurry was heated to 63.8° C. (147° C.) until dissolution of the solids. The solution was cooled to room temperature. The pH of the solution was 5.34.

A second solution was prepared by combining 31.93 grams of $Ni(NO_3)_8.6H_2O$, 9.63 grams of $NiCO_3$, and 30.56 grams of deionized water to form a slurry. Concentrated phosphoric acid (39.57 grams of 85.9 wt % $H_3PO_4$) was added at a rate sufficient to control foaming. The solution was stirred until the solids were dissolved. The pH of the solution was 0.29.

The first solution and second solution were combined and sufficient deionized water was added to bring the combined solution volume up to 218.75 mL to yield the molybdenum/nickel impregnation solution. The pH of the resulting solution was 2.02. The support was impregnated with the molybdenum/nickel solution, aged for several hours with occasional agitation, dried at 125° C. for several hours, and then calcined at 482° C. (900° F.) for two hours. The resulting catalyst contained, per gram of catalyst, 0.13 grams of Mo, 0.03 grams Ni, 0.005 grams of phosphorus with the balance being support. The molybdenum/nickel catalyst had a median pore diameter of 155 Å, with at least 60% of the total number of pores in the pore sized distribution having a pore diameter within 28 Å of the median pore diameter, a pore volume of 0.84 mL/g, and a surface area of 179 m$^2$/g.

Example 25

Contact of a Hydrocarbon Feed with Two Catalysts at a Pressure of at Most 7 MPa

The reactor apparatus (except for number and content of contacting zones), the total product separation method, crude product analysis, and catalyst sulfiding method were the same as described in Example 6.

A catalyst as prepared in Example 24, (12.5 cm$^3$) was mixed with silicon carbide (12.5 cm$^3$) to form a molybdenum catalyst/silicon carbide mixture and was positioned in the bottom contacting zone.

A molybdenum catalyst (12.5 cm$^3$) containing 0.039 grams of molybdenum, 0.01 grams of nickel and 0.0054 grams of phosphorus with the balance being alumina and having a median pore diameter of 108 Å and a surface area of 266 m$^2$/g was mixed with silicon carbide (12.5 cm$^3$) to form a molybdenum catalyst/silicon carbide mixture and was positioned in the top contacting zone.

After sulfidation of the catalysts, the contacting zones were raised to a temperature of 385° C. A heated hydrocarbon feed (Peace River crude) having the properties summarized in Table 10, FIG. 23 was fed to the top of the reactor. The hydrocarbon feed flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 328 Nm$^3$/m$^3$ (2000 SCFB) and LHSV was 0.5 h$^{-1}$. The two contacting zones were heated to 385° C. at a pressure of 13.8 MPa (2000 psig) and the hydrocarbon feed flowed through the contacting zones for 600 hours. Temperatures and pressures for the two contacting zones were then adjusted and maintained in the following sequence: 400° C., 6.9 MPa (1000 psig) for 1203 hours; 410° C., 3.8 MPa (500 psig) for 1149 hours. The total contact time for the two catalysts was 2952 hours.

As shown in FIG. 23, contact of the hydrocarbon feed at pressures of at most 7 MPa and temperatures of at least 300° C., produced a crude product that had a molybdenum content of 0.4 wtppm, a Ni/V/Fe content of 251 wtppm, a residue content of 0.275 grams per gram of crude product, a $C_5/C_7$ asphaltenes content of 15.4 wt %, and a viscosity of 74.4 cSt at 37.8° C. During the run at lower temperatures the P value of the feed/intermediate product was 1.2. The total amount of $C_1$-$C_4$ gas produced during contacting was at most 0.02 grams per gram of total product.

As shown in Table 10 of FIG. 23, contact of the feed at controlled contacting conditions of at most 7 MPa and at least 300° C., the molybdenum content was at most 90% of the feed molybdenum content, the Ni/V/Fe content was between 80% and 120% of the feed Ni/V/Fe content, $C_5/C_7$ asphaltenes content was at most 90% of the $C_5/C_7$ feed asphaltenes content, the residue was at most 90% of the feed residue and the viscosity was at most 90% of the feed viscosity. As shown in FIG. 23, the crude product has at least 0.1 wtppm of molybdenum, at least 0.01 grams of hydrocarbons having a boiling range distribution between 38° C. and 200° C. per gram of hydrocarbon composition; and at least 0.1 grams of hydrocarbons having a boiling range distribution between 343° C. and 650° C. per gram of hydrocarbon composition. The crude product also has at least 0.001 grams of hydrocarbons with a boiling range distribution between 38° C. and 200° C. at 0.101 MPa; at least 0.001 grams of hydrocarbons with a boiling range distribution between 204° C. and 343° C. at 0.101 MPa; at least 0.001 grams of hydrocarbons with a boiling range distribution between 343° C. and 650° C. at 0.101 MPa; at least 0.001 grams of hydrocarbons with an initial boiling point of at least 650° C. at 0.101 MPa; at least 0.000150 grams of Ni/V/Fe; and at most 0.01 grams of $C_5$ asphaltenes.

This example also demonstrates that at the P-value of a hydrocarbon feed/total product mixture remains above 1.0 at pressures when the hydrocarbon feed is contacted with the catalysts at a pressure of at most 7 MP, at temperatures ranging from 350° C. and 450° C., and at a LHSV of at least 0.1 $h^{-1}$.

Example 25 also demonstrates that at operating conditions of at most 7 MPa and temperatures of at most 450° C., the viscosity of the crude product is at most 50% of the hydrocarbon feed while the consumption of hydrogen is at most 80 $Nm^3/m^3$.

Example 26

Preparation of Column 6 Metal(s) Catalyst Containing Mineral Oxide Fines

The catalyst was prepared in the following manner. $MoO_3$ (99.44 grams) was combined with 2 wide pore alumina (737.85 grams) and crushed and sieved alumina fines having a particle size between 5 and 10 micrometers (1050.91 grams) in a muller. With the muller running, 43.04 grams of 69.7 wt % nitric acid, 4207.62 grams of deionized water were added to the mixture and the resulting mixture was mulled for 5 minutes. Superfloc® 16 (30 grams, Cytec Industries, West Paterson, N.J., USA) was added to the mixture in the muller, and the mixture was mulled for at total of 25 minutes. The resulting mixture had a pH of 6.0 and an LOI of 0.6232 grams per gram of mixture. The mulled mixture was extruded using 1.3 mm trilobe dies to form 1.3 trilobe extrudate particles. The extrudate particles were dried at 125° C. for several hours and then calcined at 676° C. (1250° F.) for two hours. The catalyst contained 0.02 grams of molybdenum, with the balance being mineral oxide and support. The catalyst had a pore size distribution with a median pore diameter of 117 Å with 66.7% of the total number of pores in the pore size distribution having a pore diameter within 33 Å of the median pore diameter, and a total pore volume of 0.924 ml/g.

The pore size distribution at theta=140° as a percentage of total pores was as follows: <70 Å 0.91%; 70-100 Å 20.49%; 100-130 Å 37.09%; 130-150 Å 4.51%; 150-180 Å 2.9%; 150-180 Å 2.9%; 180-200 Å 1.06%; 200-1000 Å 0.85%, 1000-5000 Å 5.79% and >5000 Å 22.04%.

This example demonstrates a catalyst that includes a support, mineral oxides, and one or more metals from Column 6 of the Periodic Table and/or one or more compounds of one or more metals from Column 6 of the Periodic Table. The catalyst has a pore size distribution with a median pore diameter of at least 80 Å and the catalyst is obtainable by combining: a mineral oxide fines; the one or more of metals from Column 6 of the Periodic Table and/or the one or more compounds of one or more metals from Column 6 of the Periodic Table; and a support.

Example 27

Contact of a Hydrocarbon Feed with a Column 6 Metal(s) Catalyst having Mineral Oxide Fines The reactor apparatus (except for number and content of contacting zones), the total product separation method, crude product analysis, and catalyst sulfiding method were the same as described in Example 5.

A molybdenum catalyst as described in Example 26 was mixed with silicon carbide (total volume of 30 $cm^3$) and was positioned in the bottom contacting zone. A molybdenum catalyst as described in Example 26 was mixed with silicon carbide (total volume of 30 $cm^3$) and was positioned in the top contacting zone.

After sulfidation of the catalysts, the temperature of the contacting zones was raised to a temperature of 400° C. A hydrocarbon feed (Peace River) having the properties listed in Table 10, FIG. 23. The hydrocarbon feed flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 318 $Nm^3/m^3$ (2000 SCFB) and LHSV was 0.5 $h^{-1}$. The two contacting zones were heated to 400° C. and maintained between 400° C. and 402° C. at a pressure of 3.8 MPa (500 psig) for 671 hours as the hydrocarbon feed flowed through the reactor.

As shown in Table 10, FIG. 23, the crude product had a viscosity of 53.1 at 37.8° C., a residue content of 0.202 grams, per gram of catalyst, a Ni/V/Fe content of 164 wtppm and a molybdenum content of 0.5 wtppm.

This example demonstrates that contact of a hydrocarbon feed with a Column 6 metal catalyst that is obtainable by combining mineral oxide fines, one or more metals from Columns 6 of the Periodic Table and/or one or more compounds of one or more metals from Columns 6 of the Periodic Table; and a support produces a crude product having a residue content of at most 90% of hydrocarbon feed residue. This example also demonstrates that contact of a hydrocarbon feed with a Column 6 metal catalyst that is obtainable by combining mineral oxide fines, one or more metals from Columns 6 of the Periodic Table and/or one or more compounds of one or more metals from Columns 6 of the Periodic Table; and a support produces a crude product having a viscosity content of at most 50% of hydrocarbon feed viscosity at 37.8° C.

Example 28

Contact of a Hydrocarbon Feed with One Catalyst

In a separate experiment, the hydrocarbon feed was contacted with the catalyst as prepared in Example 24 at the same conditions as described in Example 25 and in the absence of the top catalyst described in Example 25. After approximately 45 hours of passing hydrocarbon feed through the reactor, the catalyst bed plugged. This example demonstrates that the top catalyst used in Example 25 removes at least a portion of the compounds (for example, molybdenum compounds) that contribute to catalyst plugging.

Example 29

Contact of a Hydrocarbon Feed with a Column 6 Metal(s) Catalyst

The reactor apparatus (except for number and content of contacting zones), the total product separation method, crude product analysis, and catalyst sulfiding method were the same as described in Example 5.

A molybdenum catalyst (27.5 cm$^3$) as prepared in Example 24 (3 cm$^3$) to form a molybdenum catalyst/silicon carbide mixture was positioned in the bottom contacting zone.

A molybdenum/vanadium catalyst (3 cm$^3$) prepared by the method described in Example 4 and mixed with silicon carbide (3 cm$^3$) to form a molybdenum/vanadium catalyst/silicon carbide mixture (37.75 cm$^3$) was positioned in the top contacting zone.

After sulfidation of the catalysts, the temperature of the contacting zones was raised to a temperature of 385° C. A hydrocarbon feed (BC-10) having the properties summarized in Table 11, FIG. 24 was fed to the top of the reactor. The hydrocarbon feed flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 328 Nm$^3$/m$^3$ (2000 SCFB) and LHSV was 0.5 h$^{-1}$. The two contacting zones were heated to 390° C. at a pressure of 15.9 MPa (2300 psig) and the hydrocarbon feed flowed through the reactor for 4703 hours. During contacting the P-value of the hydrocarbon feed/total product mixture remained above 1.0.

As shown in FIG. 24, the crude product had, per gram of crude product, 0.0665 grams of basic nitrogen, 0.241 grams of residue, 0.063 grams of total $C_5/C_7$ asphaltenes, a MCR content of 0.037 grams, and a viscosity of 45 cSt at 37.8° C.

This example demonstrates that contact of a hydrocarbon feed with a catalyst having a pore size distribution with a median pore diameter of between 50 angstroms and 180 angstroms produces a crude product having a basic nitrogen content of at most 90% of the hydrocarbon feed basic nitrogen content. This example also demonstrates that contact of a hydrocarbon feed with a catalyst having Columns 6 and 9 metal(s) produces a crude product having a MCR content of at most 90% of the MCR content of the hydrocarbon feed.

Example 30

Preparation of a Catalyst

The catalyst was prepared in the following manner. A nickel solution was made by combining 286.95 grams of Ni(NO$_3$)$_2$.6H$_2$O, and 99.21 grams of deionized water to form a slurry. The slurry was heated until clear. A support (3208.56 grams) that contained 0.02 grams of silica-alumina and 0.98 grams alumina per gram of support was combined with the nickel solution, a Ni—Mo—P used catalyst (652.39 grams), and MoO$_3$ (268.85 grams) in a muller. During mulling, HNO$_3$ (128.94 grams 69.9 wt %) and deionized water (2948.29 grams) was added to the mixture and the mixture was mulled for 40 minutes. Superfloc® 16 (30 grams) was added to the mixture and the mixture was mulled for 5 minutes. The resulting mixture had a pH of 4.18 and a LOI of 0.557 grams per gram of mixture.

The mulled mixture was extruded using 1.3 mm trilobe dies to form 1.3 trilobe extrudate particles. The extrudates were dried at 100° C. for several hours and then calcined at 676.6° C. (1250° F.) for two hours. The resulting catalyst contained, per gram of catalyst, 0.079 grams of Mo, and 0.022 grams Ni, with the balance being used catalyst and support. The molybdenum/nickel catalyst had a median pore diameter of 96 Å, with at least 60% of the total number of pores in the pore size distribution having a pore diameter within 39 Å of the median pore diameter, a pore volume of 0.596 mL/g, and a surface area of 256 m$^2$/g.

Example 31

Contact of a Hydrocarbon Feed with the Catalyst

The reactor apparatus (except for number and content of contacting zones), the total product separation method, crude product analysis, and catalyst sulfiding method were the same as described in Example 5.

A molybdenum catalyst (27 cm$^3$) as described in Example 30 was mixed with silicon carbide (3 cm$^3$) and was positioned in the bottom contacting zone.

A molybdenum/vanadium catalyst (3 cm$^3$) prepared by the method described in Example 4 was mixed with silicon carbide (3 cm$^3$) to form a molybdenum/vanadium catalyst/silicon carbide mixture (37.75 cm$^3$) and was positioned in the top contacting zone.

After sulfidation of the catalysts, the contacting zones were raised to a temperature of 385° C. A hydrocarbon feed (BC-10) having the properties summarized in Table 11, FIG. 24 was fed to the top of the reactor. The hydrocarbon feed flowed through the preheat zone, top contacting zone, bottom contacting zone, and bottom support of the reactor. The feed was contacted with each of the catalysts in the presence of hydrogen gas. Contacting conditions were as follows: ratio of hydrogen gas to feed was 328 Nm$^3$/m$^3$ (2000 SCFB) and LHSV was 0.5 h$^{-1}$. The two contacting zones were heated to 390° C. at a pressure of 15.9 MPa (2300 psig) as the hydrocarbon feed flowed through the contacting zone for 4703 hours. During contacting the P-value of the hydrocarbon feed/total product mixture remained above 1.0.

As shown in FIG. 24, the crude product had, per gram of crude product and 0.255 grams of residue and a viscosity of 48.7 cSt at 37.8° C.

This example demonstrates that contact of a hydrocarbon feed with a catalyst prepared by combining a used catalyst, Columns 6-10 metals, and a support produces a crude product having residue content of at most 90% of hydrocarbon feed residue.

Example 32

Preparation of a Columns 6 and 10 Metal(s) Catalyst

The catalyst was prepared in the following manner. A nickel solution was made by combining 377.7 grams of Ni(NO$_3$), and 137.7 grams of deionized water to form a slurry. The slurry was heated until clear and sufficient deionized water was added to bring the combined nickel solution weight up the 3807 grams. MoO$_3$ (417.57 grams) was combined with 4047.49 grams of support containing 0.02 grams of A nickel solution was made by combining 286.95 grams of Ni(NO$_3$).6H$_2$O, and 99.21 grams of deionized water to form a slurry. The slurry was heated until clear. A support (3208.56 grams) that contained 0.02 grams of silica-alumina and 0.98 grams alumina per gram of support was combined with the nickel solution and MoO$_3$ (417.57 grams) in a muller. During mulling, 4191.71 deionized water was added to the mixture and the mixture was mulled for 45 minutes. The resulting mixture had a pH of 4.75 and a LOI of 0.596 grams per gram of mixture.

The mulled mixture was extruded using 1.3 mm trilobe dies to form 1.3 trilobe extrudate particles. The extrudates were dried at 100° C. for several hours and then calcined at 537.7° C. (1000° F.) for two hours. The resulting catalyst contained, per gram of catalyst, 0.079 grams of Mo, and 0.022 grams Ni, with the balance being support. The molybdenum/nickel catalyst had a median pore diameter of 67 Å, with at least 60% of the total number of pores in the pore size distribution having a pore diameter with 25 Å of the median pore diameter, a pore volume of 0.695 mL/g, and a surface area of 268 m$^2$/g.

Example 33

Contact of a Hydrocarbon Feed with a Columns 6 and 10 Metal(s) Catalyst

The reactor apparatus (except for number and content of contacting zones), the total product separation method, crude product analysis, and catalyst sulfiding method were the same as described in Example 5.

A molybdenum/nickel catalyst (27 cm$^3$) as described in Example 32 was mixed with silicon carbide (3 cm$^3$) and was positioned in the bottom contacting zone.

A molybdenum/vanadium catalyst (3 cm$^3$) prepared by the method described in Example 4 was mixed with silicon carbide (3 cm$^3$) to form a molybdenum/vanadium catalyst/silicon carbide mixture (37.75 cm$^3$) and was positioned in the top contacting zone.

After sulfidation of the catalysts, the contacting zones were raised to a temperature of 385° C. A hydrocarbon feed (BC-10) having the properties summarized in Table 11, FIG. 24 was fed to the top of the reactor. The hydrocarbon feed flowed through the preheat zone, top contacting zone, bottom contacting zone, and bottom support of the reactor. The feed was contacted with each of the catalysts in the presence of hydrogen gas. Contacting conditions were as follows: ratio of hydrogen gas to feed was 328 Nm$^3$/m$^3$ (2000 SCFB) and LHSV was 0.5 h$^{-1}$. The two contacting zones were heated to 390° C. at a pressure of 15.9 MPa (2300 psig) as the hydrocarbon feed passed through the contacting zones for 4703 hours. During contacting the P-value of the hydrocarbon feed/total product mixture remained above 1.0.

As shown in FIG. 24, the crude product had, per gram of crude product 0.235 grams of residue and a viscosity of 41.8 cSt at 37.8° C.

This example demonstrates that contact of a hydrocarbon feed with a catalyst that has or more metals from Column 6 of the Periodic Table and/or one or more compounds of one or more metals from Column 6 of the Periodic Table; and one or more metals from Columns 9-10 of the Periodic Table and/or one or more compounds of one or more metals from Columns 9-10 of the Periodic Table and having a pore size distribution with a median pore diameter between 50 Å and 120 Å produces a crude product having a residue content of at most 90% of the hydrocarbon feed residue.

Example 34

Preparation of a Dried Catalyst

The dried catalyst was prepared in the following manner. A support (200 grams) that contained 0.02 grams of 0.01 grams of nickel and 0.99 grams alumina per gram of support was impregnated with a molybdenum/cobalt solution. The solution was prepared by combining 46.68 grams of MoO$_3$, 14.07 grams of Co(OH)$_2$, 20.08 grams of 85% H$_3$PO$_4$, and 300 grams of deionized water to form a slurry. The slurry was and heated to 93.3° C. (200° C.) until dissolution of the solids and then further heated until volume of the solution was reduced to 166 mL The solution was then cooled to room temperature. The pH of the solution was 1.71.

The support was impregnated with the molybdenum/cobalt solution, aged for several hours with occasional agitation and dried at 100° C. for several hours (overnight). The resulting catalyst contained, per gram of catalyst, 0.115 grams of Mo, 0.032 grams Co, 0.02 grams of phosphorus, and 0.74 grams of Ni with the balance being support. The molybdenum/cobalt/nickel catalyst had a LOI of 0.053 grams per gram of catalyst.

Example 35

Contact of a Hydrocarbon Feed with a Dried Catalyst

The reactor apparatus (except for number and content of contacting zones), the total product separation method, and the crude product analysis were the same as described in Example 5.

A molybdenum catalyst (33.34 cm$^3$) as described in Example 34 was mixed with silicon carbide (33.34 cm$^3$) and positioned in the bottom contacting zone.

A molybdenum catalyst (16.67 cm$^3$) having a pore size distribution with a median pore diameter of 192 Å and containing 0.04 grams of molybdenum per gram of catalyst, with the balance being primarily a gamma alumina support was mixed with silicon carbide (16.67 cm$^3$) and positioned in the top contacting zone.

The catalysts were sulfided using the method as described in U.S. Pat. No. 6,290,841 to Gabrielov et al. After sulfidation of the catalysts, the temperature of the contacting zones was raised to a temperature of 405° C. A hydrocarbon feed (Kuwait long residue) having the properties summarized in Table 12, FIG. 25 was fed to the top of the reactor. The hydrocarbon feed flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 656 Nm³/m³ (4000 SCFB) and LHSV was 0.33 h⁻¹. The two contacting zones were heated to 390° C. at a pressure of 13.13 MPa (1900 psig) as the hydrocarbon feed flowed through the contacting zones for 2537 hours. During contacting the P-value of the hydrocarbon feed/total product mixture remained above 1.0.

As shown in Table 12, FIG. 25, the crude product had a viscosity of 63.5 cSt at 37.8° C. and, 0.243 grams of residue and C$_5$ asphaltenes content of 0.024 grams per gram of crude product.

This example demonstrates that contact of a hydrocarbon feed with a dried catalyst produces a crude product having a residue content of at most 90% of hydrocarbon feed residue.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method of producing a crude product, comprising: contacting a hydrocarbon feed with one or more catalysts positioned in one or more contacting zones of a fixed bed reactor to produce a total product that includes the crude product, wherein the crude product is a liquid mixture at 25° C. and 0.101 MPa, the hydrocarbon feed having, per gram of hydrocarbon feed, a total residue content of at least 0.1 grams, and at least one of the catalysts comprises one or more metals from Column 6 of the Periodic Table, and/or one or more compounds of one of more metals from Column 6 of the Periodic Table, wherein the Column 6 metal catalyst has a total molybdenum content of at least 0.0001 grams per gram of catalyst and at most 0.1 grams per gram of catalyst; and controlling contacting conditions at a temperature of at least 300° C., a partial pressure of hydrogen of at most 7 MPa, and a LHSV of at least 0.1 h⁻¹ to produce the crude product, the crude product having a residue content of at most 60% of the hydrocarbon feed residue content, wherein the residue content is as determined by ASTM Method D5307.

2. The method of claim 1, wherein the hydrocarbon feed has an API gravity of at least 5, and contacting conditions are also controlled such that the crude product has an increase in API gravity of at least 5 relative to the hydrocarbon feed.

3. The method of claim 1, wherein the hydrocarbon feed has at least 0.01 grams of C5 asphaltenes per gram of hydrocarbon feed, and contacting conditions are also controlled such that the crude product has a C5 asphaltenes content of at most 90% of the hydrocarbon feed C5 asphaltenes content.

4. The method of claim 1, wherein the hydrocarbon feed has a viscosity of at least 1,000 cSt at 37.8° C.

5. The method of claim 1, wherein the hydrocarbon feed has an API gravity of at most 10.

6. The method of claim 1, wherein at least one of metals of the Column 6 metal catalyst is molybdenum.

7. The method of claim 1, wherein the catalyst is a supported catalyst, and wherein the support comprises alumina, silica, silica-alumina, titanium oxide, zirconium oxide, magnesium oxide, or mixtures thereof.

8. The method of claim 1, wherein the Column 6 metal catalyst has a pore size distribution with a median pore diameter from 50 angstroms to 180 angstroms.

9. The method of claim 1, wherein the Column 6 metal catalyst has a surface area of at least 200 m²/g.

10. The method of claim 1, wherein the Column 6 metal catalyst further comprises nickel and/or cobalt.

11. The method of claim 1, wherein the Column 6 metal catalyst also includes one or more elements from Column 15 of the Periodic Table and/or one or more compounds of one or more elements from Column 15 of the Periodic Table.

12. The method of claim 11, wherein the additional catalyst has a molybdenum content of at least 0.1 grams per gram of catalyst.

13. The method of claim 1, wherein one or more of the catalysts also includes an additional catalyst, wherein the additional catalyst comprises one or more metals from Columns 6-10 of the Periodic Table and/or one or more compounds of one or more metals from Columns 6-10 of the Periodic Table.

14. The method of claim 1, wherein one or more of the catalysts also includes an additional catalyst, and the additional catalyst is positioned downstream of the Column 6 metal catalyst.

15. The method of claim 1, wherein the crude product has greater than 0 grams, but less than 0.01 grams of at least one of the catalysts.

16. The method of claim 1, wherein the method further comprises fractionating the crude product into one or more distillate fractions, and producing transportation fuel from at least one of the distillate fractions.

17. A method of producing a crude product, comprising: contacting a hydrocarbon feed with one or more catalysts to produce a total product that includes the crude product, wherein the crude product is a liquid at 25° C. and 0.101 MPa, the hydrocarbon feed having a viscosity of at least 10 cSt at 37.8° C. and a total residue content of at least 0.1 grams per gram of hydrocarbon feed; at least one of the catalysts comprises one or more metals from the Columns 6-10 of the Periodic Table and/or one or more compounds of one or more metals from Columns 6-10 of the Periodic Table, wherein the Columns 6-10 metal catalyst has a total molybdenum content of at least 0.0001 grams per gram of catalyst and at most 0.1 grams per gram of catalyst; and controlling contacting conditions at a temperature from 370° C. to 450° C., a partial pressure of hydrogen of at most 7 MPa, and a liquid hourly space velocity (LHSV) of at least 0.1 h⁻¹ to produce the crude product, the crude product having a viscosity at 37.8° C. of at most 50% of the viscosity of the hydrocarbon feed at 37.8° C. and having a residue content of at most 60% of the hydrocarbon feed residue content, and wherein a P-value of a hydrocarbon/total product mixture is at least 1.0 during contacting, wherein viscosity is as determined by ASTM Method D445, residue content is as determined by ASTM Method 5307, and P-value is as determined b ASTM Method D7060.

18. The method of claim 17, wherein the viscosity at 37.8° C. of the hydrocarbon feed is at least 100 cSt.

19. The method of claim 17, wherein the viscosity at 37.8° C. of crude product is at most 40% of the hydrocarbon feed viscosity at 37.8° C.

20. The method of claim 17, wherein, after 500 hours of contacting a hydrocarbon feed with one or more catalysts, the P-value of the hydrocarbon feed/total product mixture, produced during contact of additional hydrocarbon feed with the one or more catalysts, is at least 1.0.

21. The method of claim 17, wherein the partial pressure of hydrogen is at most 6 MPa.

22. The method of claim 17, wherein the hydrocarbon feed has an API gravity of at most 10.

23. The method of claim 17, wherein the total product comprises C1 to C3 hydrocarbons and the total product has a C1 to C3 hydrocarbons content of at most 0.02 grams per gram of total product.

24. The method of claim 17, wherein contacting conditions are controlled at a liquid hourly space velocity of at least 0.5 $h^{-1}$.

25. The method of claim of claim 17, wherein the crude product has a hydrogen to carbon (H/C) ratio between 80% and 120% of the hydrocarbon feed H/C ratio.

26. The method of claim 17, wherein at most 0.003 grams of sediment per gram of total product/hydrocarbon feed mixture is formed during contacting.

27. The method of claim 17, wherein the Columns 6-10 metals catalyst comprises molybdenum.

28. The method of claim 17, wherein the Columns 6-10 catalyst has a total molybdenum content from 0.001 grams to 0.6 grams per gram of catalyst.

29. The method of claim 17, wherein the Columns 6-10 metals catalyst is a supported catalyst, and wherein the support comprises alumina, silica, silica-alumina, titanium oxide, zirconium oxide, magnesium oxide, or mixtures thereof.

30. The method of claim 17, wherein the Columns 6-10 metals catalyst has a pore size distribution with a median pore diameter from 50 angstroms to 150 angstroms.

31. The method of claim 17, wherein the Columns 6-10 metals catalyst has a surface area of at least 200 $m^2/g$.

32. The method of claim 17, wherein the Columns 6-10 metals catalyst further comprises one or more elements from Column 15 of the Periodic Table and/or one or more compounds of one or more elements from Column 15 of the Periodic Table.

33. The method of claim 17, wherein the hydrocarbon feed is contacted with one or more catalysts in a fixed bed reactor.

34. The method of claim 17, further comprising heating the one or more catalysts to a temperature of at least 400° C. in a time period of less than three weeks.

35. The method of claim 34, wherein the one or more catalysts are heated prior to contacting the hydrocarbon feed with the one or more catalyst.

36. The method of claim 17, wherein the method further comprises fractionating the crude product into one or more distillate fractions, and producing transportation fuel from at least one of the distillate fractions.

37. A method of producing a crude product, comprising:
contacting a hydrocarbon feed with hydrogen in the presence of one or more catalysts, wherein the one of the catalysts has a total molybdenum content of at least 0.0001 grams per gram of catalyst and at most 0.1 grams per gram of catalyst, to produce a total product that includes the crude product, wherein the crude product is a liquid mixture at 25° C. and 0.101 MPa and the hydrocarbon feed has a viscosity of at least 10 cSt at 37.8° C. and a residue content of at least 0.1 gram per gram of hydrocarbon feed; and controlling contacting conditions at a partial pressure of hydrogen of at most 7 MPa and a temperature of at most 450° C. such that a P-value of a hydrocarbon feed/total product mixture remains at least 1.0, a total consumption of hydrogen is at most 80 $Nm^3/m^3$, and the crude product has a viscosity of at most 50% at 37.8° C. of the hydrocarbon feed viscosity and a residue content of at most 60% of the hydrocarbon feed residue content, wherein viscosity is as determined by ASTM Method D445, residue content is as determined by ASTM Method D5307, and P-value is as determined by ASTM Method D7060.

38. The method of claim 37, wherein the viscosity at 37.8° C. of the hydrocarbon feed is at least 100 cSt.

39. The method of claim 37, wherein the viscosity at 37.8° C. of crude product is at most 40% of the hydrocarbon feed viscosity at 37.8° C.

40. The method of claim 37, wherein the partial pressure of hydrogen is at most 6 MPa.

41. The method of claim 37, wherein the hydrocarbon feed has an API gravity of at least 5.

42. The method of claim 37, wherein contacting conditions are controlled at a liquid hourly space velocity of at least 0.5 $h^{-1}$.

43. The method of claim 37, wherein at most 0.003 grams of sediment per gram of total product/hydrocarbon feed mixture is formed during contacting.

44. The method of claim 37, wherein at least one of the catalysts comprises one or more metals from Columns 6-10 of the Periodic Table and/or one or more compounds of one or more metals from Columns 6-10 of the Periodic Table.

45. The method of claim 44, wherein the Columns 6-10 metals catalyst has a total molybdenum content from 0.001 grams to 0.6 grams per gram of catalyst.

46. The method of claim 44, wherein the Columns 6-10 metals catalyst is a supported catalyst, and wherein the support comprises alumina, silica, silica-alumina, titanium oxide, zirconium oxide, magnesium oxide, or mixtures thereof.

47. The method of claim 44, wherein the Columns 6-10 metals catalyst has a pore size distribution with a median pore diameter from 50 angstroms to 150 angstroms.

48. The method of claim 44, wherein the Columns 6-10 metals catalyst has a surface area of at least 200 $m^2/g$.

49. The method of claim 44, wherein the Columns 6-10 metals catalyst further comprises one or more elements from Column 15 of the Periodic Table and/or one or more compounds of one or more elements from Column 15 of the Periodic Table.

50. The method of claim 44, wherein one or more of the catalysts also includes an additional catalyst, wherein the additional catalyst comprises one or more metals from Columns 6-10 of the Periodic Table and/or one or more compounds of one or more metals from Columns 6-10 of the Periodic Table.

51. The method of claim 50, wherein the additional catalyst has a molybdenum content of at least 0.1 grams per gram of catalyst.

52. The method of claim 44, wherein contacting the hydrocarbon feed with one or more catalysts comprises:

contacting the hydrocarbon feed with the Columns 6-10 metals catalyst; and contacting the hydrocarbon feed with an additional catalyst, wherein the additional catalyst comprises one or more metals from Columns 6-10 of the Periodic Table and/or one or more compounds of one or more metals from Columns 6-10 of the Periodic Table; and wherein the additional catalyst is positioned downstream of the Column 6 metal catalyst.

53. The method of claim 37, wherein the hydrocarbon feed is contacted with one or more catalysts in a fixed bed reactor.

54. The method of claim 37, further comprising heating the one or more catalysts to a temperature of at least 400° C. in a time period of less than three weeks.

55. The method of claim 54, wherein the one or more catalysts are heated prior to contacting the hydrocarbon feed with the one or more catalyst.

56. The method of claim 37, wherein the method further comprises fractionating the crude product into one or more distillate fractions, and producing transportation fuel from at least one of the distillate fractions.

* * * * *